(12) United States Patent
Hayashi et al.

(10) Patent No.: US 12,537,901 B2
(45) Date of Patent: Jan. 27, 2026

(54) INFORMATION PROCESSING APPARATUS, INFORMATION PROCESSING METHOD, AND PROGRAM

(71) Applicant: Sony Group Corporation, Tokyo (JP)

(72) Inventors: Maho Hayashi, Tokyo (JP); Sachiko Nishide, Tokyo (JP); Miyuki Shirakawa, Tokyo (JP); Tomonari Murakami, Tokyo (JP); Koji Nagata, Tokyo (JP); Tetsuo Ikeda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 191 days.

(21) Appl. No.: 18/549,594

(22) PCT Filed: Mar. 8, 2022

(86) PCT No.: PCT/JP2022/009955
§ 371 (c)(1),
(2) Date: Sep. 8, 2023

(87) PCT Pub. No.: WO2022/196429
PCT Pub. Date: Sep. 22, 2022

(65) Prior Publication Data
US 2024/0171682 A1 May 23, 2024

(30) Foreign Application Priority Data

Mar. 15, 2021 (JP) ................. 2021-041387

(51) Int. Cl.
*H04M 3/56* (2006.01)
*H04N 7/15* (2006.01)
*H04S 7/00* (2006.01)

(52) U.S. Cl.
CPC ............ *H04M 3/568* (2013.01); *H04N 7/157* (2013.01); *H04S 7/302* (2013.01)

(58) Field of Classification Search
CPC ........ H04S 7/302; H04M 3/568; G10L 17/00; G10L 25/51; H04N 7/157
See application file for complete search history.

(56) References Cited

U.S. PATENT DOCUMENTS

| | | | |
|---|---|---|---|
| 8,189,825 B2 * | 5/2012 | Breed ..................... | H04R 5/02 381/86 |
| 11,678,114 B2 * | 6/2023 | Saito ..................... | H04R 1/323 381/86 |
| 2005/0270146 A1 | 12/2005 | Enya | |

FOREIGN PATENT DOCUMENTS

| | | |
|---|---|---|
| JP | 2001-157300 A | 6/2001 |
| JP | 2002-118832 A | 4/2002 |

(Continued)

OTHER PUBLICATIONS

International Search Report and Written Opinion mailed on Jun. 7, 2022, received for PCT Application PCT/JP2022/009955, filed on Mar. 8, 2020, 9 pages including English Translation.

*Primary Examiner* — Rasha S Al Aubaidi
(74) *Attorney, Agent, or Firm* — XSENSUS LLP

(57) ABSTRACT

An information processing apparatus includes an acquisition section configured to acquire a situation of a subject vehicle and a situation of another vehicle, a setting section configured to set, on the basis of the situation of the subject vehicle and the situation of the other vehicle, a position in the subject vehicle at which a sound image of an occupant riding in the other vehicle is localized, and a sound image localization processing section configured to localize the sound image of the occupant at the position set by the setting section. The acquisition section acquires at least a position of a seat in which the occupant is seated, and the setting section sets an empty seat in the subject vehicle as the position where the sound image of the occupant in the other vehicle is localized. The present technology is applicable to (Continued)

an information processing apparatus for controlling telepresence.

19 Claims, 47 Drawing Sheets

(56) References Cited

FOREIGN PATENT DOCUMENTS

| | | | |
|---|---|---|---|
| JP | 2009023486 A | 2/2009 |
| JP | 2010-067020 A | 3/2010 |
| JP | 2010237934 A | 10/2010 |
| JP | 2020-014072 A | 1/2020 |
| JP | 2021150835 A | 9/2021 |
| WO | WO-2013136499 A1 | 9/2013 |
| WO | 2020/016927 A1 | 1/2020 |
| WO | WO-2020167383 A1 | 8/2020 |
| WO | WO-2020172634 A1 | 8/2020 |

\* cited by examiner

FIG.2
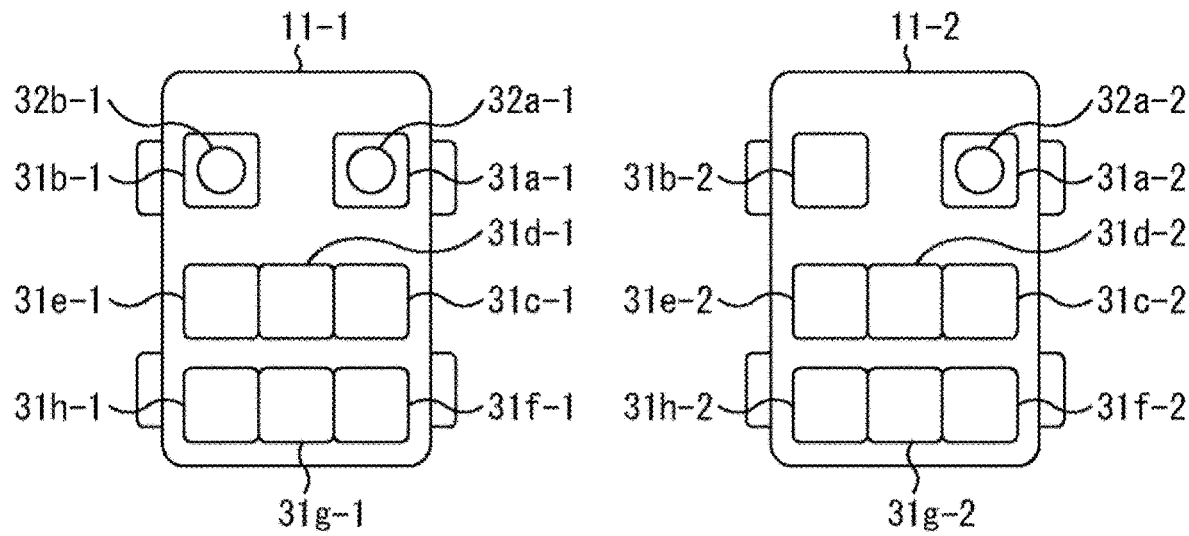
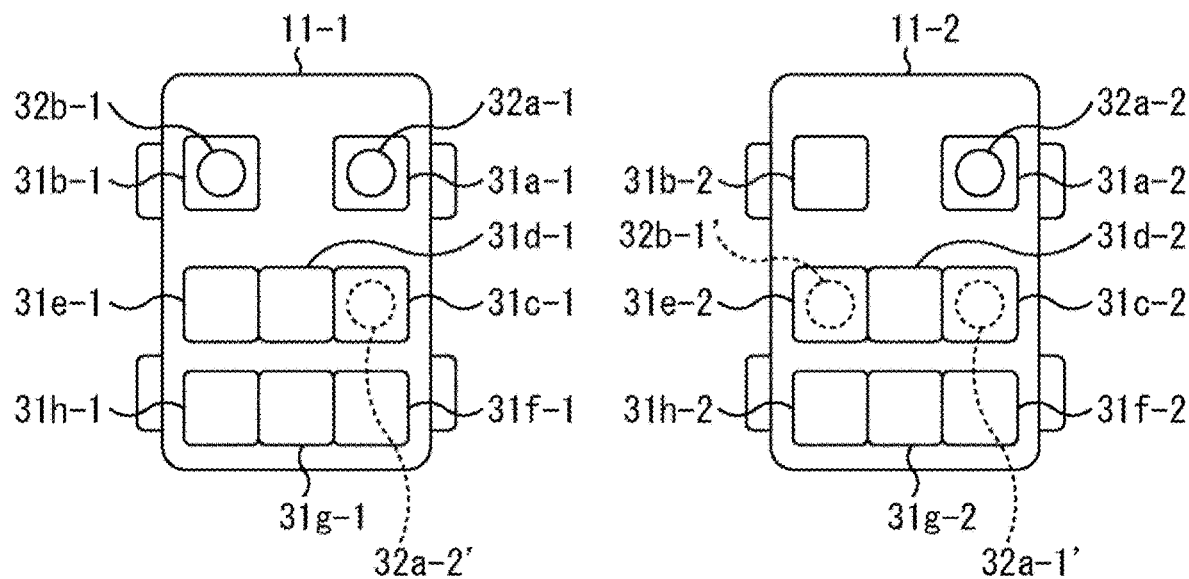

FIG.3
A
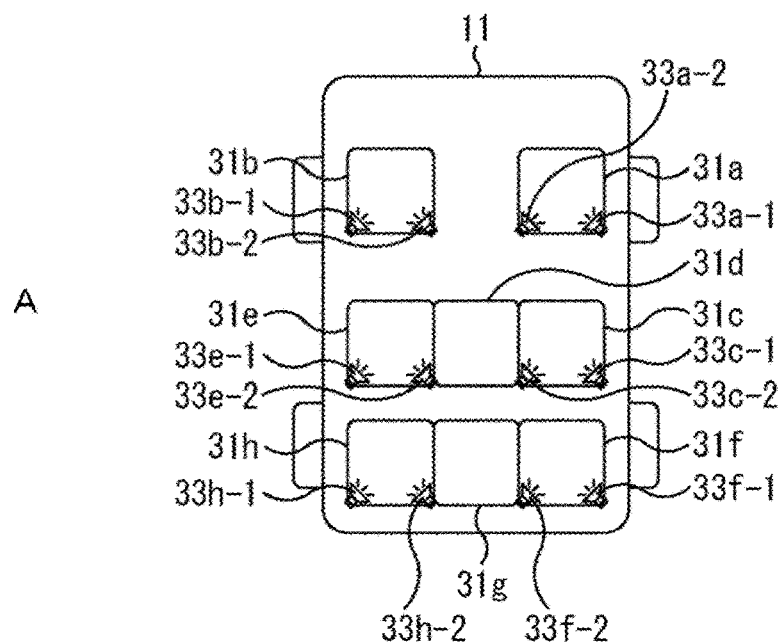
B
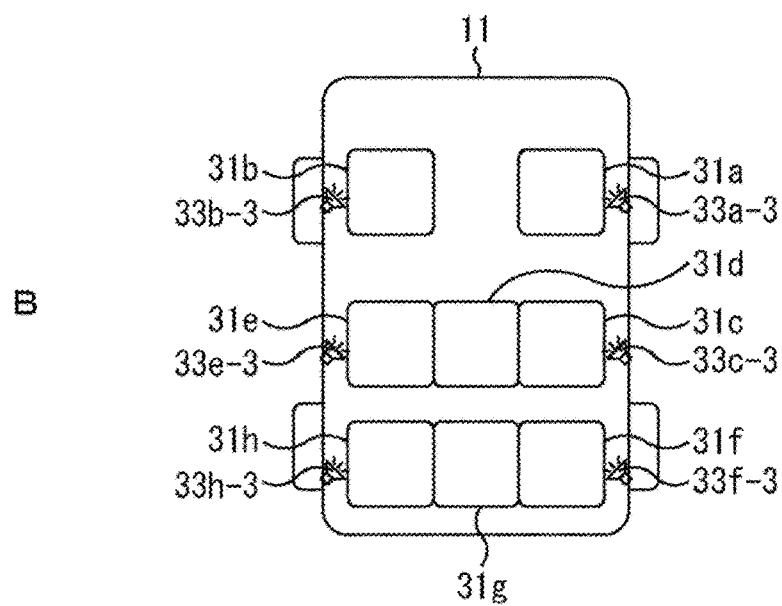

FIG. 6

| VEHICLE TYPE | SEAT | PREREGISTRATION PARAMETER | | | FRIEND'S VEHICLE |
|---|---|---|---|---|---|
| | | SPEAKER INFORMATION | OWNER INFORMATION | LICENSE PLATE | |
| | | | | | |

| DESTINATION | MATCHING SETTING | ITINERARY | KEYWORD |
|---|---|---|---|
| | PRIVATE/PUBLIC | | |

92 DEPARTURE REGISTRATION PARAMETER

F I G . 1 3

| CLASSIFICATION | CONDITION | | EFFECT |
|---|---|---|---|
| | DETAILS | | |
| ITINERARY | DESTINATIONS MATCH | | OCCUPANTS CAN EXCHANGE INFORMATION REGARDING DESTINATION WITH EACH OTHER |
| | NEXT SCHEDULES MATCH | | OCCUPANTS CAN MANAGE THEIR SCHEDULES AND REMIND OTHERS ABOUT SCHEDULE |
| OCCUPANT INFORMATION | GROUP COMPOSITIONS OF OCCUPANTS ARE SIMILAR | | OCCUPANTS OF SAME AGE GROUP CAN HAVE CONVERSATION TOGETHER |
| SITUATION OF OR AROUND VEHICLE | NEARBY OBJECTS (MOUNTAINS, SEA, OR BUILDINGS) ARE SIMILAR | | OCCUPANTS CAN TALK ABOUT COMMON TOPIC AND EASILY MAKE FRIENDS WITH EACH OTHER |
| | SPEEDS MATCH | | OCCUPANTS CAN EXCHANGE INFORMATION REGARDING CONGESTION WITH EACH OTHER |
| | DISTRICTS OF LICENSE PLATES MATCH | | OCCUPANTS CAN TALK ABOUT COMMON TOPIC AND EASILY MAKE FRIENDS WITH EACH OTHER |
| | VEHICLE TYPES MATCH | | OCCUPANTS CAN TALK ABOUT COMMON TOPIC AND EASILY MAKE FRIENDS WITH EACH OTHER |
| TOPIC | KEYWORDS IN CONVERSATIONS MATCH | | OCCUPANT CAN SMOOTHLY JOIN CONVERSATION WITH OTHER OCCUPANTS SINCE THEY ARE TALKING ABOUT SAME TOPIC |
| | PRESET KEYWORDS MATCH | | OCCUPANTS CAN TALK ABOUT SOMETHING THAT THEY ARE INTERESTED IN |
| SITUATION INSIDE VEHICLE | VIEWING CONTENTS MATCH | | OCCUPANTS CAN TALK ABOUT COMMON TOPIC AND EASILY MAKE FRIENDS WITH EACH OTHER |

FIG.17
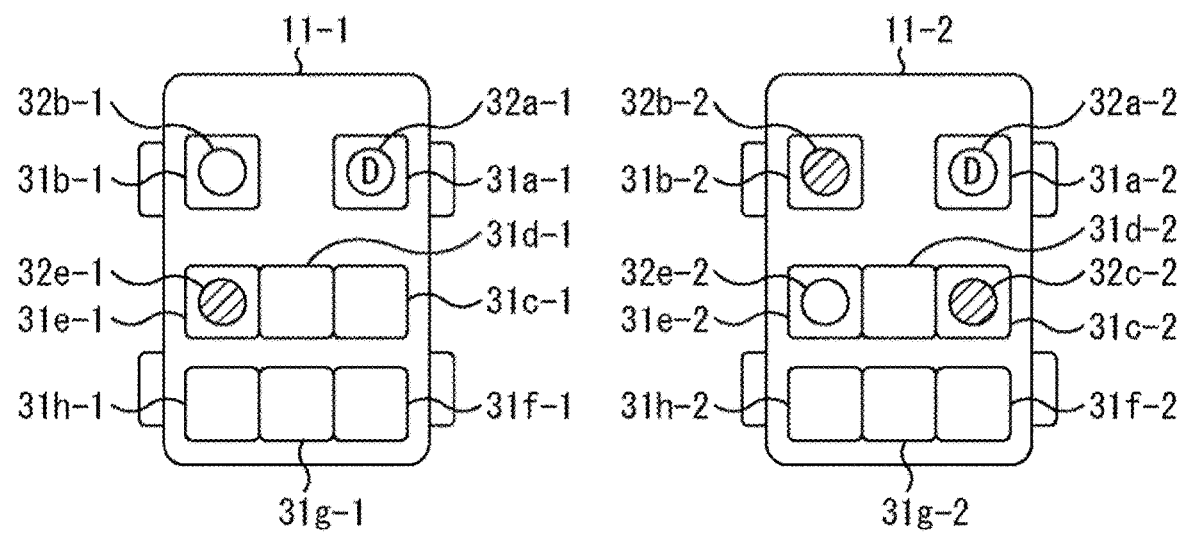
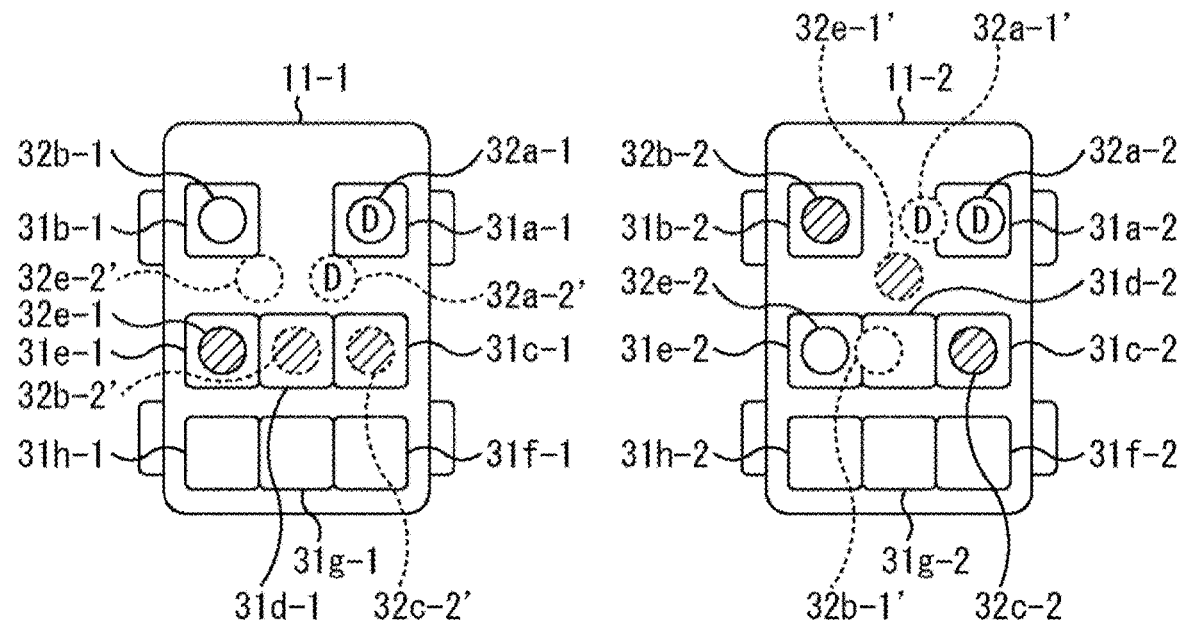

FIG.18

| GROUP | AGE |
|---|---|
| PRESCHOOL CHILD | 0-5 |
| ELEMENTARY SCHOOL STUDENT | 6-12 |
| JUNIOR HIGH AND HIGH SCHOOL STUDENTS | 13-18 |
| COLLEGE STUDENT | 19-24 |
| WORKING PROFESSIONAL | 25-60 |
| SENIOR | 61- |

FIG. 38
t1 DO YOU KNOW WHY ROAD IS CONGESTED?
t2 IT SEEMS THAT THERE HAS BEEN ACCIDENT
t3 HAVE CARS GOTTEN STUCK IN TRAFFIC?
t4 YES, THEY HAVE BEEN STOPPED FOR LONG TIME
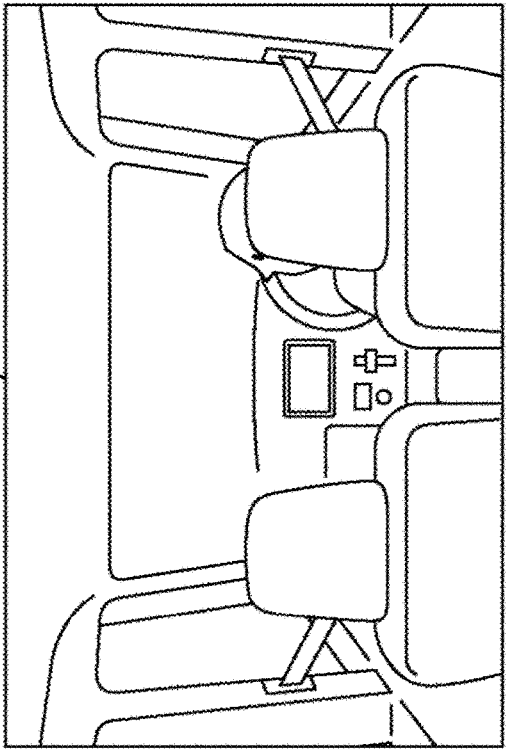
11-2
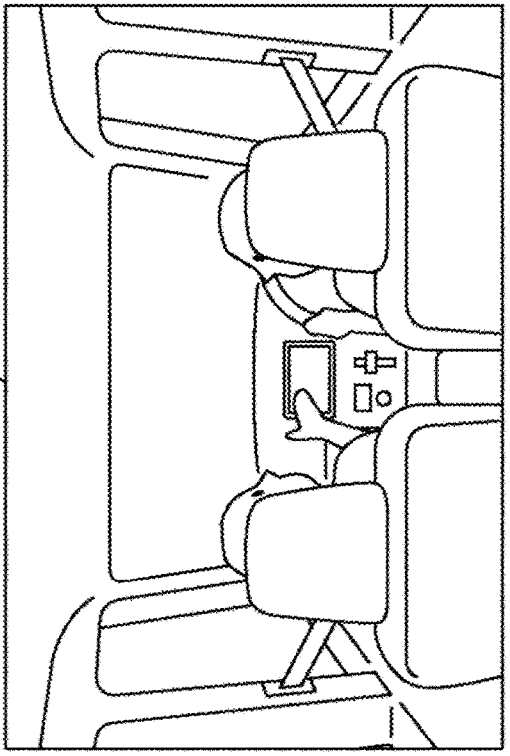
11-1

FIG.44
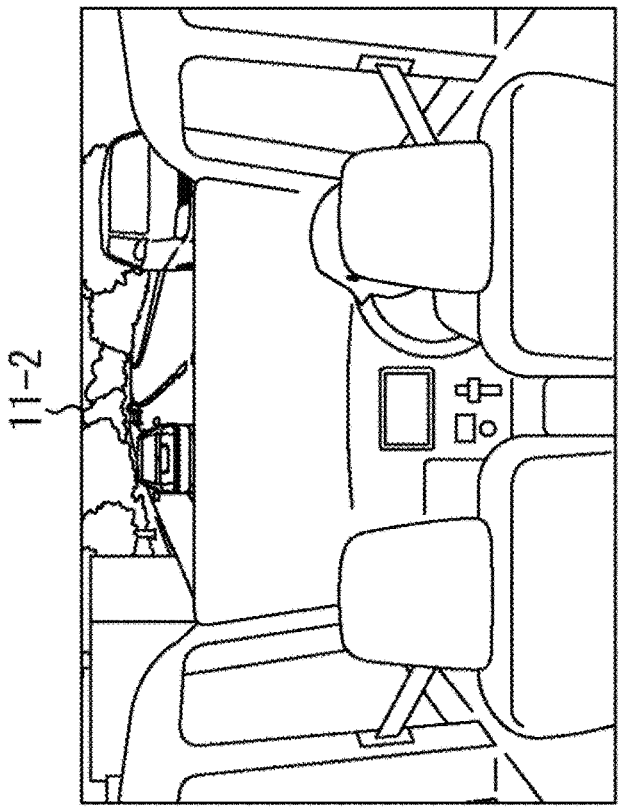
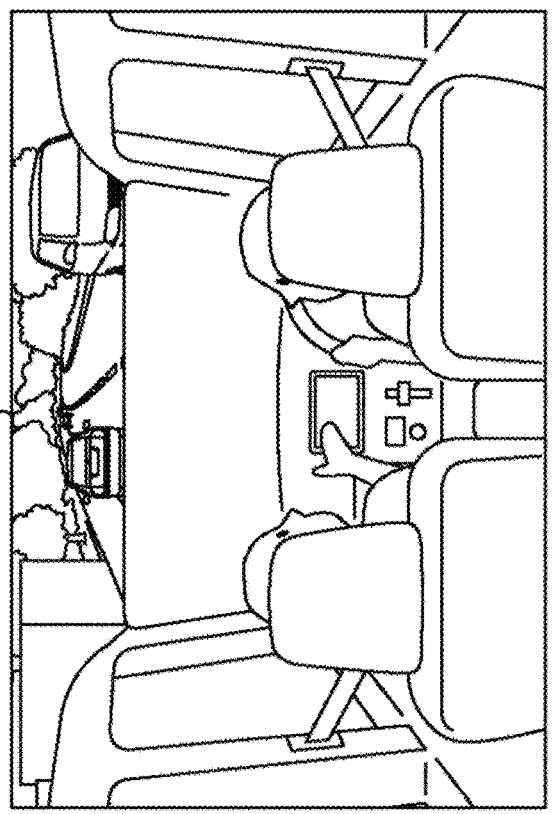

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2022/009955, filed Mar. 8, 2022, which claims priority from Japanese Patent Application No. 2021-041387, filed Mar. 15, 2021, the entire contents of each are incorporated herein by reference.

TECHNICAL FIELD

The present technology relates to an information processing apparatus, an information processing method, and a program, and, for example, to an information processing apparatus, an information processing method, and a program that allow users at different locations to communicate well with each other.

BACKGROUND ART

In the related art, there has been developed a telepresence system that can link remote spaces to each other via a video channel, an audio channel, and other information channels to make a user feel as if the space where the user is present were connected to another space and another user were present in the connected space (see, for example, PTL 1).

CITATION LIST

Patent Literature

[PTL 1]
JP 2002-118832A

SUMMARY

Technical Problem

PTL 1 proposes that a degree of attention be determined from lines of sight of users and that a seat be decided for each user depending on the degree of attention. Since the degree of attention is determined from the line of sight or the like, the determination of the degree of attention fails in a state where the users are not facing each other, and hence, seats may possibly fail to be decided.

There is a desire to enable optimum seating to be decided such that users can communicate well with each other.

In view of the circumstances as described above, an object of the present technology is to enable optimum seating to be decided such that users can communicate well with each other.

Solution to Problem

An information processing apparatus according to an aspect of the present technology is an information processing apparatus including an acquisition section configured to acquire a situation of a subject vehicle and a situation of another vehicle, a setting section configured to set, on the basis of the situation of the subject vehicle and the situation of the other vehicle, a position in the subject vehicle at which a sound image of an occupant riding in the other vehicle is localized, and a sound image localization processing section configured to localize the sound image of the occupant at the position set by the setting section.

An information processing method according to an aspect of the present technology is an information processing method including, by an information processing apparatus, acquiring a situation of a subject vehicle and a situation of another vehicle, setting, on the basis of the situation of the subject vehicle and the situation of the other vehicle, a position in the subject vehicle at which a sound image of an occupant riding in the other vehicle is localized, and localizing the sound image of the occupant at the set position.

A program according to an aspect of the present technology is a program causing a computer to acquire a situation of a subject vehicle and a situation of another vehicle, set, on the basis of the situation of the subject vehicle and the situation of the other vehicle, a position in the subject vehicle at which a sound image of an occupant riding in the other vehicle is localized, and localize the sound image of the occupant at the set position.

In the information processing apparatus, the information processing method, and the program according to the aspects of the present technology, on the basis of the situation of the subject vehicle and the situation of the other vehicle, the position at which the sound image of the occupant in the other vehicle is localized is set in the subject vehicle, and the sound image of the occupant is localized at the set position.

Note that the information processing apparatus may be an independent apparatus or an internal block constituting one apparatus.

Additionally, the program can be provided by being transmitted via a transmission medium or by being recorded in a recording medium.

BRIEF DESCRIPTION OF DRAWINGS

FIG. 2 is a diagram for describing seating arrangement.

FIG. 3 depicts diagrams for describing speaker arrangement.

FIG. 6 id a diagram for describing a preregistration parameter.

FIG. 7 is a diagram for describing a departure registration parameter.

FIG. 13 is a diagram for describing matching conditions.

FIG. 17 is a diagram for describing the seating arrangement processing.

FIG. 18 is a diagram for describing groups.

FIG. 38 is a diagram for describing the fourth embodiment.

FIG. 44 is a diagram for describing a ninth embodiment.

DESCRIPTION OF EMBODIMENTS

Modes for carrying out the present technology (hereinafter referred to as embodiments) will be described below.

System Configuration Example

Figure 1:
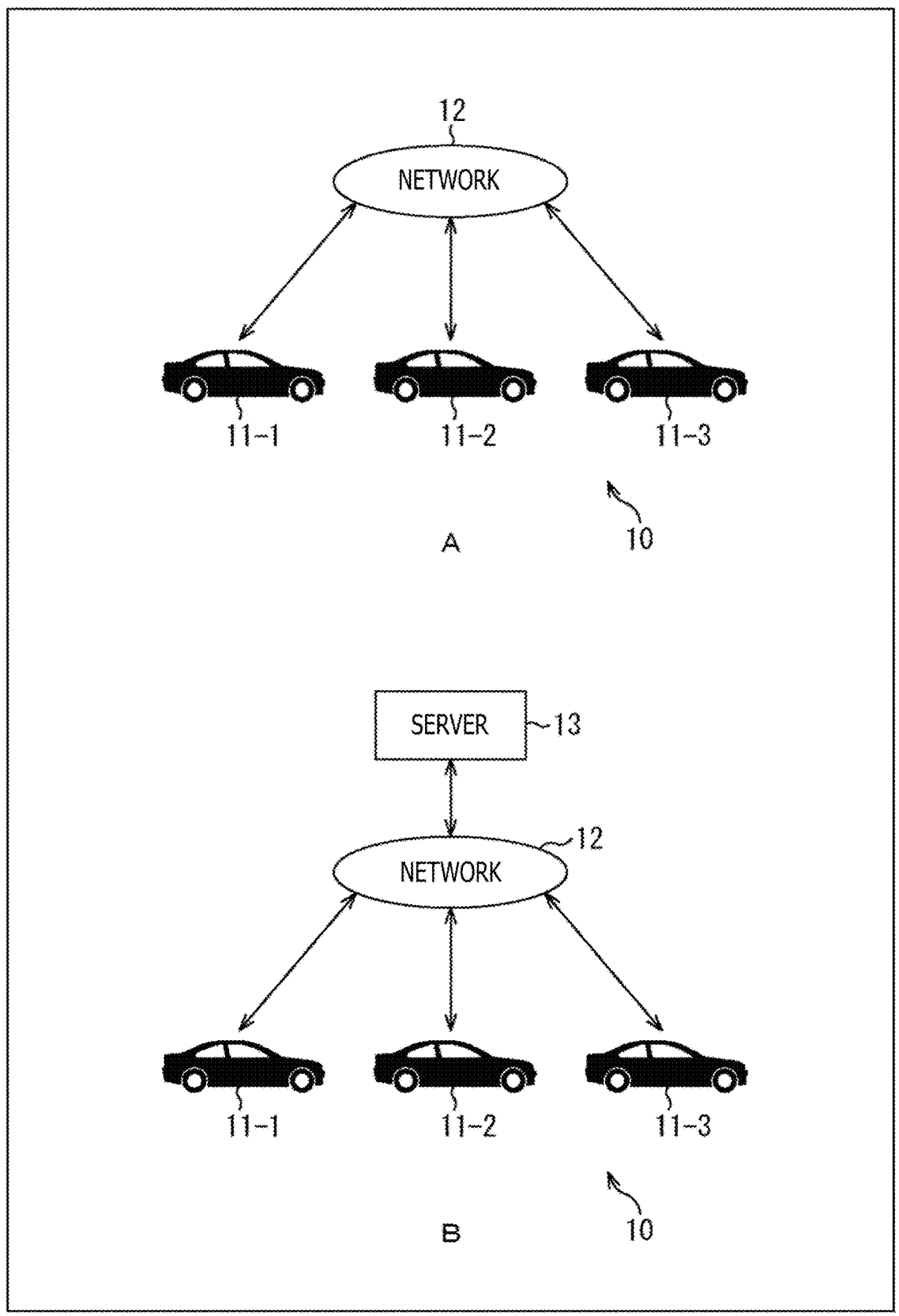
FIG. 1 depicts diagrams for illustrating a configuration example of an information processing system.

FIG. 1 depicts diagrams for illustrating a configuration of an embodiment of an information processing system to which the present technology is applied. An information processing system 10 depicted in A of FIG. 1 includes vehicles 11-1 to 11-3 and a network 12. In the information processing system 10 depicted in A of FIG. 1, the vehicles 11-1 to 11-3 are configured to transmit and receive data to and from one another via the network 12.

The information processing system 10 depicted in B of FIG. 1 includes the vehicles 11-1 to 11-3, the network 12, and a server 13. In the information processing system 10 depicted in B of FIG. 1, the vehicles 11-1 to 11-3 are configured to transmit and receive data to and from one another via the network 12 and the server 13.

In a case where the vehicles 11-1 to 11-3 need not be individually distinguished from one another, the vehicles 11-1 to 11-3 are simply described as the vehicles 11. The same applies to the other description.

The information processing system 10 to which the present technology is applied can make occupants in multiple vehicles 11 feel as if they were riding in the same vehicle 11 and were taking a drive together. This will be described with reference to FIG. 2.

As depicted in FIG. 2, the vehicle 11-1 is provided with seats 31a-1 to 31h-1, while the vehicle 11-2 is provided with seats 31a-2 to 31h-2. The vehicles 11-1 and 11-2 are each traveling. At a time point T1, in the vehicle 11-1, an occupant 32a-1 is in the seat 31a-1, and an occupant 32b-1 is in the seat 31b-1. In the vehicle 11-2, an occupant 32a-2 is in the seat 31a-2.

In the following description, the seats in the vehicle 11-1 are described as seats 31-1, and the occupants in the vehicle 11-1 are described as occupants 32-1. That is, reference signs including "–1" mean that they are related to the vehicle 11-1. Similarly, the seats in the vehicle 11-2 are described as the seats 31-2, and the occupants in the vehicle 11-2 are described as the occupants 32-1. That is, reference signs including "–2" mean that they are related to the vehicle 11-2.

In a case where a specific seat 31 is to be identified from the seats 31, for example, the seat is described as, for example, the seat 31a or the seat 31b. That is, alphabets included in reference signs represent the positions of the seats. For example, "the seat 31a-1" means that the seat is located in the front right of the vehicle 11-1. For example, "the occupant 32a-1" means an occupant seated in the seat 31a-1 located in the front right of the vehicle 11-1.

At a time point T2, when the vehicles 11-1 and 11-2 are matched with each other and enabled to communicate with each other, a virtual occupant 32a-2' is generated to make it appear as if the occupant 32a-2 in the vehicle 11-2 were seated in the seat 31c-1 in the vehicle 11-1.

In other words, a sound image of the occupant 32a-2 in the vehicle 11-2 is localized in the seat 31c-1 in the vehicle 11-1. With the sound image localized, when the occupant 32a-2 in the vehicle 11-2 says something, the virtual occupant 32a-2' utters what the occupant 32a-2 says (what the occupant 32a-2 says is output from the sound image localized in the seat 31c-1).

In the following description, for example, the virtual occupant 32a-2' being generated in the seat 31c-1 means that a sound output from a speaker is controlled in such a manner that a sound image of the occupant 32a-2 is localized in the seat 31c-1.

When a prime symbol is added to "the occupant 32," i.e., "the occupant 32'," it indicates that the occupant 32 is virtual. For example, the occupant 32-2' represents the occupant 32-2 who is actually in the vehicle 11-2 and who is presented to the occupant 32-1 in the vehicle 11-1 as a sound image in the vehicle 11-1.

In the vehicle 11-1, a state is created to make it appear as if the occupant 32a-1, the occupant 32b-1, and the occupant 32a-2' were present in the vehicle 11-1. The occupant 32a-1 and the occupant 32*b*-1 in the vehicle 11-1 can have a feeling as if they were taking a drive with the occupant 32*a*-2 in the other vehicle 11-2.

On the other hand, in the vehicle 11-2, a virtual occupant 32*a*-1' is generated to make it appear as if the occupant 32*a*-1 in the vehicle 11-1 were seated in the seat 31*c*-2 in the vehicle 11-2. Additionally, a virtual occupant 32*b*-1' is generated to make it appear as if the occupant 32*b*-1 in the vehicle 11-1 were seated in the seat 31*e*-2.

The occupant 32*a*-1' who is virtually present in the vehicle 11-2 utters what the occupant 32*a*-1 in the vehicle 11-1 says. The occupant 32*b*-1' who is virtually present in the vehicle 11-2 utters what the occupant 32*b*-1 in the vehicle 11-1 says.

In the vehicle 11-2, a state is created to make it appear as if the occupant 32*a*-1', the occupant 32*b*-1', and the occupant 32*a*-2 were present in the vehicle 11-2. The occupant 32*a*-2 in the vehicle 11-2 can have a feeling as if the occupant 32*a*-2 were taking a drive with the occupant 32*a*-1 and the occupant 32*b*-1 in the other vehicle 11-1.

As described above, the information processing system 10 can make the occupants in the multiple vehicles 11 feel as if they were riding in the same vehicle 11 and were taking a drive together.

Note that, in the following explanation, the vehicle 11-1 and the vehicle 11-2 are described by way of example, but processing can also be executed on multiple vehicles.

For example, the virtual occupant 32*a*-1' is generated by localizing, in a predetermined seat 31, what the occupant 32*a*-1 says, as described above. In other words, by creating a sound image of the occupant 32*a*-1 in the predetermined seat 31, a state is created to make it appear as if the occupant 32*a*-1 were seated in the predetermined seat 31 and said something.

A sound image of the occupant 32*a*-2 in the vehicle 11-2 is generated in the predetermined seat 31 in the vehicle 11-1. The sound image is generated by controlling a sound from a speaker provided in the vehicle 11-1. The number and arrangement of speakers provided in the vehicle 11 vary with the vehicle type and the like. FIG. 3 depicts an example of arrangement of speakers.

The arrangement of speakers depicted in A of FIG. 3 corresponds to arrangement of what is called seat speakers mounted in the vehicle. A speaker 33*a*-1 and a speaker 33*a*-2 are arranged at the seat 31*a*. A speaker 33*b*-1 and a speaker 33*b*-2 are arranged at the seat 31*b*. A speaker 33*c*-1 and a speaker 33*c*-2 are arranged at the seat 31*c*.

A speaker 33*e*-1 and a speaker 33*e*-2 are arranged at the seat 31*e*. A speaker 33*f*-1 and a speaker 33*f*-2 are arranged at the seat 31*f*. A speaker 33*h*-1 and a speaker 33*h*-2 are arranged at the seat 31*h*. As described above, two speakers 33 are arranged at each seat. Note that, in the illustrated example, no speakers are arranged at the seat 31*d* and the seat 31*g*, but the speakers 33 may also be arranged at each of the seats 31*d* and 31*g*.

In the arrangement of speakers depicted in B of FIG. 3, a speaker 33*a*-3 is arranged on the right of the seat 31*a*, while a speaker 33*b*-3 is arranged on the left of the seat 31*b*. A speaker 33*c*-3 is arranged on the right of the seat 31*c*, while a speaker 33*e*-3 is arranged on the left of the seat 31*e*. A speaker 33*f*-3 is arranged on the right of the seat 31*f*, while a speaker 33*h*-3 is arranged on the left of the seat 31*h*.

The number and positions of the arranged speakers 33 vary between the vehicles 11. By performing control to localize a sound image according to the number and positions of the arranged speakers 33, a sound image of the occupant 32 who is in the other vehicle 11 can be localized in the predetermined seat 31 as described above.

<Configuration of Information Processing Apparatus>

Figure 4:
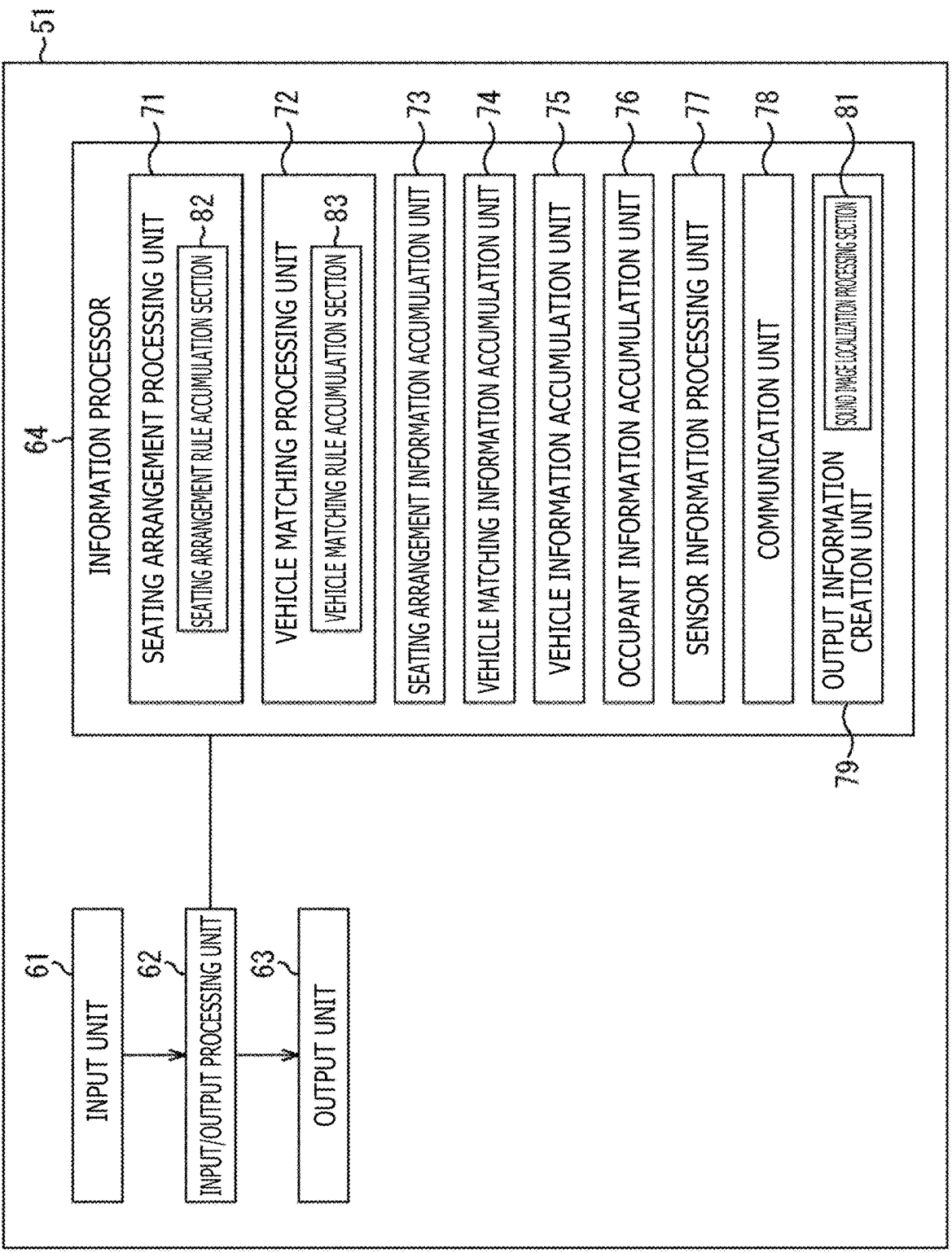
FIG. 4 is a diagram for describing a configuration example of an information processing apparatus.

A configuration of an information processing apparatus for executing processing related to the localization of a sound image as described above will be described. FIG. 4 is a diagram depicting a configuration of an information processing apparatus 51 used in a case where the vehicles 11 communicate directly with each other and execute processing related to the localization of sound images as in the information processing system 10 depicted in A of FIG. 1. The information processing apparatus 51 is mounted in each vehicle 11.

The information processing apparatus 51 depicted in FIG. 4 includes an input unit 61, an input/output processing unit 62, an output unit 63, and an information processor 64. The information processor 64 includes a seating arrangement processing unit 71, a vehicle matching processing unit 72, a seating arrangement information accumulation unit 73, a vehicle matching information accumulation unit 74, a vehicle information accumulation unit 75, an occupant information accumulation unit 76, a sensor information processing unit 77, a communication unit 78, and an output information creation unit 79. The seating arrangement processing unit 71 includes a seating arrangement rule accumulation section 82. The vehicle matching processing unit 72 includes a vehicle matching rule accumulation section 83. The output information creation unit 79 includes a sound image localization processing section 81.

Figure 5:
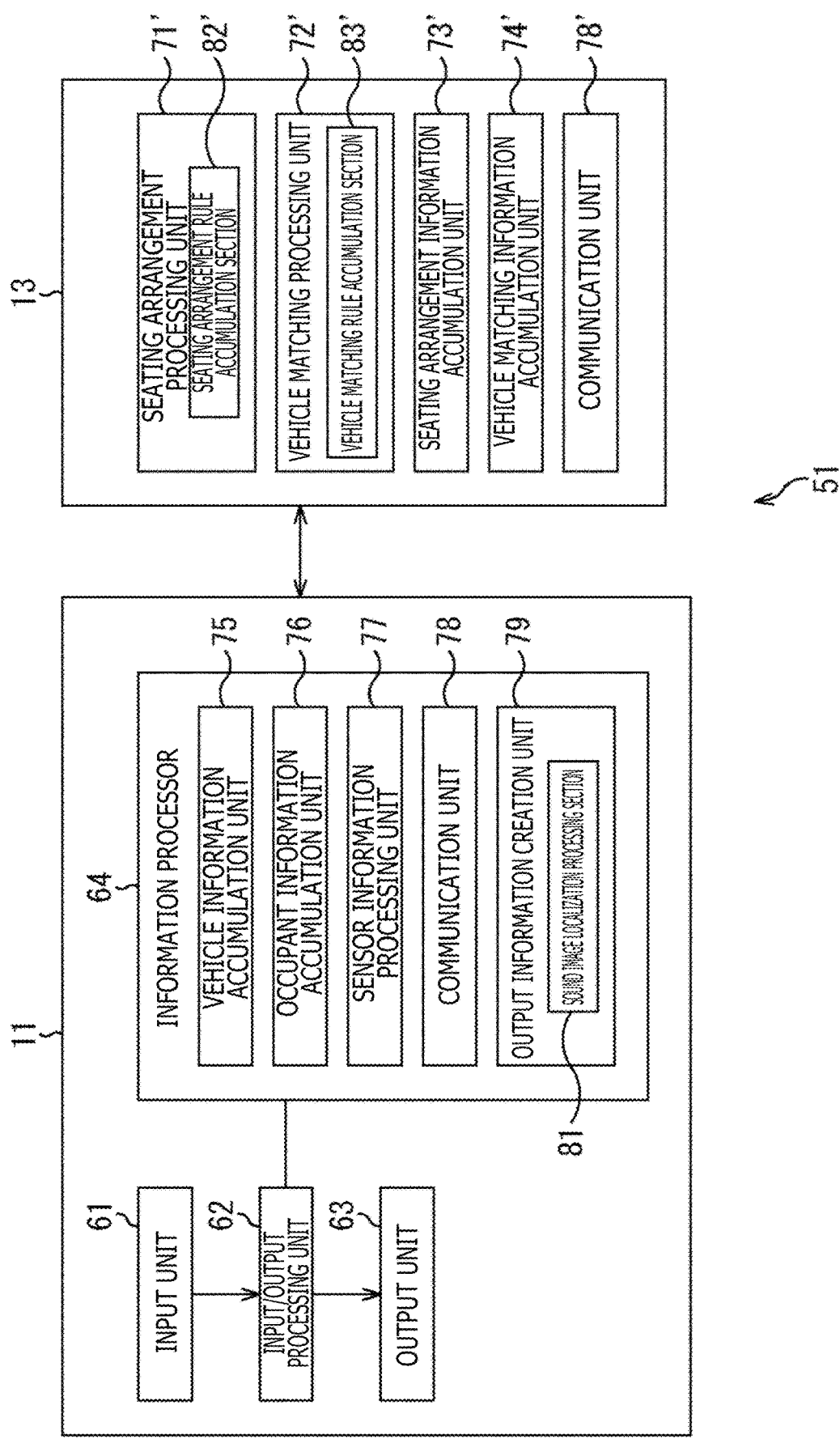
FIG. 5 is a diagram for describing another configuration example of the information processing apparatus.

In a case where the vehicles 11 communicate with each other via the server 13 as in the information processing system 10 depicted in B of FIG. 1, part of processing of the information processing apparatus 51 is executed on the server 13 side. In this case, a configuration as depicted in FIG. 5 can be used. FIG. 5 is a diagram illustrating a configuration example of the information processing apparatus 51 where the components thereof are divided into the vehicle 11 side and the server 13 side.

In the configuration of the information processing apparatus 51 depicted in FIG. 5, the server 13 includes a seating arrangement processing unit 71', a vehicle matching processing unit 72', a seating arrangement information accumulation unit 73', and a vehicle matching information accumulation unit 74' corresponding to the seating arrangement processing unit 71, the vehicle matching processing unit 72, the seating arrangement information accumulation unit 73, and the vehicle matching information accumulation unit 74 of the information processing apparatus 51 depicted in FIG. 4. Additionally, the server 13 also includes a communication unit 78' that communicates with the communication unit 78 provided on the vehicle 11 side.

The input unit 61 is an input device for acquiring the situation of the occupants, the traveling situation of the vehicle, and operations made by the occupants. For example, the input unit 61 includes an image sensor, a depth sensor, a touch sensor, and the like. The image sensor may be a visible light camera, an infrared camera, or the like that can acquire two-dimensional videos.

The depth sensor is a sensor that can acquire three-dimensional information involving depth, and may be a stereo camera or a sensor based on the time of flight method or the structured light method.

The input unit 61 receives information related to the traveling condition of the vehicle 11 and also receives, for example, information indicating whether or not the vehicle is an automated vehicle. The input unit 61 receives input information through an operation made by a user (occupant)

and also receives input information through an operation made on a touch display, voice control, gesture control using skeleton information, or the like.

The input/output processing unit 62 implements a function of receiving input information from the input unit 61 and displaying graphics to the occupant. The input/output processing unit 62 may be a control layer of a general OS (Operation System) such as a window that displays applications, the control layer controlling rendering of multi-content and distributing events such as touches for each piece of content.

The input/output processing unit 62 feeds the information processor 64 with information that is output from the input unit 61 and that is required for the information processor 64 to execute matching processing and seating arrangement processing to be described later. Examples of the information fed to the information processor 64 include an image used to identify the seat in which the occupant is seated, an image used to estimate the facial expression of the occupant, and a voice used to acquire information regarding a conversation.

The output unit 36 presents the created output information to the occupant. Sounds are presented by the speakers 33, headphones, or the like. Visual information is presented by, for example, a liquid crystal screen such as a display of a projector or a display of a navigation system.

In the seating arrangement processing unit 71 holds, in the seating arrangement rule accumulation section 82 thereof, a seating arrangement rule concerning how to arrange virtual occupants between the multiple vehicles 11 that are matched with each other in the matching processing executed by the vehicle matching processing unit 72 to be described later. The seating arrangement processing unit 71 executes the seating arrangement processing on the basis of the seating arrangement rule.

The seating arrangement processing unit 71 arranges seating by using information regarding the arrangement of the seats in the vehicles, information regarding seats in which occupants are seated in the vehicles, the ages of the occupants, the details of a conversation among the occupants, the facial expressions of the occupants, and the like. These pieces of information include information accumulated in the vehicle information accumulation unit 75, information accumulated in the occupant information accumulation unit 76, information acquired by the sensor information processing unit 77, and the like. The above information is acquired from each unit as required, and the seating arrangement processing is executed.

The vehicle matching processing unit 72 includes the vehicle matching rule accumulation section 83, and executes the matching processing on the basis of a rule for selecting multiple vehicles to be matched with each other from among multiple vehicles accumulated in the vehicle matching rule accumulation section 83. The matching processing is executed by using information regarding a subject vehicle and information regarding another vehicle. As the information regarding the subject vehicle, information accumulated in the vehicle information accumulation unit 75 is used. As the information regarding the other vehicle, information acquired via the communication unit 78 is used.

The seating arrangement information accumulation unit 73 holds information regarding seating arrangement resulting from the seating arrangement processing executed by the seating arrangement processing unit 71. The seating arrangement information accumulated in the seating arrangement information accumulation unit 73 is referenced when the sound image localization processing section 81 executes processing for localizing a sound image of a virtual occupant at a position where the virtual occupant is arranged.

The vehicle matching information accumulation unit 74 holds information regarding the vehicles 11 matched with each other by the vehicle matching processing unit 72. The accumulated information includes, for example, information regarding the ages and sexes of the occupants in the matched vehicles, the number of seats, information regarding the seats in which the occupants are seated, and the like. The information accumulated in the vehicle matching information accumulation unit 74 is referenced when the seating arrangement processing unit 71 executes the seating arrangement processing.

The vehicle information accumulation unit 75 holds information regarding the vehicles, such as the capacities and vehicle types of the vehicles 11, the current numbers of occupants in the vehicles 11, and the arrangement positions of the speakers 33. As depicted in FIG. 5, in a case where the components of the information processing apparatus 51 are divided into the vehicle 11 side and the server 13 side, pieces of vehicle information regarding all the vehicles participating in the system can be accumulated in the vehicle information accumulation unit 75' of the server 13.

The occupant information accumulation unit 76 holds information regarding the ages and sexes of the occupants in the vehicles 11, for example. In the configuration involving the server 13, pieces of information regarding all the occupants participating in the system can be divided into groups for each vehicle 11 and held in the occupant information accumulation unit 76' of the server 13.

The sensor information processing unit 77 processes such information as the facial expressions and postures of the occupants, the speeds of the vehicles 11, GPS (Global Positioning System) information, and feeds the processed information to the vehicle information accumulation unit 75 as vehicle information and to the occupant information accumulation unit 76 as occupant information. The communication unit 78 communicates with the server 13 and the other vehicle 11. The communication unit 78 performs communication based on TCP/IP (Transmission Control Protocol/Internet Protocol) communication and the like.

The output information creation unit 79 creates, from sensor information, vehicle matching information, seating arrangement information, and the like, information to be output from the output unit 63. The output information creation unit 79 causes the sound image localization processing section 81 to execute processing for localizing a sound image in the predetermined seat 31, and causes the output unit 63 to execute processing for outputting a result of the processing. The sound image localization processing section 81 executes the processing for localizing a sound image of the virtual occupant by using the seating arrangement information accumulated in the seating arrangement information accumulation unit 73 and the vehicle information accumulated in the vehicle information accumulation unit 75 (mainly the information regarding the arrangement of the speakers 33).

<Parameters>

In a case where a sound image of an occupant in one vehicle 11 is to be generated in another vehicle 11, matching with the other vehicle 11 in which the sound image is to be generated is performed. Parameters set before the matching is performed will be described. FIG. 6 is a diagram illustrating an example of a preregistration parameter 91 preset by the user.

The preregistration parameter 91 includes the following items: "vehicle type," "seat," "speaker information," "owner information," "license plate," and "friend's vehicle." In the item "vehicle type," the vehicle type of the vehicle 11 in which the information processing system 10 is installed is registered.

In the item "seat," information such as available seats in the vehicle 11 and the positional relation among the seats, e.g., a seat located to the left of the first row and a seat located in the middle of the second row, is registered. The information registered in the item "seat" is referenced, for example, when a seat that is to be assigned to a virtual occupant is set (arranged), in other words, when a position where a sound image is to be localized is set.

In the item "speaker information," information such as the types and positions of the speakers 33 in the vehicle 11 is registered. The information registered in the item "speaker information" is referenced, for example, when a method for presenting a sound image is determined.

Note that, once the vehicle type is registered, the seat or speaker information may be acquired and registered by search on the Internet for the information according to the vehicle type.

In the item "owner information," information such as the name, age, sex, face information, and the like of the owner of the vehicle is registered. The information registered in the item "owner information" is referenced, for example, when face authentication is performed.

Note that information regarding multiple occupants who may ride in the vehicle 11 may be registered as the owner information. Registering information regarding multiple occupants enables, for example, accurate and appropriate execution of processing such as face authentication and calculation of the level of smiling, which will be described later.

In the item "license plate," information such as the license number and registration district of the vehicle 11 is registered. The information registered in the item "license plate" is referenced, for example, when vehicle matching is performed.

In the item "friend's vehicle," the account of a vehicle of a family or a friend is registered. The information registered in the item "friend's vehicle" is referenced, for example, when the vehicle matching is performed.

The information registered as the preregistration parameter 91 may be information other than the above-described information, or information other than the above-described information may additionally be registered.

FIG. 7 is a diagram illustrating an example of a departure registration parameter 92 registered when the information processing system 10 is used. The departure registration parameter 92 includes the following items: "destination," "matching setting," "itinerary," and "keyword."

In the item "destination," the destination of the drive is registered. The information processing system 10 is operable even in a case where no destination is registered in the item "destination." The item "destination" is used to match the vehicle 11 with the other vehicle 11 during the vehicle matching or is set as a search target which is used when matching with the other vehicle 11 is performed.

In the item "matching setting," "public" is set in a case where matching with the vehicle 11 owned by a stranger is desired, whereas "private" is set in a case where matching with the vehicle 11 owned by an acquaintance is desired.

In a case where "public" is set, when the matching between the vehicles 11 is performed, the matching is performed on all the vehicles using the system.

In a case where "private" is set, the matching is performed on the preregistered vehicles 11 in such a manner that acquaintances such as friends or family members are matched with each other. The preregistered vehicles 11 are vehicles registered in the item "friend's vehicle" of the preregistration parameter 91. In a case where "private" is set, the user may register the vehicle 11 to be matched with the subject vehicle.

In the item "itinerary," information such as stops along the way to the destination and scheduled times and places for meals is registered. The information registered in the item "itinerary" is referenced, for example, during the matching between the vehicles 11 or during dynamic seating arrangement processing (described later). As itinerary information, information regarding a certain time at which people usually do something, e.g., people usually have lunch at 12 o'clock, may be registered in the item "itinerary."

In the item "keyword," keywords that are related to topics about which the user intends to talk during driving, subjects that the user is interested in, and the like are registered. The information registered in the item "keyword" is referenced during the matching between the vehicles 11.

The information registered as the departure registration parameter 92 may be information other than the above-described information, or information other than the above-described information may additionally be registered.

With reference to these parameters, processing such as the matching between the vehicles 11 and presentation of a sound image is executed.

<Processing by Information Processing Apparatus>

With reference to a flowchart in FIG. 6, processing performed by the information processing apparatus 51 will be described. Here, a case where the vehicles 11 communicate directly with each other in the information processing system 10 depicted in A of FIG. 1 and a case where each vehicle 11 is equipped with the information processing apparatus 51 depicted in FIG. 4 will be described by way of example.

In the following description, one of the vehicles 11 to be matched with each other is assumed to be a subject vehicle 11-1, and the other is assumed to be another vehicle 11-2. In the following description, the processing illustrated in FIG. 6 is assumed to be executed by the information processing apparatus 51 mounted in the subject vehicle 11-1. Similarly, the processing of the flowchart illustrated in FIG. 6 is basically executed in the other vehicle 11-2.

In step S11, the seating positions of the occupants in the subject vehicle 11-1 are acquired. For example, the subject vehicle 11-1 may include an image capturing device that captures an image of the interior of the subject vehicle 11-1, and the image captured by the image capturing device may be analyzed to identify the number of occupants in the subject vehicle 11-1 and the seats in which the occupants are seated. The occupant may operate the input unit 61 of the information processing apparatus 51 to input the number of occupants in the subject vehicle 11-1 and the positions of the seats, and the input information may be acquired.

The seats may be provided with, for example, pressure sensors, thermal sensors, and the like, and information obtained from the sensors may be analyzed to identify the number of occupants in the subject vehicle 11-1 and the positions of the seats.

The processing in step S11 is executed when the sensor information processing unit 77 (FIG. 4) acquires images and operation data from the image capturing device or a user interface which is provided as the input unit 61, and processes the acquired images and operation data. The acquired information regarding the occupants is accumulated in the vehicle information accumulation unit 75.

In step S12, the seating positions of the occupants in the other vehicle 11-2 are acquired. Also in the other vehicle 11-2, information related to the number of occupants in the other vehicle 11-2 and the positions of the seats is acquired and accumulated in the vehicle information accumulation unit 75 of the other vehicle 11-2, as is the case with the subject vehicle 11-1. The accumulated information is fed from the other vehicle 11-2 to the subject vehicle 11-1.

In step S13, the vehicle matching processing is executed. The vehicle matching processing executed in step S13 will be described with reference to the flowchart in FIG. 9. The vehicle matching processing unit 72 includes rules for executing the vehicle matching processing described with reference to FIG. 9, the rules being accumulated in the vehicle matching rule accumulation section 83. The vehicle matching processing unit 72 executes the vehicle matching processing on the basis of the accumulated rules.

In step S31, whether or not any vehicle is registered as a favorite is determined. For example, with reference to the preregistration parameter 91 (FIG. 6), whether or not any vehicle is registered in the item "friend's vehicle" is determined. For example, a mechanism may be provided in which the user registers, before driving, a vehicle to be matched with the subject vehicle, and in a case where any vehicle is registered, the registered vehicle may be determined to be the vehicle registered as a favorite.

In step S31, in a case where it is determined that there is a vehicle registered as a favorite, the processing proceeds to step S32. In step S32, matching with the favorite vehicle 11 is performed. For example, in a case where the other vehicle 11-2 is registered as a favorite vehicle in the subject vehicle 11-1, the subject vehicle 11-1 is matched with the other vehicle 11-2.

In a case where multiple vehicles 11 are registered as favorites, matching with the multiple vehicles 11 is performed.

On the other hand, in step S31, in a case where it is determined that no vehicle is registered as a favorite, the processing proceeds to step S33. In step S33, a rule is set such that the vehicles 11 travelling near each other are matched with each other.

In step S34, it is determined whether or not the matching condition is related to the distance, and whether or not the nearest vehicle has been changed. As the vehicle 11 to be matched with the subject vehicle 11-1, whether or not any other vehicle 11-2 is traveling near the subject vehicle 11-1 is determined. When the other vehicle 11-2 has already been matched with the subject vehicle 11-1 and sound images have been presented in the subject vehicle 11-1, it is determined in step S34 whether or not the matched other vehicle 11-2 remains the same as the other vehicle 11-2 traveling near the subject vehicle 11-1.

In step S34, in a case where it is determined that the matching condition is related to the distance and that the nearest vehicle has been changed, the processing proceeds to step S35. In step S35, the vehicles near each other are matched with each other. For example, in a case where the vehicle 11 determined to be the nearest to the subject vehicle 11-1 is the other vehicle 11-2, the subject vehicle 11-1 and the other vehicle 11-2 are matched with each other.

For example, in a case where, while the subject vehicle 11-1 and the other vehicle 11-2 are being matched with each other, the vehicle 11 travelling nearest to the subject vehicle 11-1 changes from the other vehicle 11-2 to another vehicle 11-3, the subject vehicle 11-1 and the other vehicle 11-3 are matched with each other.

Note that, since the distance between the vehicles 11 often changes during traveling, the vehicle 11 matched with the subject vehicle 11-1 may frequently be changed during the execution of the processing in step S34. Accordingly, processing subsequent to step S34 may be executed when a predetermined length of time has elapsed since the execution of matching, or when the matched vehicle is determined to be changed as described later.

When the vehicles 11 with a short distance therebetween are matched with each other as described above, a situation can be created in which occupants in the vehicles 11 can find a common topic from the traveling location to promote their conversation.

On the other hand, in step S34, in a case where the matching condition is determined not to be related to the distance and/or the nearest vehicle is determined to be unchanged, the processing proceeds to step S36. In step S36, it is determined whether or not the frequency of talks has decreased and/or whether or not the level of smiling has decreased.

Such determination is made in order to cancel the matching between the vehicles 11 matched with each other in a case where the occupants in the matched vehicles 11 are not having a good conversation, and to match the subject vehicle 11-1 with another vehicle 11. The processing for determining whether the frequency of talks has decreased and the processing for determining whether the level of smiling has decreased will described below.

In step S34, in a case where the frequency of talks is determined not to have decreased and the level of smiling is determined not to have decreased, the matching between the vehicles 11 matched with each other remains unchanged.

On the other hand, in step S34, in a case where the frequency of talks is determined to have decreased and/or the level of smiling is determined to have decreased, the processing proceeds to step S37. In step S37, whether or not any vehicle satisfies a condition 1 and/or a condition 2 is determined.

The condition 1 is a condition that, when the degree of matching in the style of the interior decoration in the vehicle is measured, the degree of matching is equal to or greater than a predetermined threshold. In a case where the condition 1 is satisfied, the occupants may have similar tastes and preferences. Hence, it is conceivable that they may not only have a conversation about the interior decoration in the vehicle, but also make the conversation deeper and enjoy having a lively conversation about other topics, for example. Under the condition 1, the vehicles 11 in which such occupants as described above are riding are matched with each other.

The condition 2 is a condition that, when the degree of matching in the objects grasped by the occupants is measured, the degree of matching is equal to or greater than a predetermined threshold. For example, in a case where the occupants are holding foods in their hands, it is conceivable that the occupants may have a lively conversation about the foods or accessories worn on their hands. Under the condition 2, the vehicles 11 in which such occupants as described above are riding are matched with each other. Note that the condition 2 may include the degree of matching in accessories worn on body parts other than the hands, clothes, and the like.

Figure 10:
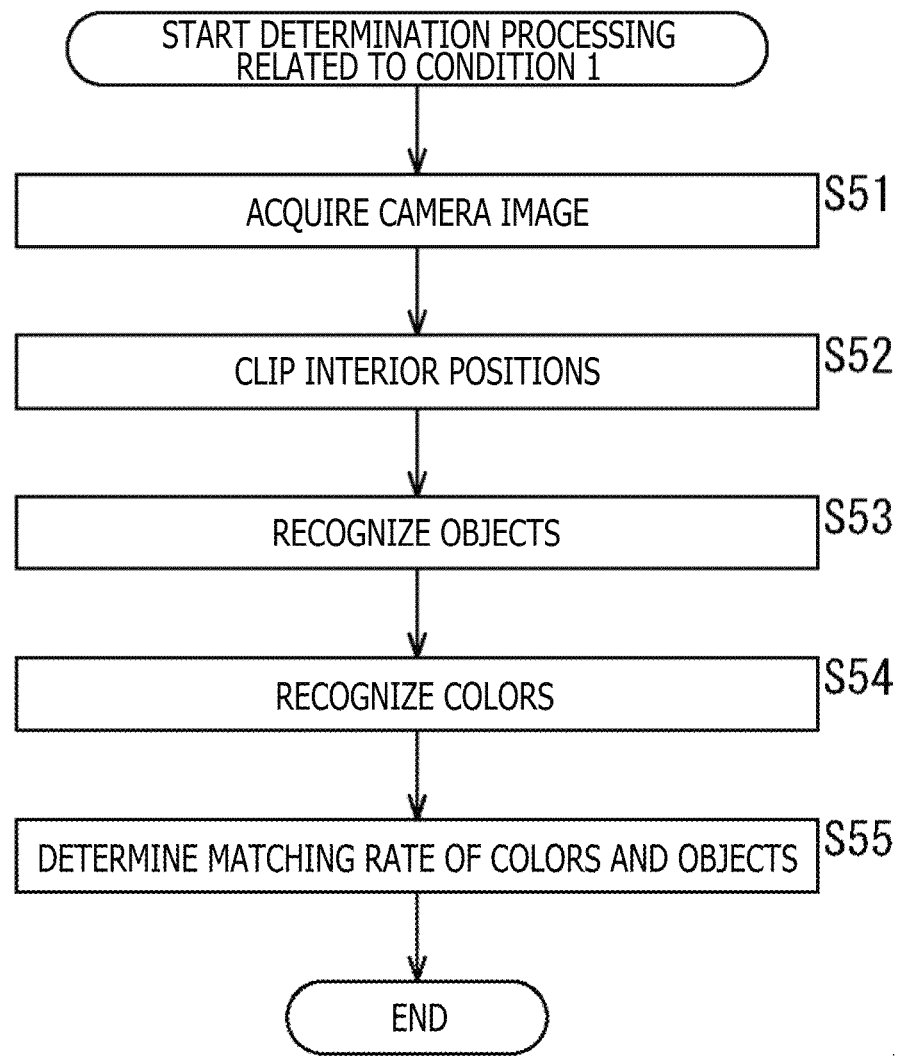
FIG. 10 is a flowchart for describing determination processing related to a condition 1.

The processing for determining whether or not the condition 1 is satisfied will be described with reference to a flowchart in FIG. 10. In step S51, an image captured by a camera is acquired. In step S52, an interior position is clipped.

In step S53, objects in the clipped area are recognized. In step S54, the colors of the recognized objects are recognized.

Figure 11:
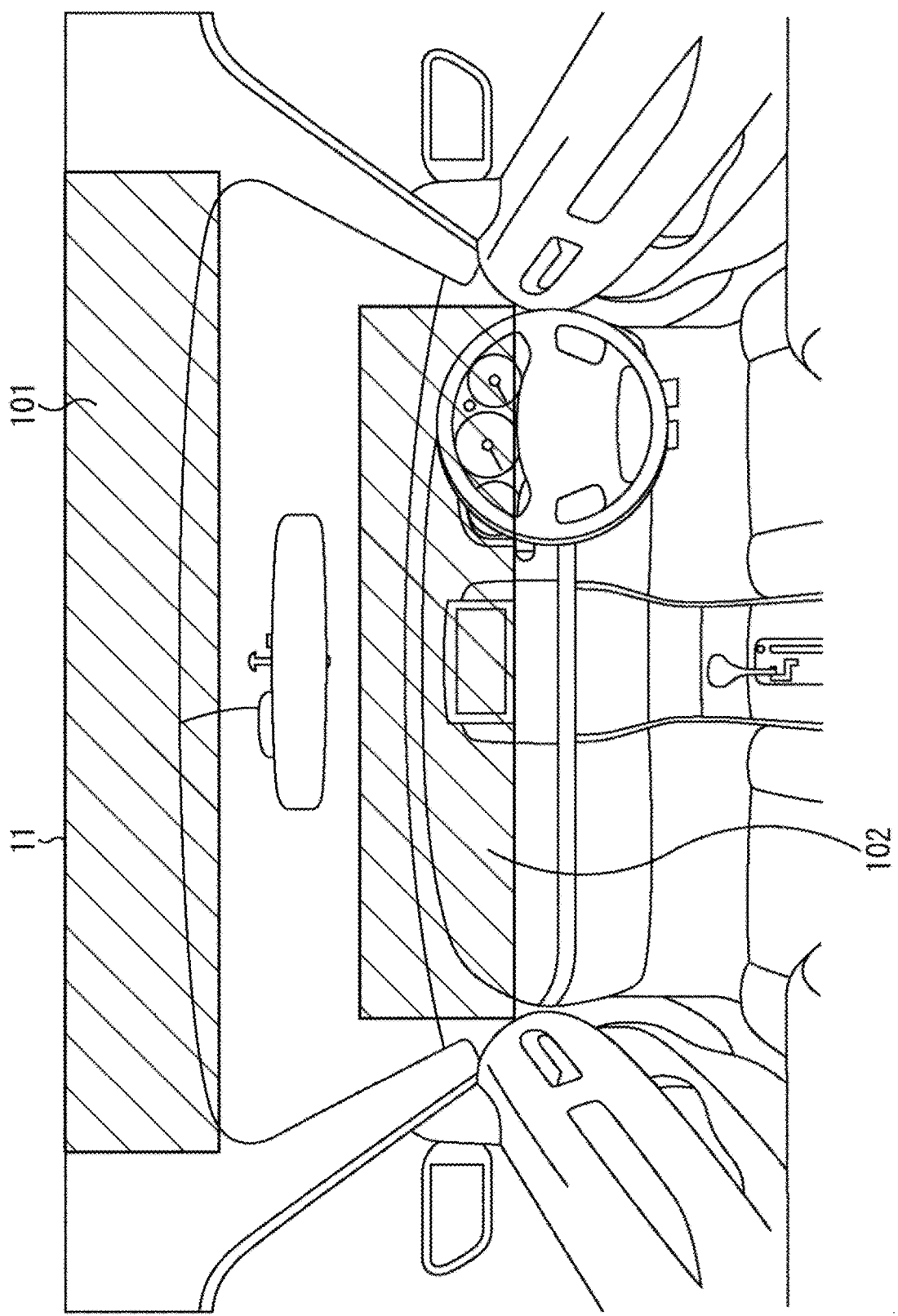
FIG. 11 is a diagram for describing clipped areas.

Such processing is executed by analyzing a captured image of the interior of the vehicle, for example, as depicted in FIG. 11. FIG. 11 depicts an example of a captured image of the interior of the vehicle 11, such as a windshield, a dashboard, and an instrument panel. A camera for capturing an image of an area around the windshield in the interior of the vehicle 11 is provided, and the image captured by the camera is acquired by the processing in step S51.

The clipped area can be, for example, an area 101 near the top of the windshield or an area 102 near the dashboard. The clipped area is registered by the user when the camera is mounted, or is registered by not the user but a predetermined program being executed when the camera is mounted.

In step S12, images of the area 101 and the area 102 are to be processed for the object recognition and the color recognition. For example, a stuffed toy or the like is placed or a car navigation system is installed, on the dashboard, that is, in the area 102 in this case. Such objects are referred to as interior accessories, and such interior accessories are detected by processing in step S53 and step S54.

In step S53, the objects (interior accessories) in the clipped area 101 and area 102 are recognized. In step S54, the colors of the recognized objects are recognized. In this way, what kind of object is placed in the interior and what color the object has are recognized. The objects and colors can be factors for inferring the preferences of the occupants in the vehicle 11. If the occupants have similar preferences, it is conceivable that they can easily find a common topic and are likely to have a lively conversation.

The processing in step S51 to step S54 is executed in both the subject vehicle 11-1 and the other vehicle 11-2, and a result of the processing is held in each vehicle 11. In step S5, the subject vehicle 11-1 acquires information regarding the interior accessories from the other vehicle 11-2, and compares the acquired information with information regarding the interior accessories in the subject vehicle 11-1, to determine the matching rates of colors and objects.

A threshold may be set in advance, and in a case where there is a vehicle 11 having a matching rate equal to or greater than the threshold, the vehicle 11 may be determined to satisfy the condition 1. Processing for calculating the matching rate may be executed on multiple other vehicles 11, and one of the multiple other vehicles 11 that has the highest matching rate may be set to the vehicle 11 satisfying the condition 1.

Figure 12:
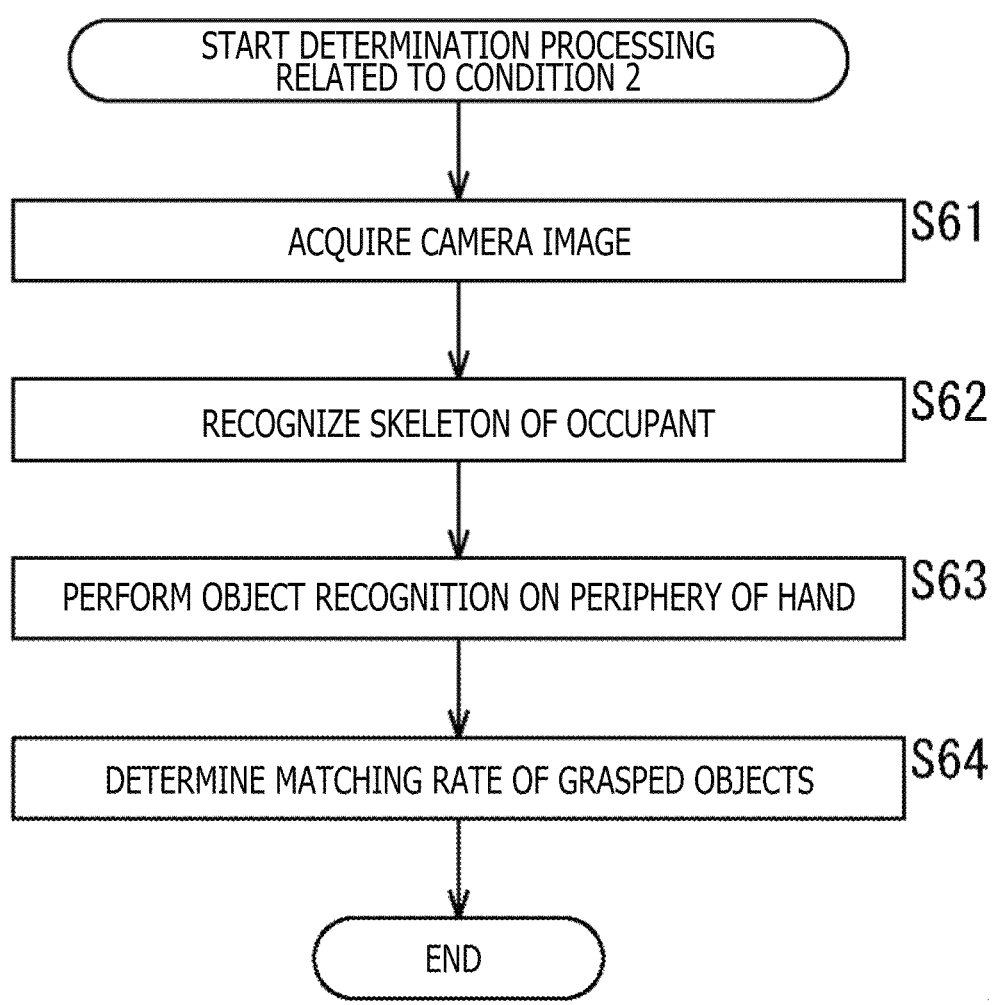
FIG. 12 is a flowchart for describing determination processing related to a condition 2.

With reference to a flowchart in FIG. 12, the processing for determining whether or not the condition 2 is satisfied will be determined. In step S61, an image captured by a camera is acquired. A camera for capturing an image of an occupant is provided in the interior of the vehicle 11, and the image captured by the camera is acquired.

In step S62, the acquired image is analyzed to detect the occupant, and the skeleton of the occupant is recognized. Here, an object held by the occupant in the hand is to be detected, and thus, it is sufficient if the skeleton of the hand is recognized.

In step S63, object recognition is performed on the periphery of the hand of the occupant. In step S64, the matching rate of the objects grasped by the occupants is determined.

The processing in step S61 to step S63 is executed in both the subject vehicle 11-1 and the other vehicle 11-2, and a result of the processing is held in each vehicle 11. In step S64, the subject vehicle 11-1 acquires information regarding the grasped object from the other vehicle 11-2, and compares the acquired information with information held in the subject vehicle 11-1 and related to a grasped object, to determine the matching rate of the matching between the grasped objects.

For example, when eating something, the occupant grasps a food, a spoon, or the like, and thus, the matching rate is high in a case where the grasped object is detected as a food. For example, when playing a game machine, the occupant grasps the game machine, and thus, the matching rate is high in a case where the grasped object is detected as the game machine.

A threshold may be set in advance, and in a case where there is a vehicle 11 having a matching rate equal to or greater than the threshold, the vehicle 11 may be determined to satisfy the condition 2. Processing for calculating the matching rate may be executed on multiple other vehicles 11, and one of the multiple other vehicles 11 that has the highest matching rate may be set to the vehicle 11 satisfying the condition 2.

Note that the matching rate may also be detected by detecting an object other than the one grasped in the hand or an object other than the one held in the hand. For example, clothes of the occupants may be recognized, and the matching rate of their clothes may be detected.

Described with reference to the flowchart illustrated in FIG. 9 again, it is determined in step S37 whether or not any vehicle 11 satisfies the condition 1 and/or the condition 2. In a case where it is determined that there is a vehicle 11 satisfying the condition 1 and/or the condition 2, the processing proceeds to step S38.

In step S38, matching with the vehicle 11 determined to satisfy the condition 1 or/and the condition 2 is performed. For example, in a case where the other vehicle 11-2 is the vehicle 11 determined to satisfy the condition 1 or/and the condition 2, the subject vehicle 11-1 is matched with the other vehicle 11-2.

On the other hand, in step S37, no vehicle 11 is detected which satisfies the condition 1 or the condition 2, the processing proceeds to step S39. In step S39, the vehicles 11 are matched with each other on the basis of the distance therebetween. The matching rule is changed such that the vehicles near each other are matched with each other, and the matching based on the distance between the vehicles 11 is performed by using the changed matching rule. Under the rule that the vehicles near each other are matched with each other, the matching between the vehicles 11 can be performed similarly to the processing in step S33.

The matching between the vehicles 11 is performed as described above. The vehicles 11 may be matched with each other by a method other than the matching method described above. Additionally, the matters as depicted in FIG. 13 may be taken into account for matching.

Alternatively, in a case where the subject vehicle 11-1 is matched with multiple other vehicles 11-2 by the above-described method, in order to narrow the multiple other vehicles 11-2 down to one or two other vehicles 11-2, a selection of the other vehicles 11-2 may be made on the basis of the matters as depicted in FIG. 13.

FIG. 13 is a diagram illustrating a further example of the matching method and depicting matching conditions in association with the effects of the conditions. The vehicles 11 may be classified according to "itinerary." For example, the vehicles 11 with the same destination may be matched with each other, or the vehicles 11 with the same next scheduled event may be matched with each other. In a case where matching is performed on the basis of the itinerary, the occupants can have a lively conversation by exchanging information regarding the destination, manage the schedule, or remind each other of the schedule.

The vehicles 11 may be classified by using "occupant information." For example, the vehicles 11 in which group compositions of occupants are similar may be matched with each other. In a case where matching is performed on the basis of the occupant information, the vehicles 11 can be matched with each other in such a manner that the occupants of the same age group can have a conversation together. Hence, the vehicles 11 in which the occupants who have something relatively in common to talk about are riding can be matched with each other.

The vehicles 11 can be classified by using "situation of or around vehicle." For example, when objects near the vehicles 11, such as mountains, the sea, or buildings, are similar, these vehicles 11 may be matched with each other. The occupants can talk about a common topic, e.g., the scenery in this case, and can easily make friends with each other.

By focusing on the speed of the vehicle 11 as "situation of or around vehicle," the vehicles 11 travelling at the same speed may be matched with each other. In this case, the occupants can exchange information regarding traffic congestion and talk about the traffic congestion as a common topic, so that they can easily make friends with each other. As "vehicle information," the vehicles 11 having license plates of the same district may be matched with each other, or the vehicles 11 of the same type may be matched with each other. Also in this case, the occupants can easily find a common topic and make friends with each other.

The vehicles 11 may be classified by using "topic." For example, the vehicles 11 where the same keyword is used in the conversions between the occupants may be matched with each other. In this case, the occupant can smoothly join the conversation with the other occupants since they are talking about the same topic.

For example, the vehicles 11 in which preset keywords are the same may be matched with each other. In this case, the occupants can talk about something that they are interested in, and can easily make friends with each other.

The vehicles 11 may be classified by using "situation inside vehicle." For example, the vehicles 11 in which the occupants are viewing the same content may be matched with each other. In this case, the occupants can talk about a common topic and can easily make friends with each other.

In a case where the vehicles 11 are matched with each other by using information such as "itinerary," "occupant information," "situation of or around vehicle," "topic," or "situation inside vehicle," such information can be acquired with reference to the preregistration parameter 91 (FIG. 6) or the departure registration parameter 92 (FIG. 7).

The above-described information may also be acquired by referencing the information accumulated in the vehicle information accumulation unit 75 and the occupant information accumulation unit 76 (FIG. 4).

Figure 9:
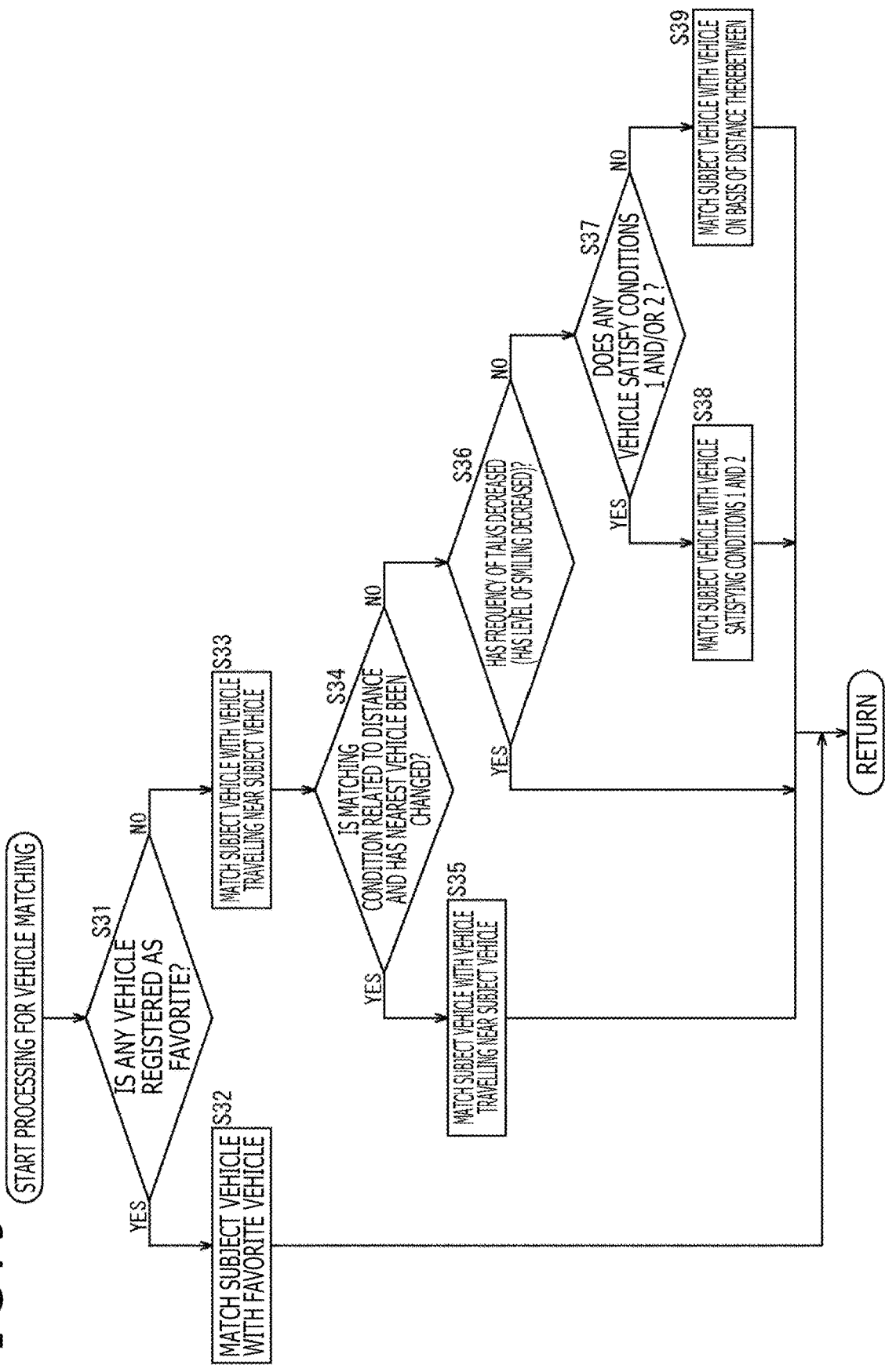
FIG. 9 is a flowchart for describing processing for vehicle matching.

The processing of the flowchart in FIG. 9 may include the matching processing based on the conditions depicted in FIG. 13. Alternatively, when specific matching is further performed after the matching based on the flowchart in FIG. 9 is performed, the specific matching may be performed, for example, as processing for narrowing the multiple vehicles 11 down to the vehicle 11 to be finally matched with the subject vehicle 11-1.

The matching processing based on the conditions depicted in FIG. 13 may be executed instead of the matching based on the distance between vehicles when the processing proceeds to step S39. The matching may be performed on the basis of the distance between vehicles in a case where no vehicle 11 to be matched with the subject vehicle 11-1 has been detected on the basis of the conditions depicted in FIG. 13.

When the matching between the vehicles 11 is performed as described above, the processing proceeds to step S14 (FIG. 8). In step S14, static seating arrangement processing is executed. The static seating arrangement processing will be described with reference to FIGS. 14 to 17. FIGS. 14 to 17 are diagrams for describing patterns of seating arrangement. With reference to FIGS. 14 to 17, description related to the subject vehicle 11-1 will be given. Although the other vehicle 11-2 is not illustrated in FIGS. 14 to 17, seating arrangement is also performed in the other vehicle 11-2 as with the seating arrangement in the subject vehicle 11-1.

After the vehicles 11 are matched with each other, as the seating arrangement processing, first, the seating is arranged between the vehicles 11 so as to reproduce the relative position of the occupants or while taking into account their ages or sexes. When the subject vehicle 11-1 is matched with the other vehicle 11-2, seating arrangement is executed such that the relative position of the occupants in the other vehicle 11-2 is reproduced in the subject vehicle 11-1. Such seating arrangement will be referred to as seating arrangement for reproducing the relative position. By reproducing the relative position, the conversation with the occupants in the other vehicle 11-2 can be presented to the occupants in the subject vehicle 11-1 without giving a feeling of strangeness to the occupants in the subject vehicle 11-1. This can enhance the sense of presence of the occupants in the other vehicle 11-2.

Figure 14:
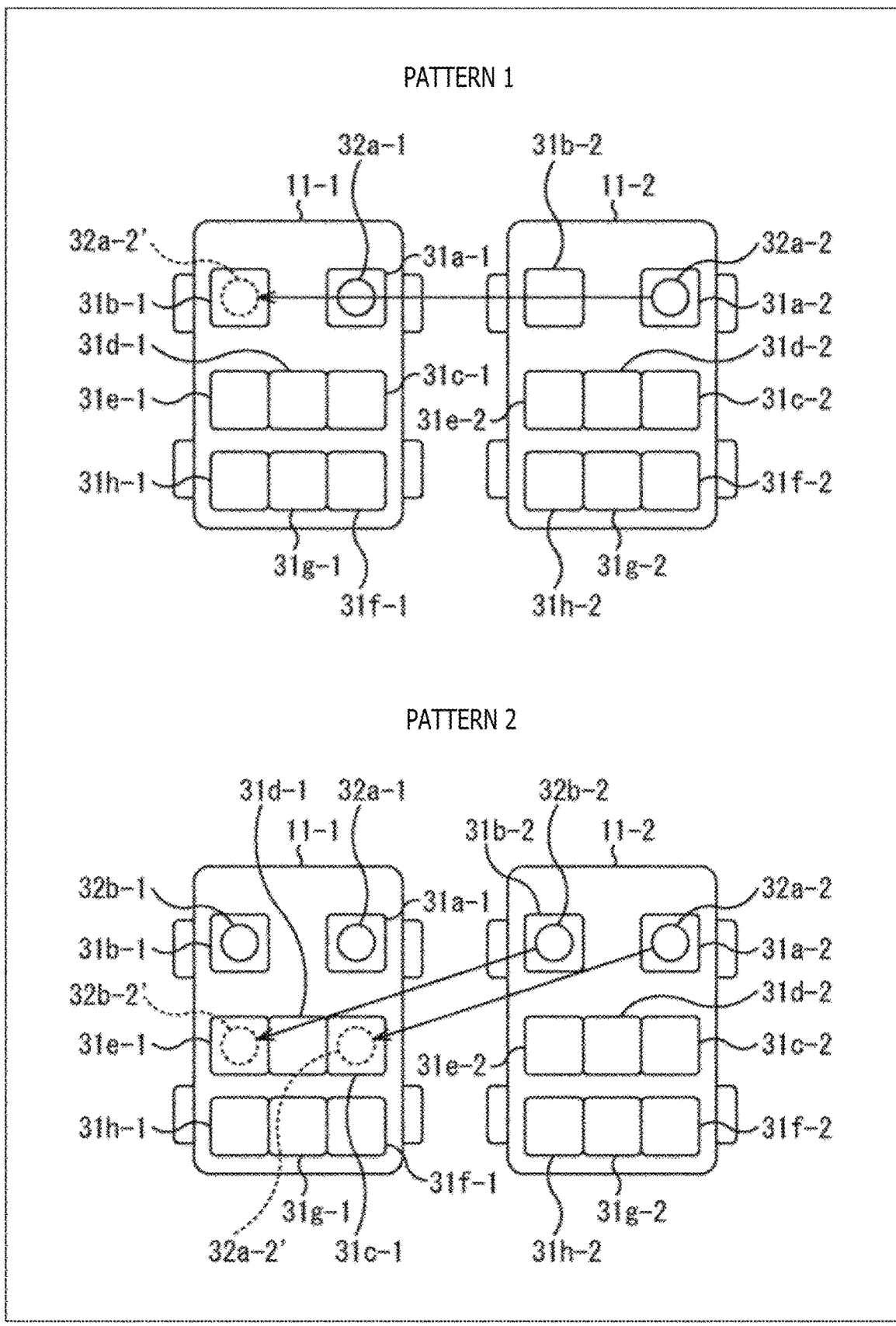
FIG. 14 is a diagram for describing seating arrangement processing.

FIG. 14 is a diagram indicating a pattern 1 and a pattern 2 of the seating arrangement for reproducing the relative position. Referring to the pattern 1 depicted in FIG. 14, the occupant 32a-1 is in the seat 31a-1 in the subject vehicle 11-1, and the occupant 32a-2 is in the seat 31a-2 in the other vehicle 11-2.

In a case of the pattern 1, the occupant 32a-2 in the other vehicle 11-2 is arranged in the seat 31b-1 in the subject vehicle 11-1. In the subject vehicle 11-1, the seating is arranged to make it appear as if the virtual occupant 32a-2' corresponding to the occupant in the other vehicle 11-2 were seated next to the occupant 32a-1 in the subject vehicle 11-1. In other words, the seating is arranged in such a manner that, in a case where the occupant in the other vehicle 111-2 says something, a sound image which utters what the occupant says is localized in the seat 31b-2 next to the occupant 32a-1.

Referring to the pattern 2 depicted in FIG. 14, the occupant 32a-1 is in the seat 31a-1 in the subject vehicle 11-1, and the occupant 32b-1 is in the seat 31b-1 in the subject vehicle 11-1. The occupant 32a-2 is in the seat 31a-2 in the other vehicle 11-2, and an occupant 32b-2 is in the seat 31b-2 in the other vehicle 11-2.

In a case of the pattern 2, the occupant 32a-2 and the occupant 32b-2 in the other vehicle 11-2 are respectively arranged in the seat 31c-1 and the seat 31e-1 in the subject vehicle 11-1. In the subject vehicle 11-1, the seating is arranged to make it appear as if the occupant 32a-2' and an occupant 32b-2' were seated in the seats behind the occupant 32a-1 and the occupant 32b-1 in the subject vehicle 11-1.

In the other vehicle 11-2, the occupant 32a-2 and the occupant 32b-2 are seated next to each other. Also in the subject vehicle 11-1, (a sound image of) the occupant 32a-2' and (a sound image of) the occupant 32b-2' corresponding to the occupant 32a-2 and the occupant 32b-2 are seated next to each other. As described above, the seating is arranged while the relative position is maintained.

In the pattern 1 and the pattern 2, in a case where the total number of the occupants in the subject vehicle 11-1 and the occupants in the other vehicle 11-2 is within the number of seats in the subject vehicle 11-1, the virtual occupants corresponding to the occupants in the other vehicle 11-2 are arranged in empty seats in the subject vehicle 11-1 while the relative position of the occupants 32 in the other vehicle 11-2 is maintained.

Figure 15:
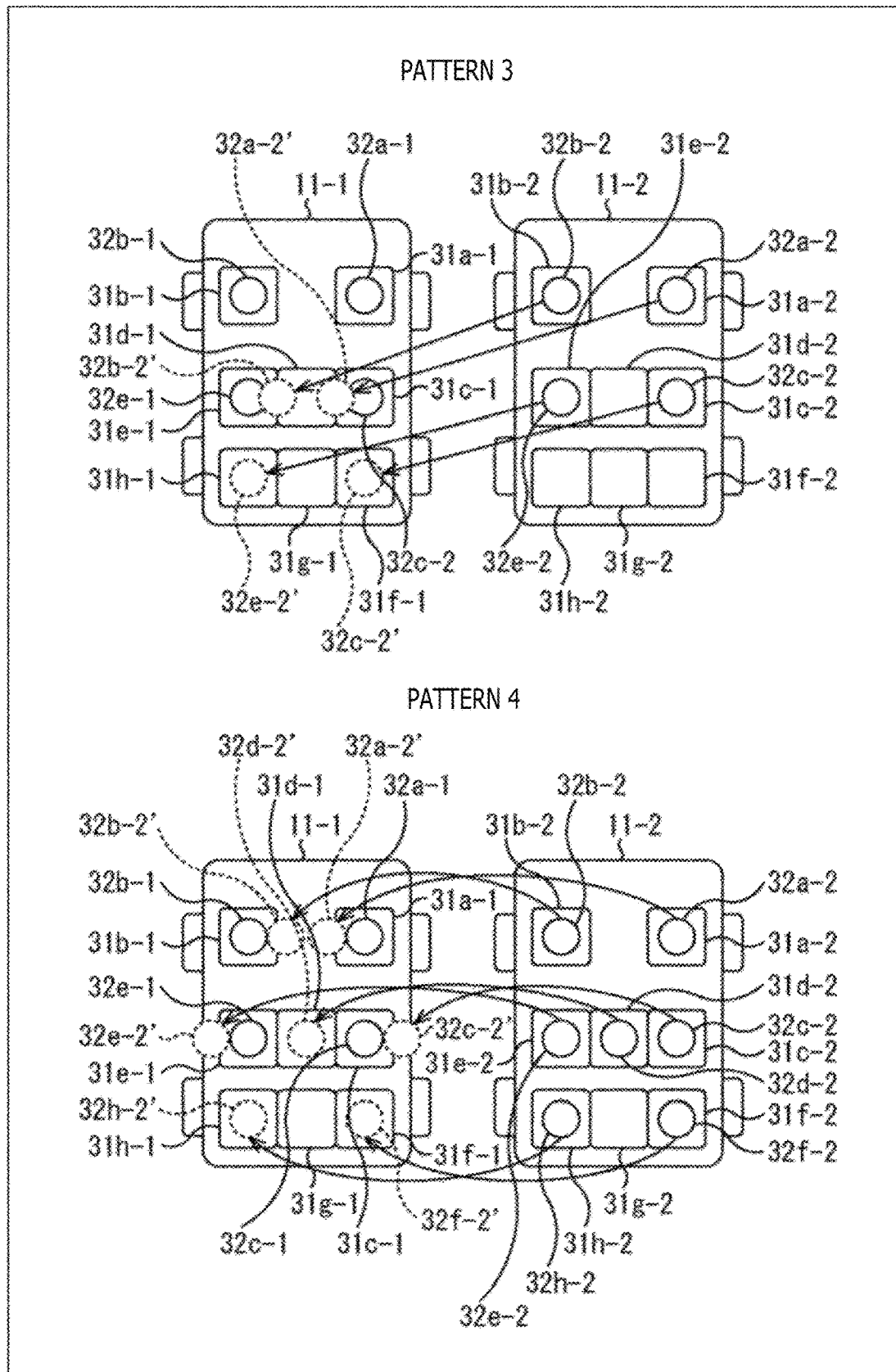
FIG. 15 is a diagram for describing the seating arrangement processing.

FIG. 15 is a diagram indicating a pattern 3 and a pattern 4 of the seating arrangement for reproducing the relative position. In the pattern 3, in a case where the total number of the occupants in the subject vehicle 11-1 and the occupants in the other vehicle 11-2 is the same as the number of seats in the subject vehicle 11-1, the seating is arranged while the relative position is maintained.

Referring to the pattern 3 depicted in FIG. 15, the occupant 32a-1, the occupant 32b-1, an occupant 32c-1, and an occupant 32e-1 are respectively seated in the seat 31a-1, the seat 31b-1, the seat 31c-1, and the seat 31e-1 in the subject vehicle 11-1. The occupant 32a-2, the occupant 32b-2, an occupant 32c-2, and an occupant 32e-2 are respectively seated in the seat 31a-2, the seat 31b-2, the seat 31c-2, and the seat 31e-2 in the other vehicle 11-2.

In a case of the pattern 3, the occupant 32a-2 and the occupant 32b-2 in the other vehicle 11-2 are respectively arranged in the seat 31c-1 and the seat 31e-1 in the subject vehicle 11-1. However, the occupant 32c-1 and the occupant 32e-1 are seated in the seat 31c-1 and the seat 31e-1, and thus, the occupant 32a-2' and the occupant 32b-2' are arranged at positions that are slightly shifted from and do not overlap the occupant 32c-1 and the occupant 32e-1.

In an example illustrated in FIG. 15, the virtual occupant 32a-2' corresponding to the occupant 32a-2 is arranged between the seat 31c-1 and the seat 31d-1, and the virtual occupant 32b-2' corresponding to the occupant 32b-2 is arranged between the seat 31d-1 and the seat 31e-1. In this case, the occupant 32a-2 and the occupant 32b-2 are seated next to each other in the other vehicle 11-2, and the occupants 32a-2' and the occupant 32b-2' corresponding to the occupant 32a-2 and the occupant 32b-2 are also seated next to each other in the subject vehicle 11-1. In such a manner, their positional relation is maintained.

The occupants 32-2 in the other vehicle 11-2 are presented as sound images to the occupants 32-1 in the subject vehicle 11-1. A sound image can be localized at a position with no seat. Thus, as described above, a sound image of the virtual occupant 32a-2' corresponding to the occupant 32a-2 can be arranged at a position between the seat 31c-1 and the seat 31d-1 that is not a seat.

The occupant 32c-2 and the occupant 32e-2 in the other vehicle 11-2 are respectively arranged in the seat 31f-1 and the seat 31h-1 of the subject vehicle 11-1. Also in this case, the occupant 32c-2 and an occupant 32h-2 are seated next to each other in the other vehicle 11-2, and accordingly, an occupant 32c-2' and an occupant 32h-2' corresponding to the occupant 32c-2 and the occupant 32h-2 are seated next to each other in the subject vehicle 11-1. In such a manner, their positional relation is maintained.

In the pattern 4 depicted in FIG. 15, in a case where the total number of the occupants in the subject vehicle 11-1 and the occupants in the other vehicle 11-2 is greater than the number of seats in the subject vehicle 11-1, the seating is arranged while the relative position is maintained.

Referring to the pattern 4 depicted in FIG. 15, the occupant 32a-1, the occupant 32b-1, the occupant 32c-1, and the occupant 32e-1 are respectively seated in the seat 31a-1, the seat 31b-1, the seat 31c-1, and the seat 31e-1 in the subject vehicle 11-1. The occupant 32a-2, the occupant 32b-2, the occupant 32c-2, an occupant 32d-2, the occupant 32e-2, an occupant 32f-2, and the occupant 32h-2 are respectively seated in the seat 31a-2, the seat 31b-2, the seat 31c-2, the seat 31d-2, the seat 31e-2, the seat 31f-2, and the seat 31h-2 in the other vehicle 11-2.

In a case of the pattern 4, the occupants 32-2 are seated in seats in all of the three rows in the other vehicle 11-2. In such a state, if the pattern 2 or the pattern 3 is applied to the seating arrangement, the occupants 32-2 in the first row in the other vehicle 11-2 are arranged in the second row in the subject vehicle 11-1, the occupants 32-2 in the second row in the other vehicle 11-2 are arranged in the third row in the subject vehicle 11-1, and the occupants 32-2 in the third row in the other vehicle 11-2 are arranged while the relative position of the occupants 32 is maintained. Consequently, the occupants 32-2 are arranged outside the subject vehicle 11-1.

Accordingly, in the pattern 4, the occupants 32-2 in the first row in the other vehicle 11-2 are arranged in the first row in the subject vehicle 11-1, the occupants 32-2 in the second row in the other vehicle 11-2 are arranged in the second row in the subject vehicle 11-1, and the occupants 32-2 in the third row in the other vehicle 11-2 are arranged in the third row in the subject vehicle 11-1.

The occupant 32a-2 and the occupant 32b-2 seated in the first row in the other vehicle 11-2 are respectively arranged in the seat 31a-1 and the seat 31b-1 in the subject vehicle 11-1, but the occupant 32a-1 and the occupant 32b-1 are seated in the seat 31a-1 and the seat 31b-1. In such a case, the occupant 32a-2' and the occupant 32b-2' are arranged at positions that are slightly shifted from and do not overlap the occupant 32a-1 and the occupant 32b-1.

In an example illustrated in FIG. 15, the virtual occupant 32a-2' corresponding to the occupant 32a-2 is arranged at a position between the seat 31a-1 and the seat 31b-1 and closer to the seat 31a-1. The virtual occupant 32b-2' corresponding to the occupant 32b-2 is arranged at a position between the seat 31a-1 and the seat 31b-1 and closer to the seat 31b-1.

The occupant 32c-2, the occupant 32d-2, and the occupant 32e-2 seated in the second row in the other vehicle 11-2 are respectively arranged in the seat 31c-1, the seat 31d-1, and the seat 31e-1 in the second row in the subject vehicle 11-1. The occupant 32c-1 and the occupant 32e-1 are seated in the seat 31c-1 and the seat 31e-1, and thus, the occupant 32c-2' and an occupant 32e-2' are arranged at positions that are slightly shifted from and do not overlap the occupant 32c-1 and the occupant 32e-1.

In the example illustrated in FIG. 15, the virtual occupant 32c-2' corresponding to the occupant 32c-2 is arranged outside the seat 31c-1 (on the right of the seat 31c-1 in the figure), and the virtual occupant 32e-2' corresponding to the occupant 32e-2 is arranged outside the seat 31e-1 (on the left of the seat 31e-1 in the figure).

The occupant 32f-2 and the occupant 32h-2 seated in the third row in the other vehicle 11-2 are respectively arranged in the seat 31f-1 and the seat 31h-1 in the third row in the subject vehicle 11-1.

As described above, the seating is arranged in such a manner that the positional relation between the occupants 32-2 in the other vehicle 11-2 is also maintained between the occupants 32-2' (sound images) in the subject vehicle 11-1.

Figure 16:
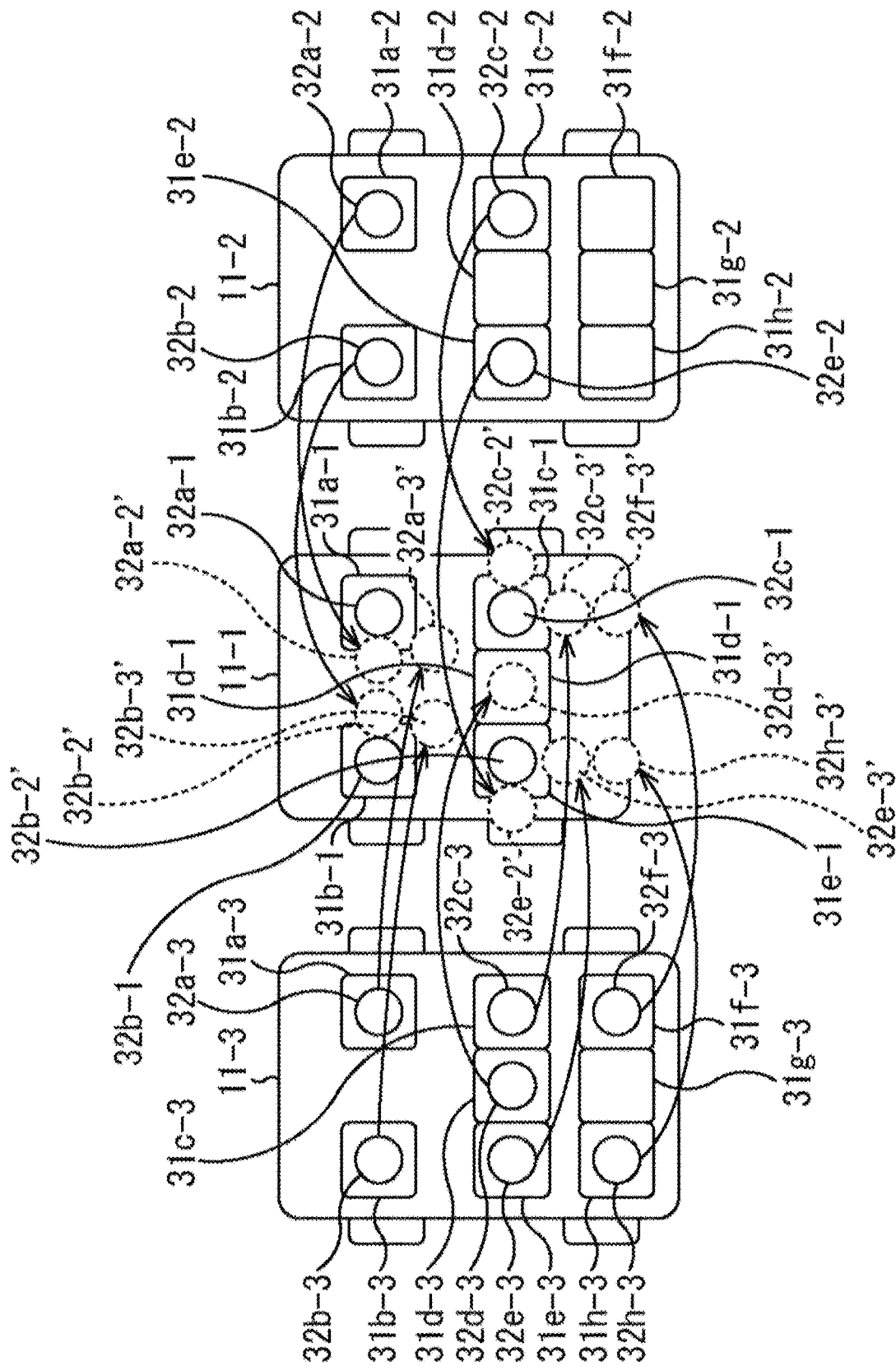
FIG. 16 is a diagram for describing the seating arrangement processing.

A pattern 5 depicted in FIG. 16 indicates a case where the three vehicles 11-1 to 11-3 are matched with each other. Additionally, the pattern 5 indicates a case where the number of seats in the subject vehicle 11-1 is less than the number of seats in the other vehicle 11-2.

Referring to the pattern 5 depicted in FIG. 16, the occupant 32a-1, the occupant 32b-1, the occupant 32c-1, and the occupant 32e-1 are respectively seated in the seat 31a-1, the seat 31b-1, the seat 31c-1, and the seat 31e-1 in the subject vehicle 11-1. The seats 31 in the subject vehicle 11-1 form the first and second rows. The total number of the seats 31 in the subject vehicle 11-1 is five.

The seats 31 in the other vehicle 11-2 form the first to third rows. The total number of the seats 31 in the other vehicle 11-2 is eight. The occupant 32a-2, the occupant 32b-2, the occupant 32c-2, and the occupant 32e-2 are respectively seated in the seat 31a-2, the seat 31b-2, the seat 31c-2, and the seat 31e-2 of the eight seats.

The seats 31 in the other vehicle 11-3 form the first to third rows. The total number of the seats 31 in the other vehicle 11-3 is eight. An occupant 32a-3, an occupant 32b-3, an occupant 32c-3, an occupant 32d-3, an occupant 32e-3, an occupant 32f-3, and an occupant 32h-3 are respectively seated in a seat 31a-3, a seat 31b-3, a seat 31c-3, a seat 31d-3, a seat 31e-3, a seat 31f-3, and a seat 31h-3 of the eight seats.

The virtual occupant 32a-2' and the virtual occupant 32b-2' corresponding to the occupant 32a-2 and the occupant 32b-2 seated in the first row in the other vehicle 11-2 are each arranged between the seat 31a-1 and the seat 31b-1 in the subject vehicle 11-1 as is the case with the pattern 4 (FIG. 15).

The virtual occupant 32c-2' corresponding to the occupant 32c-2 seated in the second row in the other vehicle 11-2 is arranged outside the seat 31c-1 (on the right of the seat 31c-1 in the figure), and the virtual occupant 32e-2' corresponding to the occupant 32e-2 is arranged outside the seat 31e-1 (on the left of the seat 31e-1 in the figure).

The occupant 32a-3 and the occupant 32b-3 seated in the first row in the other vehicle 11-3 are each arranged between the seat 31a-1 and the seat 31b-1 in the subject vehicle 11-1. However, the virtual occupant 32a-2' and the virtual occupant 32b-2' are already arranged between the seat 31a-1 and the seat 31b-1. In such a case, a virtual occupant 32a-3' and a virtual occupant 32b-3' corresponding to the occupant 32a-3 and the occupant 32b-3 are arranged at positions that are shifted from the occupant 32a-2' and the occupant 32b-2'.

A virtual occupant 32d-2' corresponding to the occupant 32d-2 seated in the second row in the other vehicle 11-3 is arranged in the seat 31d-1 because the seat 31d-1 is empty.

The occupant 32c-3 and the occupant 32e-3 seated in the second row in the other vehicle 11-3 are each arranged between the seat 31c-1 and the seat 31e-1 in the subject vehicle 11-1. However, the occupant 32c-1 and the occupant 32e-1 in the subject vehicle 11-1 are seated there, and thus, the virtual occupant 32c-2' and the virtual occupant 32e-2' are respectively arranged outside the occupant 32a-1 and outside the occupant 32b-1. A virtual occupant 32c-3' and a virtual occupant 32e-3' corresponding to the occupant 32c-3 and the occupant 32e-3 are arranged at positions shifted from the occupant 32c-1, the occupant 32e-1, the occupant 32c-2', and the occupant 32e-2'.

In the example illustrated in FIG. 16, the virtual occupant 32c-3' and the virtual occupant 32e-3' corresponding to the occupant 32c-3 and the occupant 32e-3 are respectively arranged behind the occupant 32c-1 and the occupant 32e-1 in the subject vehicle 11-1.

The occupant 32f-3 and the occupant 32h-3 seated in the third row in the other vehicle 11-3 are respectively arranged behind the seat 31c-1 and the seat 31e-1 in the subject vehicle 11-1. The subject vehicle 11-1 includes no seats in the third row, and thus, a virtual occupant 32f-3' and a virtual occupant 32h-3' corresponding to the occupant 32f-3 and the occupant 32h-3 are arranged behind the second row.

In the example illustrated in FIG. 16, since the occupant 32c-3' and the occupant 32e-3' are arranged behind the second row, the occupant 32f-3' and the occupant 32h-3' are arranged further behind the occupant 32f-3' and the occupant 32h-3'.

As described above, the seating is arranged in such a manner that sound images do not overlap. The seating is also arranged in such a manner that the positional relation between the occupants 32-2 in the other vehicle 11-2 is maintained between the occupants 32-2' (sound images) in the subject vehicle 11-1. Additionally, in the example of the pattern 5, the seating is also arranged in such a manner that the positional relation between the occupants 32-3 in the other vehicle 11-3 is maintained between the occupants 32-3' (sound images) in the subject vehicle 11-1.

With reference to FIGS. 14 to 16, the example in which the seating arrangement is executed on the subject vehicle 11-1 has been described. The processing related to the seating arrangement is similarly executed on the other vehicle 11-2 and the other vehicle 11-3, thereby setting the positions of the virtual occupants (sound images) corresponding to the occupants in the other vehicle.

FIG. 17 is a diagram for describing a manner of seating arrangement in a case where the seating is arranged according to the age, sex, role, or the like. The role includes a driving role (driver), a navigation role, and the like. Groups are formed on the basis of the age, sex, role, or the like, and the seating is arranged. In a case where persons are close in age, have the same sex, and play the same role such as the driver, they have a lot in common to talk about and can accelerate their conversation.

As depicted in an upper diagram of FIG. 17, in the subject vehicle 11-1, the occupant 32a-1 who is a driver is seated in the seat 31a-1, the occupant 32b-1 who is an adult is seated in the seat 31b-1, and the occupant 32e-1 who is a child is seated in the seat 31e-1. In FIG. 17, a shaded circle represents the child occupant 32.

In the subject vehicle 11-2, the occupant 32a-2 who is a driver is seated in the seat 31a-2, the occupant 32b-2 who is a child is seated in the seat 31b-1, the occupant 32c-2 who is a child is seated in the seat 31c-2, and the occupant 32e-2 who is an adult is seated in the seat 31e-2.

In such a case, the seating is arranged as depicted in a lower diagram of FIG. 17. Groups are formed according to the role, and the seating is arranged in such a manner that the drivers are arranged close to each other. The virtual occupant 32a-2' corresponding to the occupant 32a-2 who is the driver of the other vehicle 11-2 is positioned near and, in this figure, behind and to the left of the occupant 32a-1 who is the driver of the subject vehicle 11-1. Also in the other vehicle 11-2, the virtual occupant 32a-1' corresponding to the occupant 32a-1 who is the driver of the subject vehicle 11-1 is positioned, in the figure, near and on the left of the occupant 32a-2 who is the driver of the other vehicle 11-2.

Groups are formed according to the age, and the seating is arranged in such a manner that adults are arranged close to each other and children are arranged close to each other. The occupant 32b-1 who is an adult is seated in the seat 31b-1 in the subject vehicle 11-1, and thus, the virtual occupant 32e-2' corresponding to the occupant 32e-2, who is an adult, in the other vehicle 11-2 is arranged near the occupant 32b-1. In the example illustrated in the lower diagram of FIG. 17, the occupant 32e-2' is positioned behind and to the right of the occupant 32b-1.

Also in the other vehicle 11-2, the virtual occupant 32b-1' corresponding to the occupant 32b-1, who is an adult, in the subject vehicle 11-1 is arranged at a position, in the figure, near and on the right of the occupant 32e-2, who is an adult, in the other vehicle 11-2. The seat 31d-2 to the right of the occupant 32e-2 in the other vehicle 11-2 is empty. Thus, the virtual occupant 32b-1' may be arranged in the seat 31d-1, but in the example illustrated in the lower diagram of FIG. 17, the occupant 32b-1' is positioned slightly closer to the occupant 32e-2.

In other words, the virtual occupant 32b-1' is positioned slightly away from the occupant 32c-2, who is an adult, in the other vehicle 11-2. As described above, the seating is arranged with appropriate consideration in such a manner that occupants belonging to the same age group are arranged closer to each other, whereas occupants belonging to groups of different ages are prevented from being arranged excessively close to each other.

Since the occupant 32e-1, who is a child, is seated in the seat 31e-1 in the subject vehicle 11-1, the virtual occupant 32b-2' corresponding to the occupant 32b-2 and the virtual occupant 32c-2' corresponding to the occupant 32c-2, who are children, in the other vehicle 11-2 are arranged near the occupant 32b-1. In the example illustrated in the lower diagram of FIG. 17, the seat 31c-1 and the seat 31d-1 to the right of the occupant 32e-1 are empty, and thus, the occupant 32b-2' and the occupant 32c-2' are respectively arranged in the seat 31c-1 and the seat 31d-1.

In a case where the seat 31c-1 and the seat 31d-1 to the right of the occupant 32e-1 are empty, which of the seats, i.e., the seat 31c-1 and the seat 31d-1, the occupant 32b-2' or the occupant 32c-2' is to be arranged in is determined in such a manner as to reproduce the positional relation between the occupant 32b-2 and the occupant 32c-2 in the other vehicle 11-2.

In the example illustrated in FIG. 17, in a case where the occupant 32c-2 is viewed from the occupant 32b-2, the occupant 32c-2 is seated behind and to the right of the occupant 32b-2. In this positional relation, supposing that the occupant 32b-2 and the occupant 32c-2 are seated side by side in a lateral direction, the occupant 32c-2 will be seated to the right of the occupant 32b-2.

Thus, in this case, the seats for the virtual occupant 32b-2' and the virtual occupant 32c-2' (positions of sound images) in the subject vehicle 11-1 are set in such a manner as to reproduce the positional relation where the occupant 32c-2 is seated to the right of the occupant 32b-2. That is, as depicted in FIG. 17, the occupant 32b-2' is arranged in the seat 31d-1, and the occupant 32c-2' is arranged in the seat 31c-1.

In a case where an occupant is seated in the seat 31c-1, in order to reproduce, also in the subject vehicle 11-1, the positional relation where the occupant 32c-2 is seated to the right of the occupant 32b-2, the virtual occupant 32c-2' is arranged in the seat 31f-1 located behind and to the right of the seat 31d-1 in which the virtual occupant 32b-2' is arranged, for example.

Also in the other vehicle 11-2, a virtual occupant 32e-1' corresponding to the occupant 32e-1, who is a child, in the subject vehicle 11-1 is arranged near the occupant 32b-2 and the occupant 32c-2, who are children, in the other vehicle 11-2. In the example illustrated in the lower diagram of FIG. 17, the virtual occupant 32e-1' is arranged at a position between the occupant 32b-2 and the occupant 32c-2. The occupant 32b-2, the occupant 32c-2, and the virtual occupant 32e-1' are arranged in a straight line in a diagonal direction.

According to the seating arrangement pattern described with reference to FIG. 17, the seats for children are arranged close to each other to thereby create a situation in which the children can easily talk with one another. According to the seating arrangement pattern described with reference to FIG. 17, the seats for adults are arranged while the relative position is taken into account, improving the sense of presence of the virtual occupants. As described above, the seating arrangement pattern can be varied depending on the age, that is, whether the occupants are adults or children.

In the example illustrated in FIG. 17, the seating arrangement pattern has been described in which the occupants are divided into two groups of adults and children. However, as depicted in FIG. 18, the occupants may be divided into two or more groups, and the seating may be arranged by applying a seating arrangement pattern suitable for each group.

Not only a sound source may be disposed at a normal position at each seat but also a virtual sound source may be disposed between the rows of the actual seats, between the seats, or at the boundary between the seats (or near the boundary) as in the case of the occupant 32a-2', the occupant 32e-2', and the occupant 32b-1'.

FIG. 18 depicts a total of six groups including a group of preschool children from the ages of 0 to 5 years, a group of elementary school students from the ages of 6 to 12 years, a group of junior high and high school students from the ages of 13 to 18 years, a group of college students from the ages of 19 to 24 years, a group of working professionals from the ages of 25 to 60 years, and a group of seniors over 60 years. The seating arrangement processing may be executed while the occupants are divided into the six groups described above. Note that the groups described above are illustrative and that the age range, the number of groups, and the like can be changed as appropriate.

Figure 8:
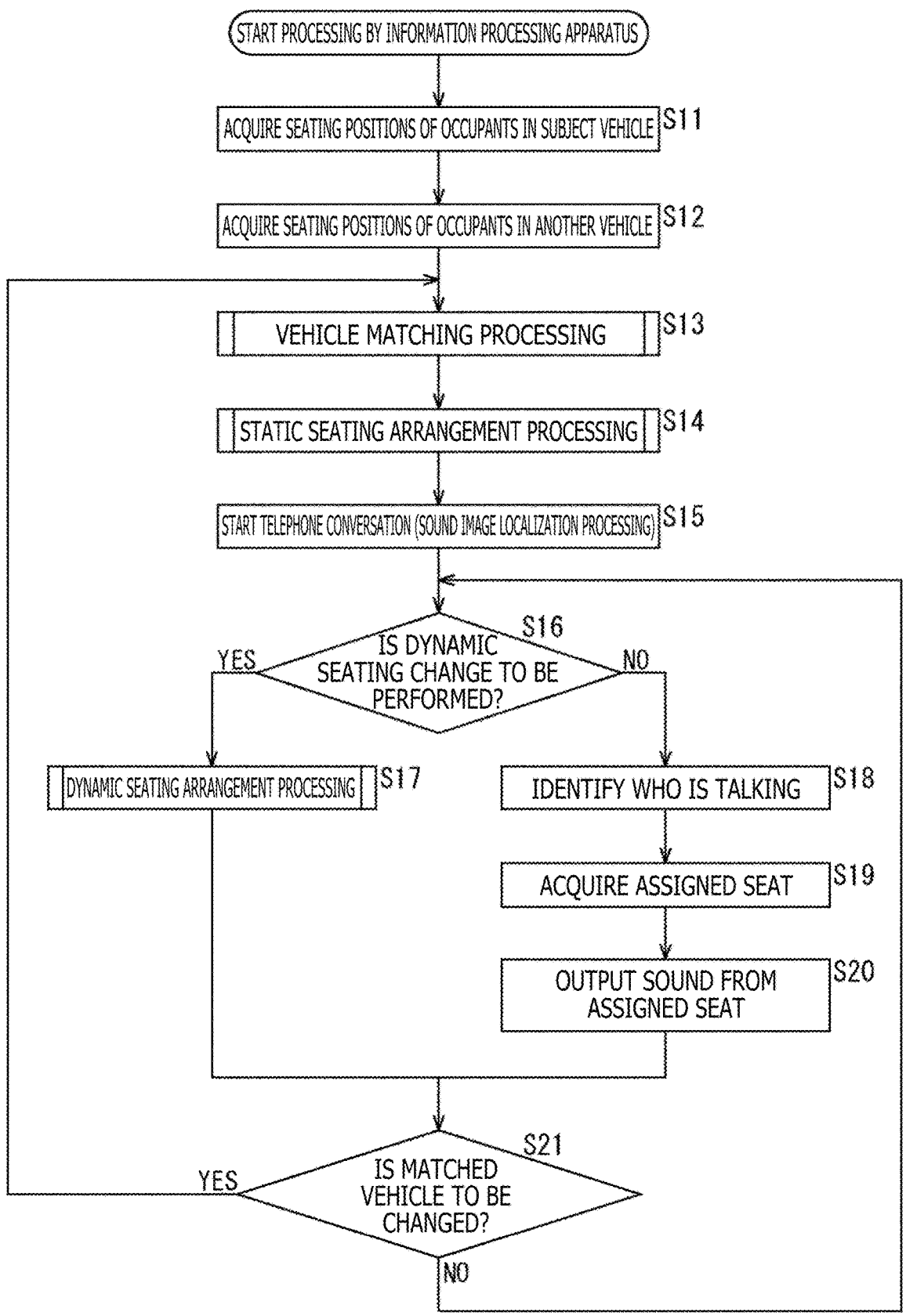
FIG. 8 is a flowchart for describing processing by the information processing apparatus.
Figure 19:
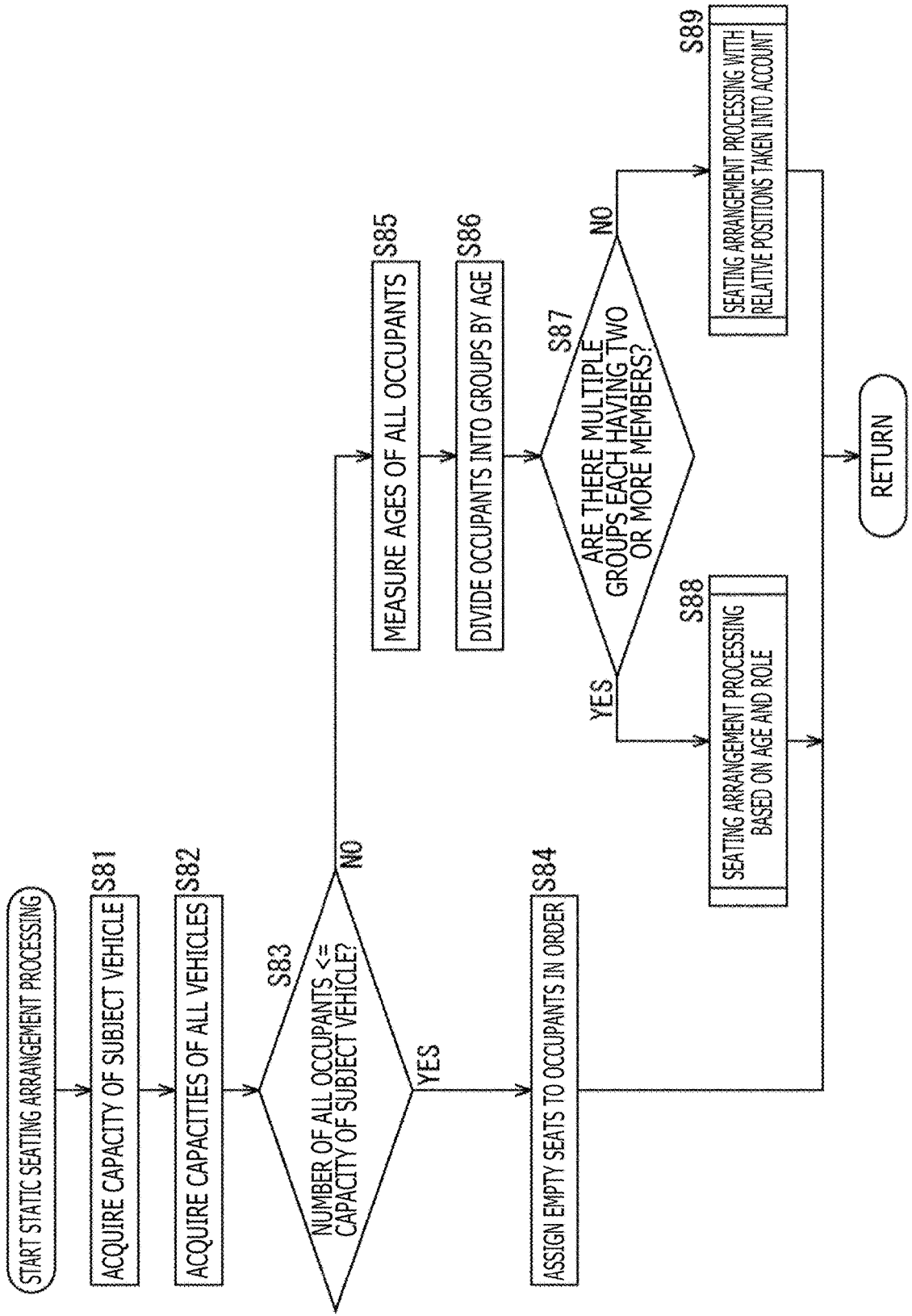
FIG. 19 is a flowchart for describing static seating arrangement processing.

With reference to a flowchart in FIG. 19, static seating arrangement will be described that is performed by switching between the seating arrangement pattern (rule) for reproducing the relative position and the seating arrangement pattern (rule) with the age or the like taken into account. The flowchart in FIG. 19 is used to describe the details of static seating arrangement processing in step S14 (FIG. 8). The processing in the flowchart in FIG. 19 is executed on the basis of rules accumulated in the seating arrangement rule accumulation section 82 (FIG. 4) of the seating arrangement processing unit 71.

In step S81, the riding capacity of the subject vehicle 11-1 is acquired. In step S82, the number of occupants in the subject vehicle 11-1 and the number of occupants in the matched other vehicle 11-2 are acquired. In a case where the subject vehicle 11-1 is matched with the multiple other vehicles 11-2, the number of occupants in each of the multiple other vehicles 11-2 is acquired. In step S82, the total number of occupants in the subject vehicle 11-1 and the other vehicles 11-2 is acquired.

In step S83, whether or not the total number of occupants is equal to or less than the capacity of the subject vehicle 11-1 is determined. In step S83, in a case where the total number of occupants is determined to be equal to or less than the capacity of the subject vehicle 11-1, the processing proceeds to step S84.

Figure 20:
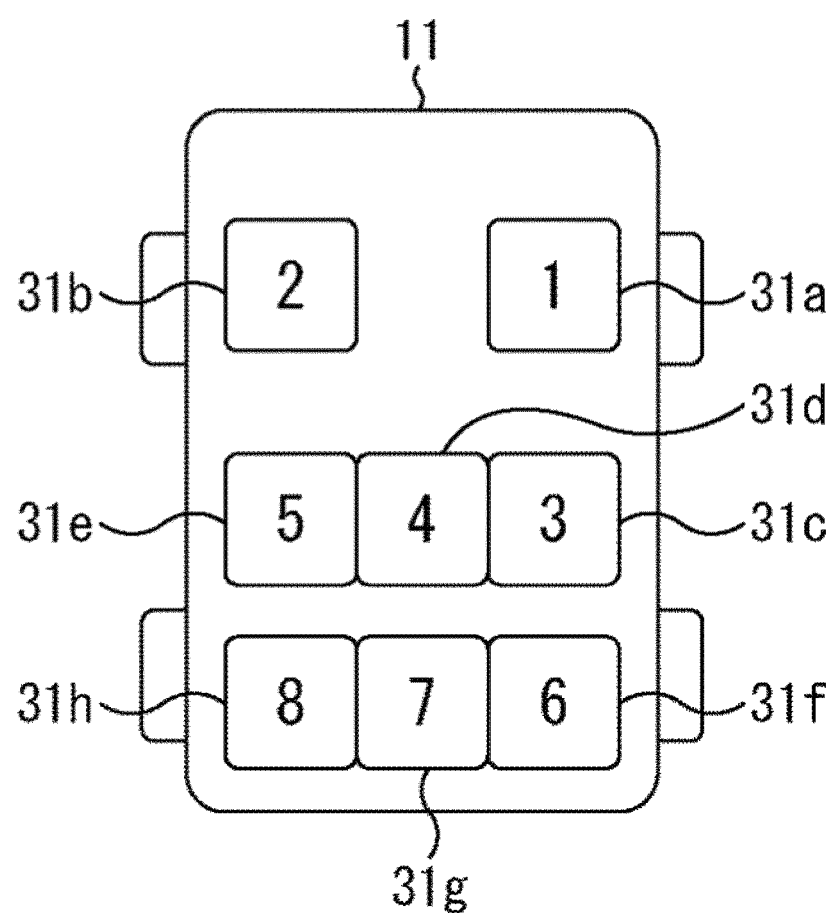
FIG. 20 is a diagram for describing the seating arrangement processing.

In step S84, the occupants in the other vehicle 11-2 are arranged in empty seats in order. For example, the seats 31 can be numbered as depicted in FIG. 20, and the occupants in the other vehicle 11-2 can be arranged in the empty seats 31 according to the number. Referring to FIG. 20, the vehicle 11 includes eight seats 31a to 31h. The vehicle 11 has a riding capacity of eight.

The seats are arranged in the order of the seat 31a, the seat 31b, the seat 31c, the seat 31d, the seat 31e, the seat 31f, the seat 31g, and the seat 31h. Normally, the driver is seated in the seat 31a, which is a driver's seat, and thus, the empty seats are the seats 31b to 31h. For example, in a case where the occupants are seated in the seat 31a and the seat 31b and the seats 31c to 31h are empty, the occupants in the other vehicle 11-2 are arranged in the seats in order starting with the seat 31c.

On the other hand, in step S83, in a case where the total number of occupants is determined to be greater than the capacity of the subject vehicle 11-1, the processing proceeds to step S85. In step S85, the ages of all the occupants are measured. The ages of the occupants may be registered by the user in advance, and the registered information may be used. A camera provided in the vehicle 11 may be used to capture an image, the image may be analyzed, and facial recognition may be performed on the image to infer the ages of the occupants.

In step S86, the occupants are divided into groups according to the age. For example, as described with reference to FIG. 18, six groups based on the age are set, and which of the groups the occupant belongs to is determined by using the age information acquired in the processing in step S85.

In step S87, whether or not there are multiple groups each having two or more members is determined. In step S87, in a case where it is determined that there are multiple groups having two or more members, the processing proceeds to step S88. In step S88, the seating arrangement processing is executed on the basis of the age or role. An example of the seating arrangement processing has been described with reference to FIG. 17.

With reference to a flowchart illustrated in FIG. 21, the seating arrangement processing based on the age or role will be described, the processing being executed in step S88. In step S101, the occupants are divided into groups according to the age. This processing has been executed in step S86 (FIG. 19), and thus, the result of the processing can be used.

In step S102, the following processing is executed. Specifically, it is determined whether or not any group is present in the matched other vehicle 11-2, and in a case where no group is present in the matched other vehicle 11-2, the occupants who are close in age are put into one group. For example, in a case where no group is present in the other vehicle 11-2, in other words, multiple groups each having only one occupant are present, the groups are combined in such a manner that one group includes two or more occupants. In a case where any group is present in the other vehicle 11-2, the processing in step S102 may be omitted.

In step S103, one group is set as a processing target, and whether or not the occupants in the group to be processed are seated in multiple rows of seats is determined. For example, in a case where the occupants included in the group are seated in only one predetermined row of seats, the result of the determination in the processing in step S103 is NO. For example, in a case where the occupants included in the group are seated in the first and second rows of seats in the vehicle 11, the result of the determination in the processing in step S103 is YES.

Described with reference to FIG. 17 again, for example, the occupant 32b-2 and the occupant 32c-2 in the other vehicle 11-2 belong to a group of children. The occupant 32b-2 is seated in the first row, and the occupant 32c-2 is seated in the second row. In such a case, it is determined in step S103 that the occupants in the group are seated in multiple rows of seats.

For example, the occupant 32a-1 and the occupant 32b-1 in the subject vehicle 11-1 belong to a group of adults. The occupant 32a-1 and the occupant 32b-1 are seated in the first row. In such a case, it is determined in step S103 that the occupants in the group are not seated in multiple rows of seats.

In a case where it is determined in step S103 that the occupants in the group are not seated in multiple rows of seats, in other words, that the occupants in the group are seated in the seats 31 in one predetermined row, the processing proceeds to step S104.

In step S104, the seating is arranged such that the ordinal positional relation based on the row numbers in the other vehicle 11-2 is maintained. In this case, the occupants included in the group are seated in the same row in the other vehicle 11-2, and thus, the seating is arranged in such a manner that the positional relation between the occupants seated in the same row is maintained in the subject vehicle 11-1.

After the processing in step S104 is ended, the processing proceeds to step S105. In step S105, whether or not the processing has been executed on all the groups is determined, and in a case where it is determined that there is a group that is yet to be subjected to the processing, the processing returns to step S103 to repeat the subsequent processing.

Figure 21:
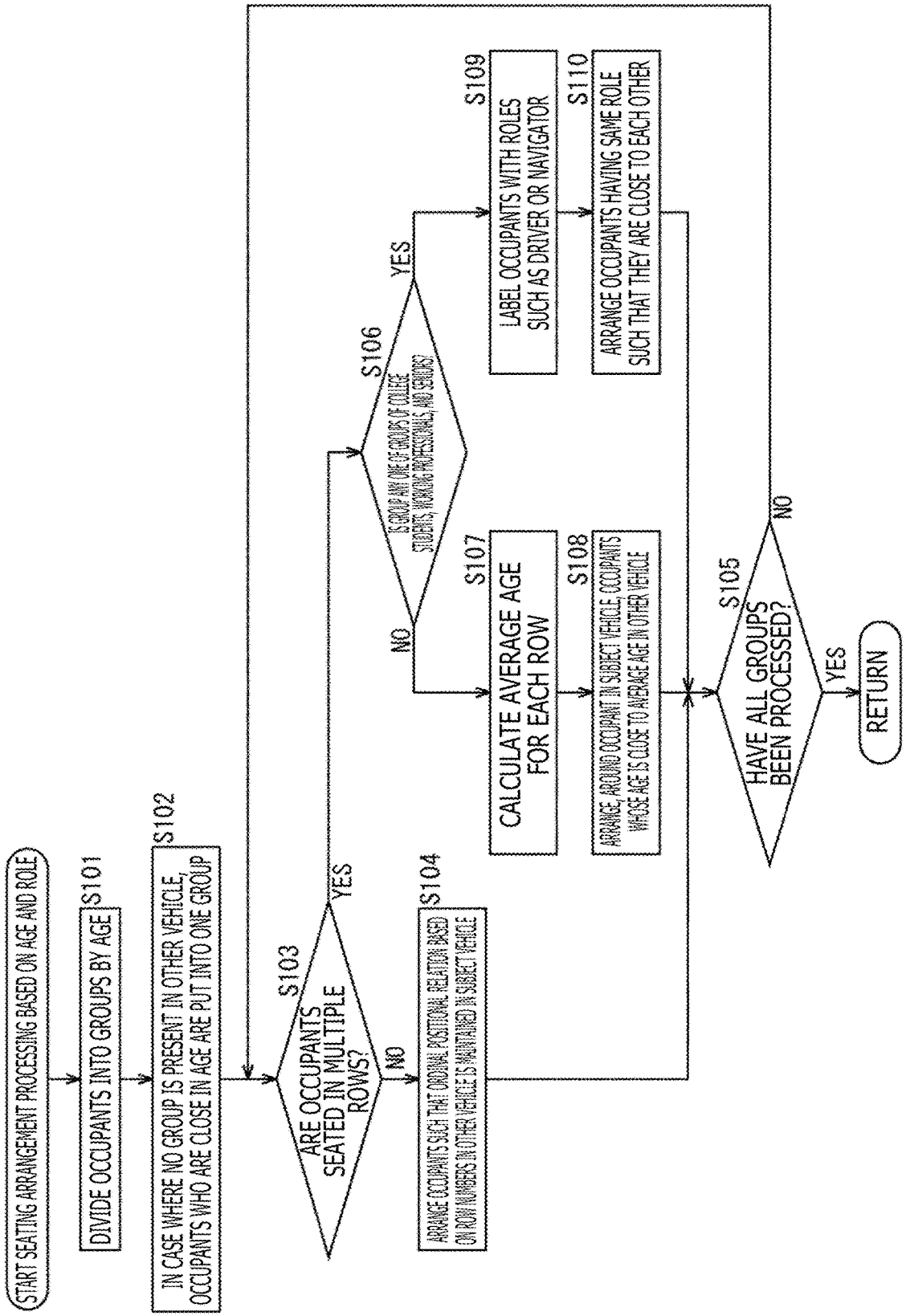
FIG. 21 is a diagram for describing the seating arrangement processing based on the age and role.

On the other hand, in step S105, in a case where the processing is determined to have been executed on all the groups, the processing in the flowchart illustrated in FIG. 21 is ended to return to the processing in the flowchart illustrated in FIG. 19.

On the other hand, in step S103, in a case where it is determined that the occupants in the group are seated in multiple rows of seats, the processing proceeds to step S106. It is determined in step S106 whether or not the group to be processed is any one of the groups of college students, working professionals, and seniors. In a case where it is determined in step S106 that the group to be processed is not any one of the groups of college students, working professionals, and seniors, the processing proceeds to step S107.

In step S107, the average age is calculated for each row. In step S108, occupants whose age is close to the average age of the occupants in the other vehicle 11-2 who belong to the group to be processed are arranged around the occupant in the subject vehicle 11-1 who belongs to the group to be processed.

In the example illustrated in FIG. 17, the child group is to be processed, and, for example, the occupant 32b-1 and the occupant 32c-1 in the other vehicle 11-2 who belong to the child group are each arranged around the occupant 32e-1 in the subject vehicle 11-1 who belongs to the child group.

Once the processing in step S108 is ended, the processing proceeds to step S105. The processing subsequent to step S105 has already been described, and the description of the processing is omitted.

On the other hand, in step S106, in a case where it is determined that the group to be processed is any one of the groups of college students, social members, and seniors, the processing proceeds to step S109.

In step S109, the occupants 32 included in the group to be processed are labeled with roles such as a driver or a navigator. In step S110, according to the result of the labeling, the occupants 32 having the same role are arranged close to each other.

For example, in the example illustrated in FIG. 17, the occupant 32*a*-1 in the subject vehicle 11-1 and the occupant 32*a*-2 in the other vehicle 11-2 are labeled "driver," and thus, the virtual occupant 32*a*-2' corresponding to the occupant 32*a*-2 in the other vehicle 11-2 is arranged near the occupant 32*a*-1 in the subject vehicle 11-1.

Once the processing in step S110 is ended, the processing proceeds to step S105. The processing subsequent to step S105 has already been described, and the description of the processing is omitted.

Described with reference to the flowchart in FIG. 19 again, the description will be continued. In a case where it is determined in step S87 that there are not multiple groups each having two or more occupants, the processing proceeds to step S89. In step S89, the seating arrangement processing with the relative positions taken into account is executed. With reference to a flowchart in FIG. 22, the seating arrangement processing with the relative positions taken into account will be described, the processing being executed in step S89.

In step S121, the number S1 of rows of seats in the subject vehicle 11-1 is acquired. The number S1 of rows of seats is acquired by referencing the information registered in the preregistration parameter 91 (FIG. 6).

In step S122, the number S2 of rows of seats in the other vehicle 11-2 is acquired. The number S2 of rows of seats is acquired by referencing the information registered in the preregistration parameter 91 (FIG. 6) for the other vehicle 11-2, which information is then fed from the other vehicle 11-2 to the subject vehicle 11-1.

In step S123, the number S2 of rows of seats is divided by the number S1 of rows of seats to determine a quotient a and a remainder b.

It is determined in step S124 whether or not the row of seats in the subject vehicle 11-1 that is to be processed (described as the s1 row) includes any empty seat. The s1 row has an initial value of 1. The row of seats in the other vehicle 11-2 is described as the s2 row, and the s2 row has an initial value of 1. In step S124, in a case where the s1 row is determined to include no empty seat, the processing proceeds to step S125.

Figure 23:
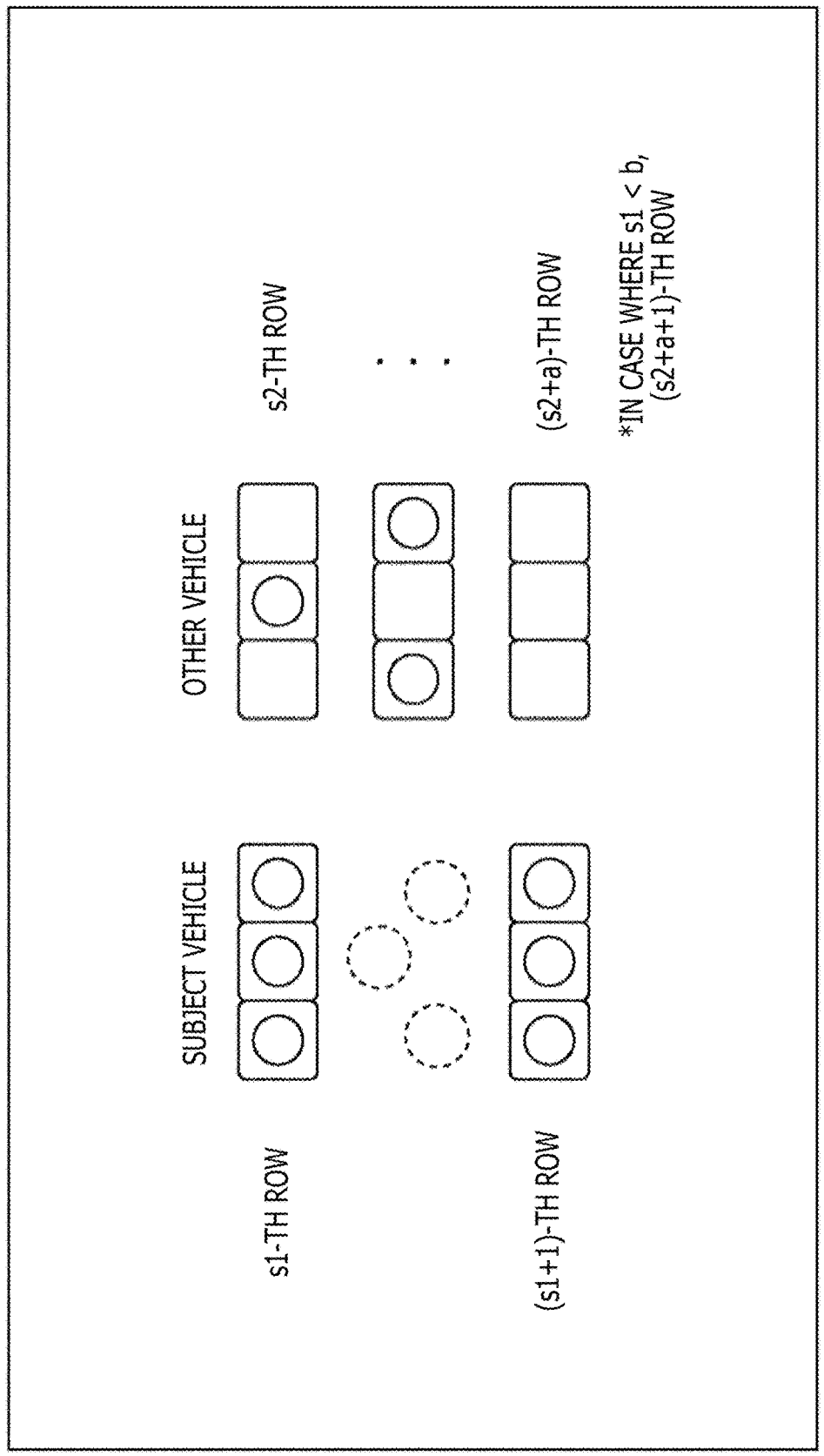
FIG. 23 is a diagram for describing the seating arrangement processing.

In step S125, the occupants are arranged between the rows of seats as depicted in FIG. 23. As depicted in FIG. 23, no empty seat is present in the s1-th row and (s1+1)-th row, and a total of three occupants seated between the s2-th row and the (s2+a)-th row in the other vehicle 11-2 are arranged in the subject vehicle 11-1. In such a case, a total of three virtual occupants corresponding to the three occupants in the other vehicle 11-2 are arranged between the s1-th row and the (s1+1)-th row in the subject vehicle 11-1.

Even in a case where the virtual occupants are arranged between the rows as described above, the virtual occupants are arranged in such a manner that the positional relation between the occupants in the other vehicle 11-2 is also reproduced in the subject vehicle 11-1. In an example in FIG. 23, the three occupants in the other vehicle 11-2 are seated on the left, in the middle, and on the right as viewed in a lateral direction, and thus, the virtual occupants are arranged on the left, in the middle, and on the right as viewed in the lateral direction in the subject vehicle 11-1.

In a case where multiple virtual occupants are to be arranged, the virtual occupants may be arranged by setting virtual seats between the rows where the virtual occupants are to be arranged, and executing, on the virtual seats, processing similar to that in step S126 to step S129 to be described later. Processing in steps S126 to S129 is processing for setting the positions of the virtual occupants such that the positional relation between the occupants in the other vehicle 11-2 is reproduced in the subject vehicle 11-1.

Note that, in a case where s1<b, the (s2+a)-th row corresponds to the (s2+a+1)-th row.

By arranging the virtual occupants between the rows as described above, in other words, localizing sound images between the rows, the sound images can be prevented from concentrating in a front or rear part of the vehicle 11 that has few rows of seats. In particular, in a case where the row S1 of seats in the subject vehicle 11-1 is significantly different from the number S2 of rows of seats in the other vehicle 11-2, for example, the sound images may possibly concentrate in the front or rear part of the vehicle 11. However, by executing the processing in steps S124 and S125, it is possible to prevent the sound images from concentrating in a certain part of the vehicle 11.

Figure 24:
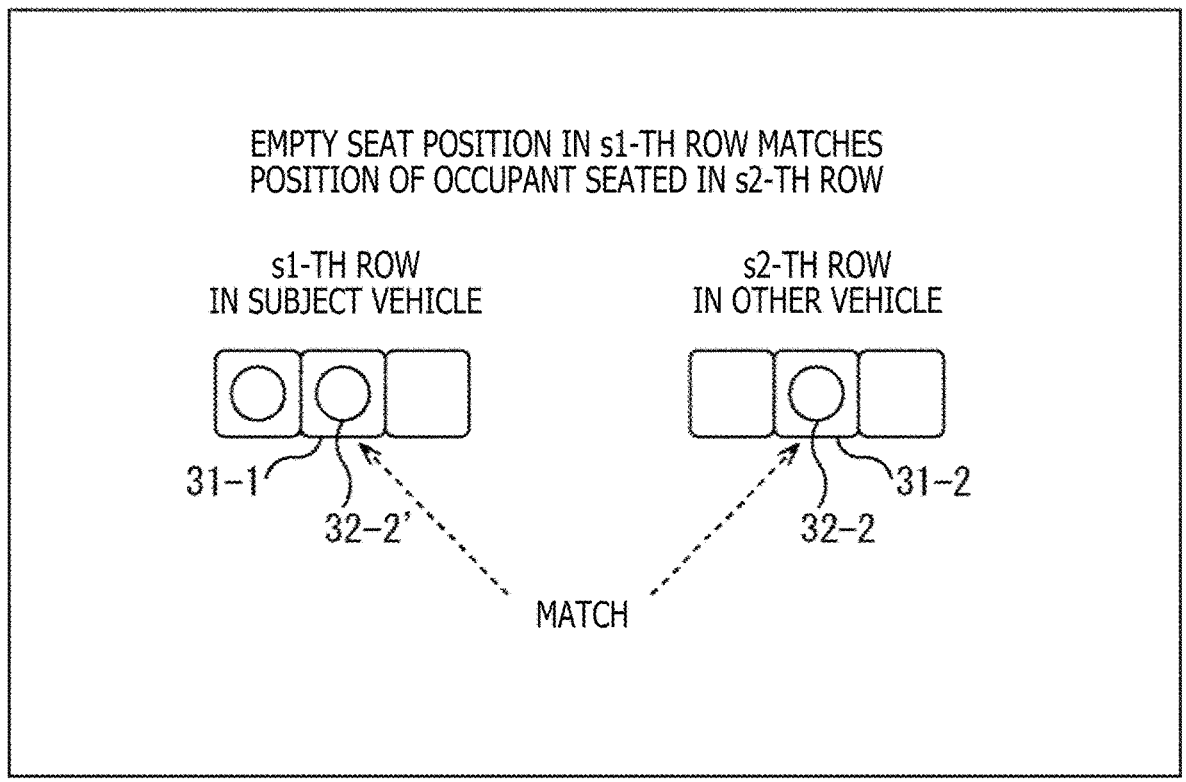
FIG. 24 is a diagram for describing a condition A.

On the other hand, in step S214, in a case where the s1-th row to be processed is determined to include an empty seat, the processing proceeds to step S126. In step S126, whether or not a condition A is satisfied is determined. The condition A will be described with reference to FIG. 24.

The condition A is a condition that an empty seat position in the s1-th row matches a seat position in the s2-th row. In a case where the occupant 32-2 seated in the middle seat 31-2 in the s2-th row in the other vehicle 11-2 is arranged in the subject vehicle 11-1, the seat corresponding to the position of the seat in which the occupant 32-2 is seated is the seat 31-1 in the s1-th row in the subject vehicle 11-1, and whether or not the seat 31-1 is empty is determined. In a case where the seat 31-1 in the middle of the s1-th row in the subject vehicle 11-1 is empty, the condition A is determined to be satisfied.

In step S126, in a case where the condition A is determined not to be satisfied, the processing proceeds to step S127. In this case, the seat in the subject vehicle 11-1 that corresponds to the seat in which the occupant 32-2 in the other vehicle 11-2 is seated is not empty. In such a case, the virtual occupant 32-2' corresponding to the occupant 32-2 in the other vehicle 11-2 is arranged in the empty seat close to the seat in the subject vehicle 11-1 that corresponds to the seat in which the occupant 32-2 in the other vehicle 11-2 is seated.

On the other hand, in step S126, in a case where the condition A is determined to be satisfied, the processing proceeds to step S128. In step S128, the occupant is arranged in the empty seat. In this case, the empty seat position in the s1-th row in the subject vehicle 11-1 matches the seat position in the s2-th row in the other vehicle 11-2, and thus, the virtual occupant 32-2' corresponding to the occupant 32-2 in the other vehicle 11-2 is arranged in the empty seat.

In step S127 or step S128, when a seat position setting rule for arranging, in the subject vehicle 11-1, the occupant riding in the other vehicle 11-2 is set, the seating is arranged in step S129. Description will be given with reference to FIG. 25.

Figure 25:
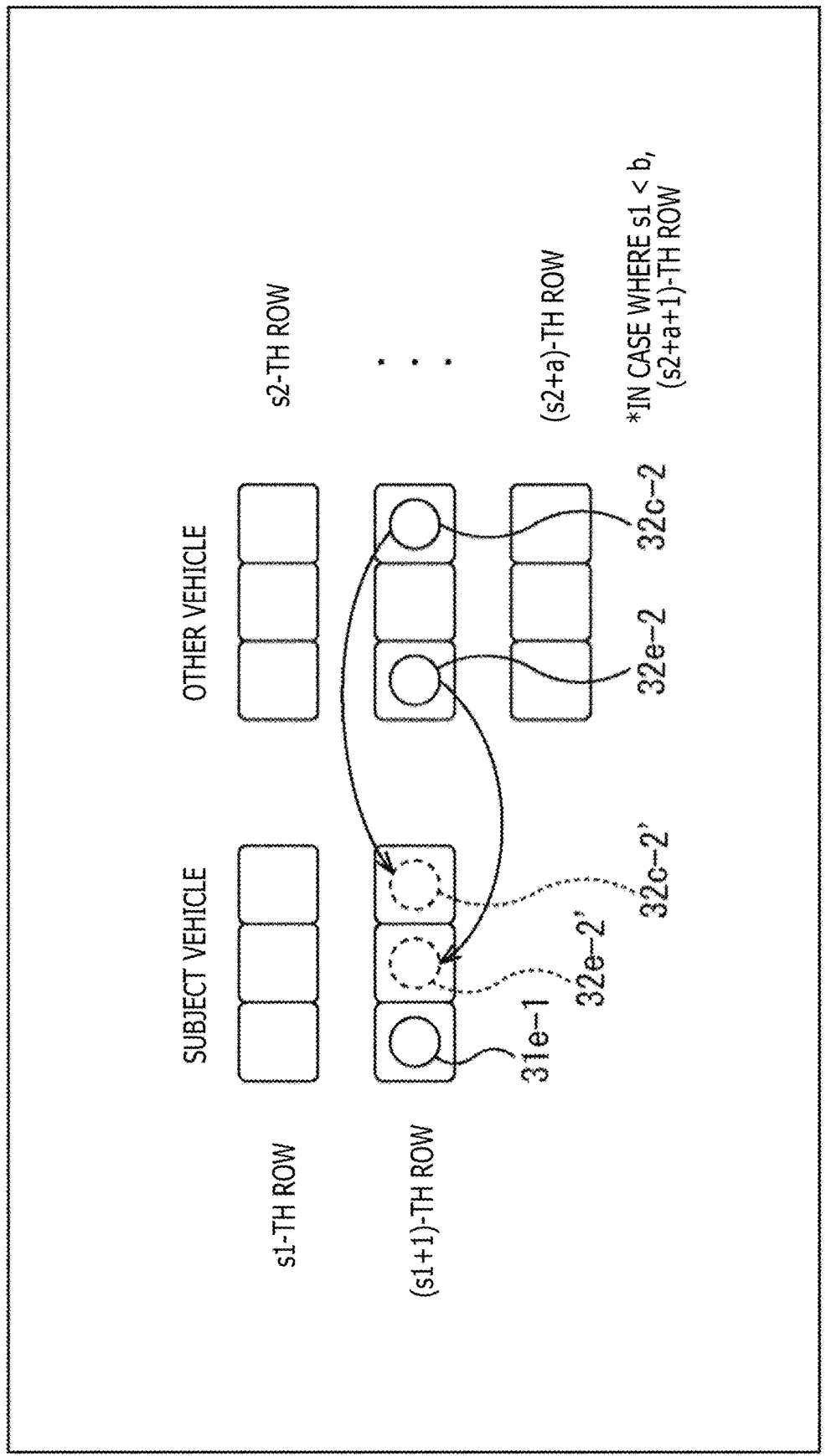
FIG. 25 is a diagram for describing the seating arrangement processing.

In a case where the occupant 32*c*-2 and the occupant 32*e*-2 in the other vehicle 11-2 are arranged in the subject vehicle 11-1, the seat in the subject vehicle 11-1 that corresponds to the seat in which the occupant 32*c*-2 in the other vehicle 11-2 is seated is empty, and thus, the result of the determination in step S126 is YES, and it is decided in step S128 to arrange the occupant in the empty seat. Thus, as depicted in FIG. 25, the occupant 32c-2 in the other vehicle 11-2 is arranged as the virtual occupant 32c-2' in the rightmost seat in the subject vehicle 11-1, which is an empty seat.

The occupant 32e-1 is seated in the seat in the subject vehicle 11-1 that corresponds to the seat in which the occupant 32e-2 in the other vehicle 11-2 is seated, and thus, the seat in the subject vehicle 11-1 is not empty. Accordingly, the result of the determination in step S126 is NO, and it is decided in step S127 to arrange the occupant in the seat close to the occupant 32e-1. Thus, as depicted in FIG. 25, the occupant 32e-2 in the other vehicle 11-2 is arranged as the virtual occupant 32e-2' in the empty seat on the right of the seat in which the occupant 32e-1 in the subject vehicle 11-1 is seated.

Described with reference to the flowchart illustrated in FIG. 22 again, the description will be continued. In step S125 or step S129, when the seat for the occupant in the other vehicle 11-2 is arranged, the processing proceeds to step S130. In step S130, whether or not the row s1 of seats in the subject vehicle 11-1 that is to be processed is smaller than the remainder b is determined.

In a case where it is determined in step S130 that s1<b is not satisfied, the processing proceeds to step S131. In step S131, the quotient a is added to the s2 row in the other vehicle 11-2 that is to be processed, and the resultant s2 row is set as a new processing target.

On the other hand, in step S130, in a case where s1<b is determined to be satisfied, the processing proceeds to step S132. In step S132, (quotient a+1) is added to the s2 row in the other vehicle 11-2 that is to be processed, and the resultant s2 row is set as a new processing target.

In step S131 or step S132, when the s2 row to be newly processed is set, the processing proceeds to step S133. In step S133, one is added to the s1 row in the subject vehicle 11-1 that is to be processed, and the resultant s1 row is set as a new processing target.

In step S134, whether or not the number S1 of rows in the subject vehicle 11-1 is greater than the s1 row to be processed is determined. In step S134, in a case where S1>s1 is determined to be satisfied, the processing returns to step S124 to repeat the subsequent processing. That is, in this case, the s1 row to be processed is determined to remain, and the processing returns to step S124 to process the unprocessed s1 row.

Figure 22:
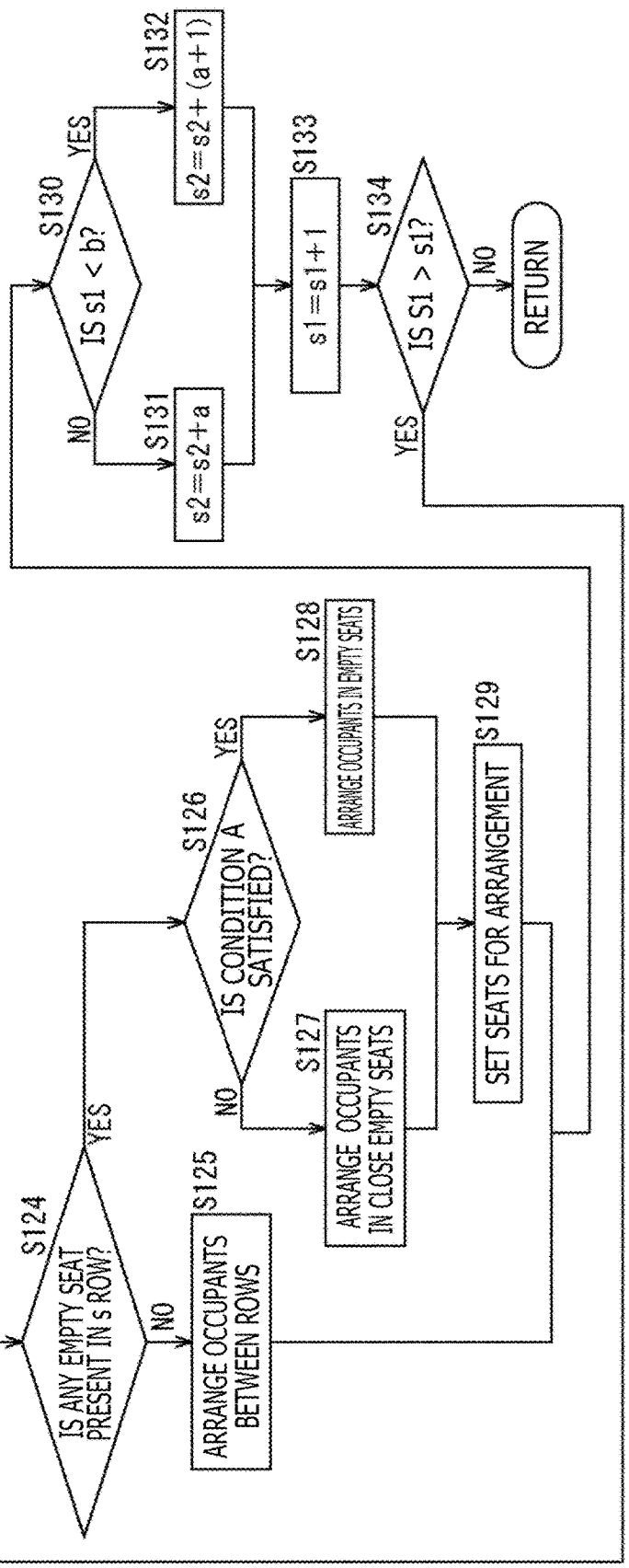
FIG. 22 is a flowchart for describing the seating arrangement processing with relative positions taken into account.

On the other hand, in step S134, in a case where S1>s1 is determined not to be satisfied, the processing in the flowchart illustrated in FIG. 22 is ended to return to the processing in the flowchart illustrated in FIG. 19.

Referring to the flowchart illustrated in FIG. 19, in step S89, when the seating arrangement processing with the relative positions taken into account is ended, the processing returns to the processing in the flowchart illustrated in FIG. 8.

By performing the seating arrangement as in the flowchart illustrated in FIG. 19, the seating arrangement can be performed such that a sound image is preferentially presented at the empty seat. In a case where the sound image is presented at a position where no occupant can be seated, i.e., at a position between the rows in the above-described example, this may possibly degrade the sense of presence of the occupant as compared with presentation of the sound image at the empty seat. Thus, through the processing as described above, the seating arrangement is performed such that the sound image is preferentially presented at the empty seat.

Specifically, as described with reference to the flowchart illustrated in FIG. 19, in a case where the total number of occupants is equal to or less than the capacity of the subject vehicle 11, the occupants are arranged in the empty seats in order. This allows the occupants in the other vehicle 11-2 to feel as if they were also seated in the respective seats in the subject vehicle 11-1.

In a case where the total number of occupants is above the capacity, the occupants are divided into groups on the basis of the ages of all the occupants. In a case where there are multiple groups each including two or more occupants of the same generation, grouping based on the age is determined to be enabled, and the seating is arranged according to the age or role. With this, it is possible to arrange occupants who can easily find a common topic and are likely to have a lively conversation together, at positions where they can talk comfortably with one another.

In a case where the grouping based on the age is difficult, the seating arrangement with the relative positions taken into account is performed. With this, the positional relation between the occupants in the other vehicle 11-2 can be reproduced in the subject vehicle 11-1.

Referring to the flowchart illustrated in FIG. 8, in step S14, when the static seating arrangement is performed, the processing for localizing sound images is executed on the basis of the arrangement (step S15).

In step S15, the occupants start a telephone conversation. When the occupants start the telephone conversation, the processing for localizing sound images also starts. The processing for localizing the sound images will be described later.

After the occupants have started the telephone conversation, in a case where they fail to have a lively conversation, for example, whether or not dynamic seating change is to be performed is determined in step S16 in order to change the seating arrangement or to reperform matching between the vehicles 11.

In step S16, in a case where the dynamic seating arrangement is determined to be performed, the processing proceeds to step S17. In step S17, dynamic seating arrangement processing is executed. With reference to a flowchart in FIG. 26, the processing related to the determination in step S16 and the dynamic seating arrangement processing in S17 will be described.

In step S151, whether or not the occupant 32-1 in the subject vehicle 11-1 has responded to a conversation between the occupants in another group is determined. As described above, the occupants are divided into groups on the basis of the age, role, or the like. It is determined in step S151 whether or not the occupant 32 classified into a predetermined group has responded to what the occupants 32 classified into another group are talking about.

In a case where it is determined in step S151 that the occupant 32 in the predetermined group has responded to the conversation between the occupants in the other group, the processing proceeds to step S152. In step S152, the occupant 32 having responded to the conversation is rearranged close to the occupants 32 in the group to which the occupant 32 has responded. By performing such seating rearrangement, the occupant 32 can be added to the group where the occupant 32 can talk about something that the occupant 32 is interested in.

On the other hand, in step S151, in a case where the occupant 32 is determined not to have responded to the conversation between the occupants in the other group, the processing proceeds to step S153. In step S153, whether or not the occupants have reached (approach) a point of the itinerary is determined. The point of the itinerary may be, for example, a destination of the drive, a place scheduled for a meal, or the like.

In step S153, in a case where the occupants are determined to have reached the point of the itinerary, the processing proceeds to step S154. In step S153, the seating is rearranged in such a manner that the drivers are arranged close to each other. By performing such seating rearrangement, persons who manage the itinerary can easily manage it by checking it together, for example.

On the other hand, in step S153, in a case where the occupants are determined not to have reached the point of the itinerary, the processing proceeds to step S155. In step S155, whether or not any person has woken up is determined.

In step S155, in a case where it is determined that there is a person who has woken up, the processing proceeds to step S156. In step S156, the person having woken up is rearranged in a group whose average age is the closest to the age of the person having woken up. By performing such seating rearrangement, the person having woken up can smoothly join the conversation.

On the other hand, in step S155, in a case where no person is determined to have woken up, the processing proceeds to step S157. In step S157, whether or not any person has fallen asleep is determined.

In step S157, in a case where it is determined that there is a person who has fallen sleep, the processing proceeds to step S158. In step S158, the seating is rearranged in such a manner that the center of the group is away from the person having fallen asleep. By performing such seating rearrangement, the person having fallen asleep can sleep peacefully, while other persons can continue their conversation.

As described above, the seating is rearranged when a certain condition is satisfied, e.g., when the occupant has responded to the conversation between the occupants in the other group or the occupants have reached a point of the itinerary. This allows the occupant 32 to smoothly join the conversation that the occupant 32 is interested in, or to start a required conversation.

Whether or not to rearrange the seating may be determined under a condition other than those described above. Alternatively, a condition other than the above-described conditions may be provided, and determination may be made under the condition.

For example, whether or not any group is having a conversation including the same keyword is determined, and in a case where it is determined that there is a group having a conversation including the same keyword, the seating may be rearranged in such a manner that a corresponding occupant is included in the group. In this case, the occupant can interact with more people.

For example, whether or not the occupant starts to eat a meal may be determined, and in a case where the occupant is determined to start to eat a meal, the occupant may be rearranged near the persons who are eating. In this case, the occupants have a common topic about the meal and can start a conversation.

On the other hand, in step S157, in a case where no person is determined to have fallen asleep, the processing proceeds to step S159. In step S159, whether or not the frequency of talks has decreased is determined. Whether or not the frequency of talks has decreased can be determined by determining whether or not the occupants are having a lively conversation. Detection of liveliness will be described later, and processing subsequent to step S159 will be described first.

Figure 26:
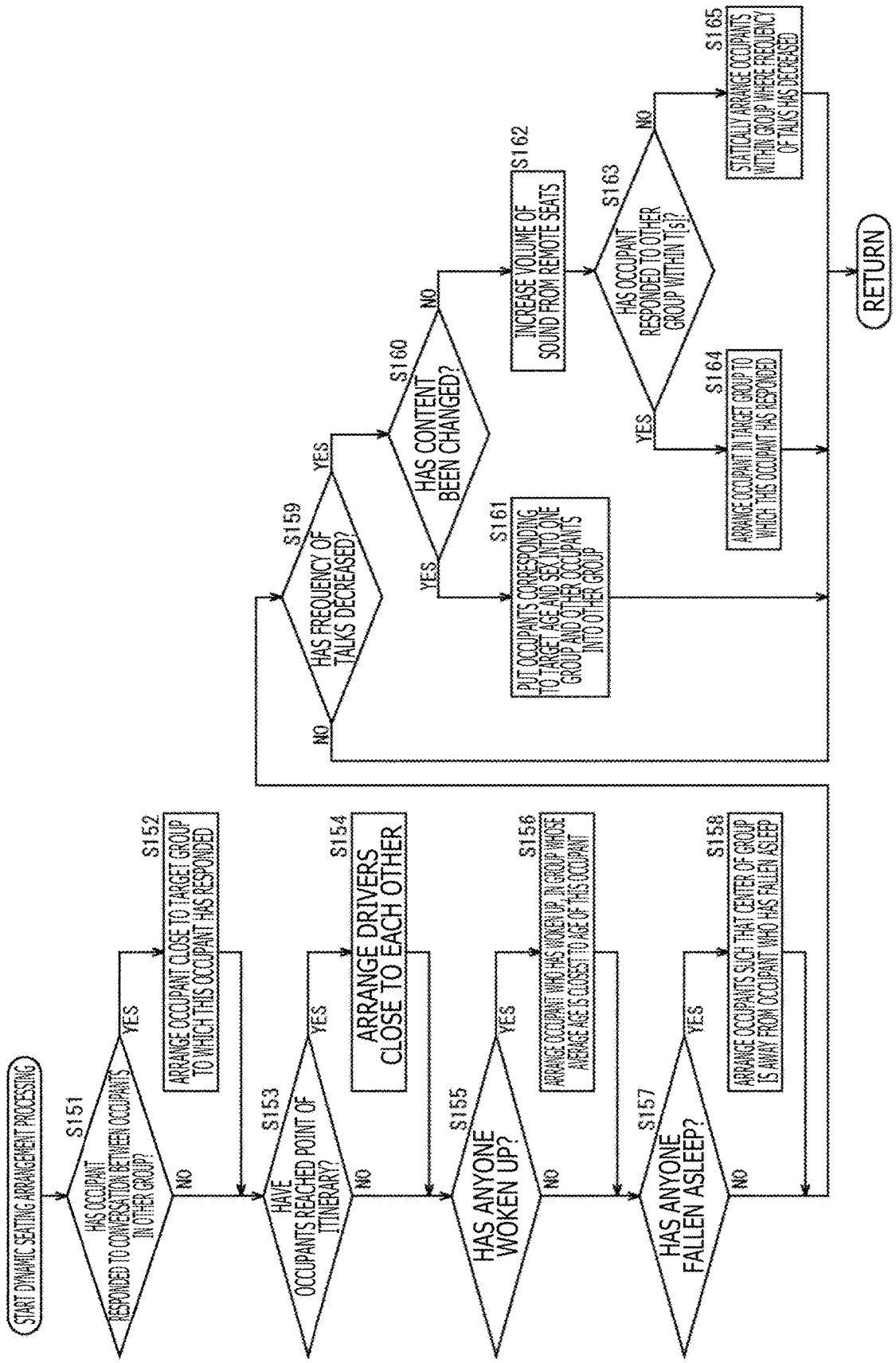
FIG. 26 is a flowchart for describing dynamic seating arrangement processing.

In step S159, in a case where the frequency of talks is determined not to have decreased, the processing in the flowchart illustrated in FIG. 26 is ended to return to the processing in the flowchart illustrated in FIG. 8. When the frequency of talks is determined not to have decreased, in other words, the degree of liveliness is determined not to have decreased, no seating rearrangement is performed so as not to interrupt the lively conversation.

On the other hand, in a case where the frequency of talks is determined to have decreased, the processing proceeds to step S160. In step S160, whether or not the content has been changed is determined. In step S160, in a case where the content is determined to have been changed, the processing proceeds to step S161. The content may be, for example, a moving image such as a movie or a television show, a still image such as a photograph, music, or the like. The content may include a topic being talked about, and whether or not what the occupants are talking about has been changed may be determined.

In step S161, the occupants are reclassified such that the occupants corresponding to the target age and sex for the changed content are put into one group and the other occupants are put into the other group. Then, the seating is arranged on the basis of the reclassified groups. By performing such seating rearrangement, the occupants of the same generation can have a lively conversation about the content.

On the other hand, in step S160, in a case where the content is determined not to have been changed, the processing proceeds to step S162. In step S162, processing is executed to increase the volume of sound from the remote seats. In step S163, whether or not the occupant has responded to, for example, a conversation between the occupants in another group within T seconds is determined.

The seating is rearranged when the degree of liveliness of the conversation decreases. Before the seating is rearranged, a certain length of time is provided to allow the occupant 32 to spontaneously find a conversation that the occupant 32 is interested in. Additionally, when the occupant 32 finds a conversation that the occupant 32 is interested in, the seating is rearranged in such a manner that the occupant 32 is included in the group having the conversation.

Thus, in step S162, the sound volume of a conversation from the remote seats is increased to create a situation in which the occupant 32 can easily hear the details of the conversation. In step S163, when such a situation continues for a predetermined length of time T, whether or not the occupant 32 has taken an interest in the conversation between the occupants in another group is determined.

In a case where it is determined in step S163 that the occupant 32 has responded to the conversation between the occupants in the other group, the processing proceeds to step S164. In step S164, the occupant is rearranged in the group to which the occupant has responded. By performing such seating rearrangement, the occupant can join the conversation that the occupant is interested in.

On the other hand, in a case where it is determined in step S163 that the occupant has not responded to the conversation between the occupants in another group, the processing proceeds to step S165. In step S165, the static seating arrangement is performed within a group where the frequency of talks has decreased. The static seating arrangement can be performed similarly to the static seating arrangement processing in step S14, and thus, the description thereof is omitted.

When the processing related to the dynamic seating arrangement is thus executed, the processing returns to the processing in the flowchart illustrated in FIG. 8.

In step S16 (FIG. 8), in a case where the dynamic seating arrangement is determined not to be performed, the processing proceeds to step S18. In step S18, a speaker (occupant 32-2) who is talking in the other vehicle 11-2 is identified, and in step S19, the seat 31-1 in the subject vehicle 11-1 to which the identified speaker is assigned is identified. In step S20, a sound is output from the identified seat 31-1.

The processing in step S18 to step S20 is an example of processing for presenting a sound image. For example, in a case where seat speakers are provided for each seat as depicted in A of FIG. 3, by outputting a sound from the speakers provided for the seat 31 in which the virtual occupant is arranged, it is possible to make it appear as if the occupant were seated in the seat 31.

As the processing in step S18 to step S20, the sound image localization processing in step S15 may be executed. Additionally, in a case where the processing in step S18 to step S20 is the sound image localization processing, the sound image localization processing in step S15 may be similar to the processing in step S18 to step S20.

In step S21, whether or not to change the matched vehicle 11 is determined. Whether or not to change the matched vehicle 11 can be determined by using conditions similar to those used to determine in step S16 whether or not to perform the dynamic seating change. For example, in a case where, in the dynamic seating change processing in step S16 (flowchart in FIG. 26), the determinations in step S151, step S153, step S155, and step S157 are made and the results of two or more determinations are YES, it may be determined that rematching between the vehicles 11 is to be performed.

For example, rematching between the vehicles 11 may be determined to be performed, in a case where the degree of liveliness is numerically detected and determined to be equal to or less than a predetermined threshold. For example, rematching between the vehicles 11 may be performed in a case where a predetermined length of time has elapsed since the execution of matching, in order to allow the occupants to enjoy having a conversation with new people.

In step S21, in a case where the matched vehicle 11 is determined to be changed, the processing returns to step S12 to repeat the subsequent processing.

On the other hand, in step S21, in a case where the matched vehicle 11 is determined not to be changed, the processing in the flowchart illustrated in FIG. 8 is ended.

<Detection of Liveliness>

The processing that is executed in step S159 (FIG. 26) and related to the determination of whether or not the frequency of talks has decreased will be described. A reduced frequency of talks means that the conversation has become dull. Now, an information processing apparatus for detecting liveliness will be described with reference to FIG. 27.

In a case where liveliness is detected, the input unit 61 of the information processing apparatus 51 (FIG. 4) includes a camera 201 and a microphone 202, and the information processor 64 includes a liveliness detection unit 211.

The liveliness detection unit 211 includes a face detection dictionary accumulation section 221, a facial expression dictionary accumulation section 222, a face detection section 223, a facial expression quantification section 224, a voice recognition dictionary accumulation section 225, a volume detection section 226, a speech-to-text section 227, and a detected information accumulation section 228.

Figure 27:
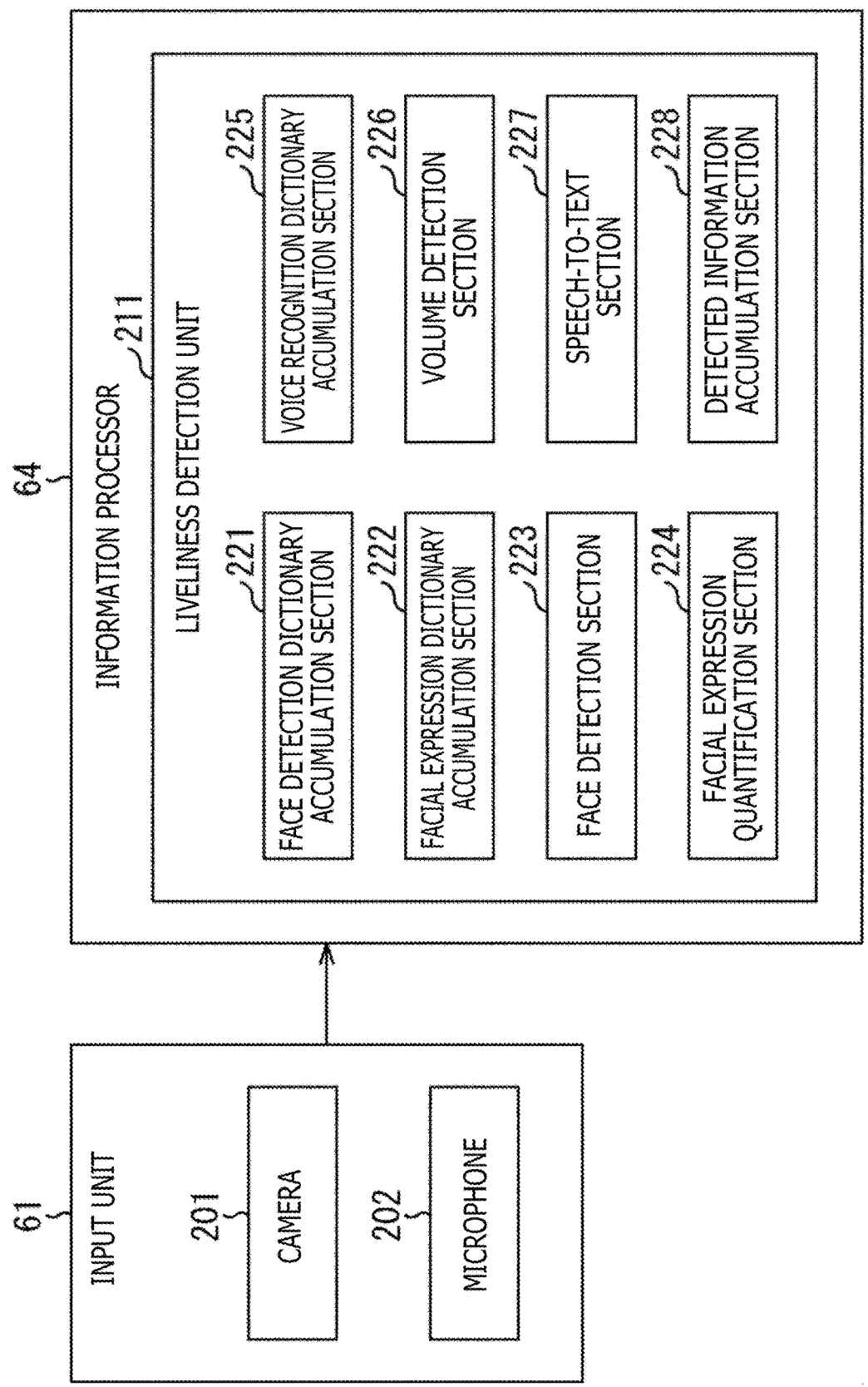
FIG. 27 is a diagram depicting a configuration example of a liveliness detection unit.
Figure 28:
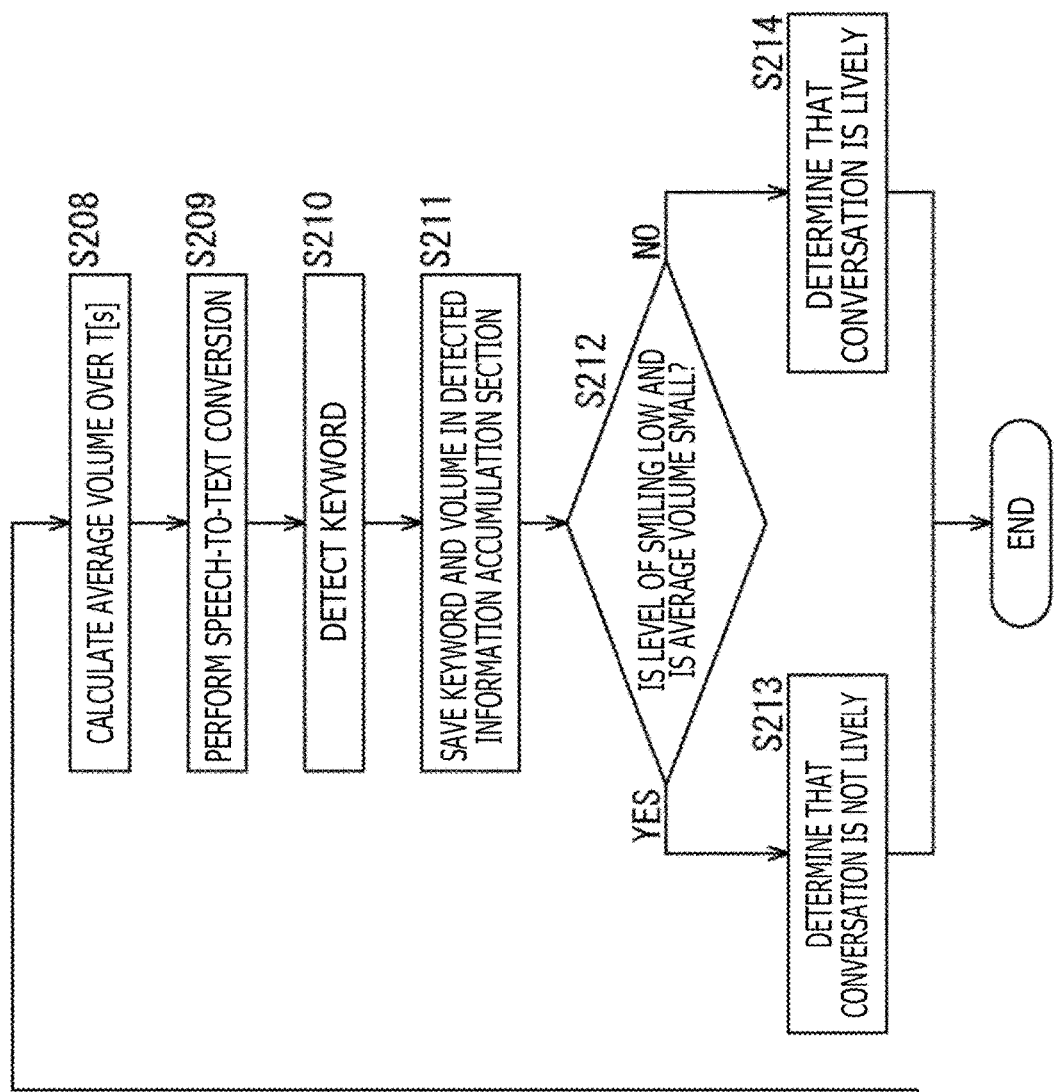
FIG. 28 is a flowchart for describing liveliness detection processing.

Processing executed by the liveliness detection unit 211 depicted in FIG. 27 will be described with reference to a flowchart in FIG. 28. In step S201, the camera 201 of the input unit 61 captures an image, and the captured image is acquired. The camera 201 is provided at a position where the camera 201 can capture images of the interior of the vehicle and images of the occupants.

The image acquired in step S201 is fed to the face detection section 223. In step S202, the face detection section 223 analyzes the fed image to detect the face of the occupant. Information required during the detection is accumulated in the face detection dictionary accumulation section 221. In the face detection dictionary accumulation section 221, for example, a dictionary for face detection that is acquired by machine learning is accumulated. In a case where images for face authentication are registered in the preregistration parameter 91 (FIG. 6), this information may be used for face detection.

In step S203, the facial expression quantification section 224 detects the facial expression of the face detected by the face detection section 223 and quantifies the detected facial expression. As the facial expression, a smile is detected, and a numerical value of 0% to 100% is calculated as the level of smiling. The calculated level of smiling is saved in the detected information accumulation section 228 in step S205.

In step S206, the microphone 202 of the input unit 61 acquires voice data of the voice of the occupant 32. The acquired voice data is fed to the volume detection section 226.

In step S207, the volume detection section 226 analyzes the voice data to calculate the sound volume. Such calculation of the sound volume is performed for a predetermined length of time of T seconds to calculate the average sound volume over T seconds (step S208).

The voice data is also fed to the speech-to-text section 227. In step S209, the speech-to-text section 227 references a dictionary that is accumulated in the voice recognition dictionary accumulation section 225 and that is referenced when voice recognition is performed, to analyze the voice data. Then, the speech-to-text section 227 transcribe what the occupant has said, into text.

In step S210, the speech-to-text section 227 detects a keyword from the text into which the voice data is transcribed.

In step S211, the detected keyword and the information regarding the sound volume are saved in the detected information accumulation section 228. The keyword stored in the detected information accumulation section 228 can be used for the processing for vehicle matching and the processing for dividing the occupants 32 into groups.

In step S212, whether or not the level of smiling and the average sound volume are low is determined. In step S212, in a case where the level of smiling and the average sound volume are determined to be low, the processing proceeds to step S213. In step S213, the result of the determination indicates that the conversation is not lively.

On the other hand, in step S212, in a case where it is determined that the level of smiling is not low and/or the average sound volume is not low, the processing proceeds to step S214. In step S214, the result of the determination indicates that the conversation is lively.

As described above, the facial expressions of the occupants, the loudness of voices, and the like are observed, and the results of the observation are used to determine whether or not the conversation is lively. The result of the determination is used during the determination processing in step S159 (FIG. 26) as described above.

<Processing for Localizing Sound Image>

Figure 29:
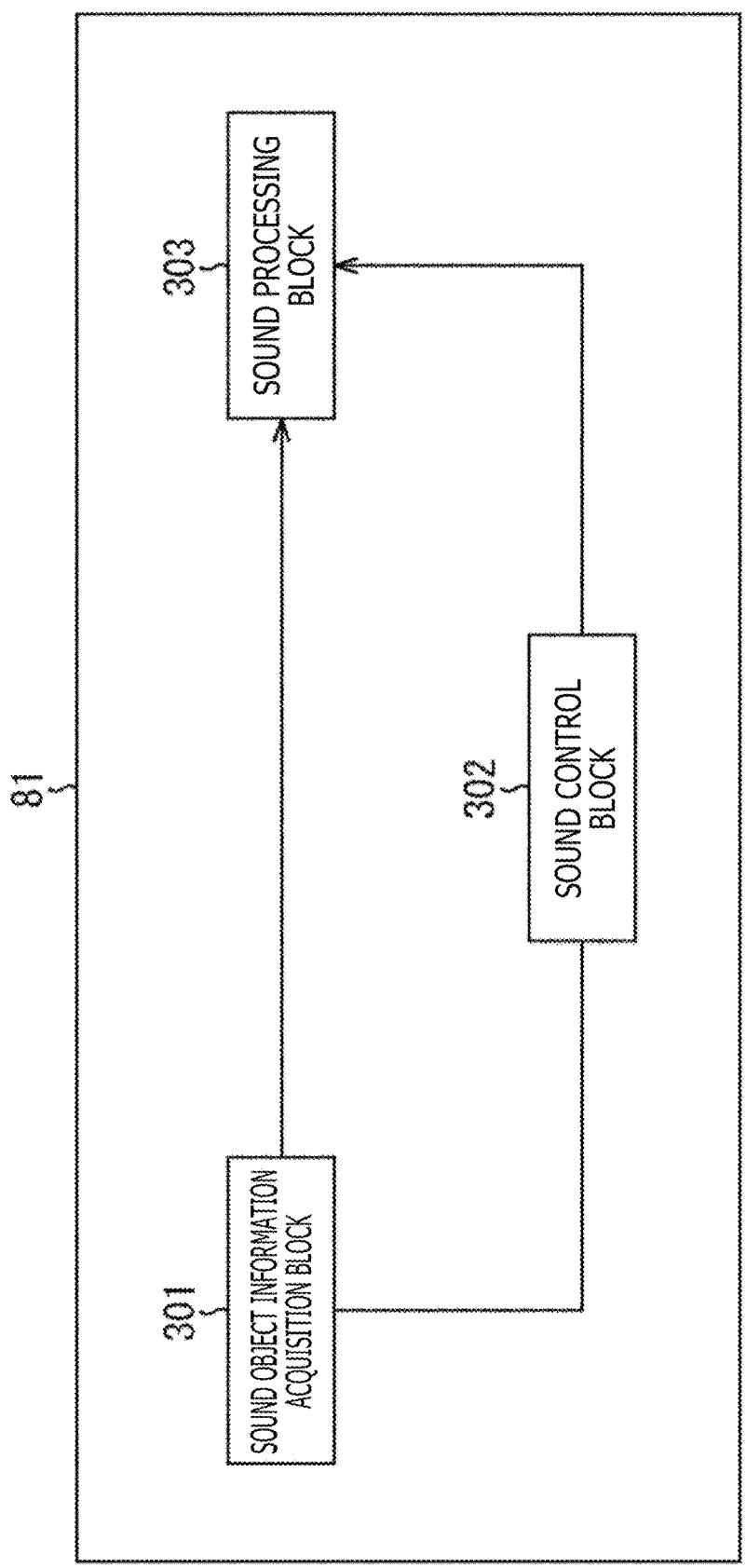
FIG. 29 is a diagram depicting a configuration example of a sound image localization processing section.

The processing related to the localization of a sound image, which is executed in step S15 (FIG. 8) and in steps S18 and S19 (FIG. 8), will be described. FIG. 29 is a diagram depicting a configuration example of the sound image localization processing section 81.

The sound image localization processing section 81 includes a sound object information acquisition block 301, a sound control block 302, and a sound processing block 303. The sound object as used herein refers to a sound produced by the occupant 32.

The sound object information acquisition block 301 acquires information regarding the sound object acquired via the input/output processing unit 62. The information regarding the sound object refers to sound data of the sound object and position data of the sound object. The sound data of the sound object acquired by the sound object information acquisition block 301 is fed to the sound processing block 303, and the position data of the sound object is fed to the sound control block 302.

The position data of the sound object fed to the sound control block 302 refers to the data regarding the position (seat position) of the occupant 32-2' who corresponds to the occupant in the other vehicle 11-2 and who is virtually arranged in the subject vehicle 11-1. The data regarding the voice produced by the occupant 32-2' is fed as sound data of the sound object from the sound object information acquisition block 301 to the sound processing block 303. Note that the sound data includes, besides the voices of the occupants, sounds generated in response to an operation made by the occupants, such as an operating sound of a smartphone and an opening sound of a can.

The sound control block 302 decides the direction of a sound at the position of the occupant 32-1 in the vehicle 11, the sound presenting the voice of the virtual occupant 32-2'. The direction of the sound is based on the forward direction of the vehicle 11. The sound control block 302 feeds the position data of the sound object (the data regarding the position relative to the occupant 32-1 and direction) to the sound processing block 303.

On the basis of the position data of the sound object from the sound control block 302, the sound processing block 303 generates data of a sound to be output from the speaker 33 provided in the subject vehicle 11-1, and outputs the data to the speaker 33.

<Outline of VPT>

A virtual surround technology can be used to output the sound of a sound image (sound object) of the occupant 32-2 in the other vehicle 11-2 as described above, from the speakers 33 provided in the subject vehicle 11-1. In the present technology, VPT (registered trademark of Sony Corporation) can be utilized as such a virtual surround technology. For example, in a case where a user uses headphones, VPT (Virtual Phones Technology) localizes a sound not inside the head of the user but outside the head so as to create a sound field where the user can hear the sound naturally as if it were reproduced from speakers arranged in front of or behind the user.

Specifically, in VPT, by measuring an HRTF (Head Related Transfer Function) as transfer characteristics from a sound source to both ears, and convoluting the measured HRTF into an input signal, a sound field can be created as in the case where the user is listening to 5.1-channel sound or 7.1-channel sound through speakers, even with the sound reproduced from the headphones. Sound processing of the present technology to which VPT is applied will be described. Note that seven-channel surround is applied as VPT (a 0.1-channel subwoofer is not used).

Note that here, as an example, VPT is applied to a case where sounds are output not from the headphones but from the speakers 33 provided in the vehicle 11. The arrangement of the speakers 33 and the number of speakers 33 arranged vary between vehicles 11 as described with reference to FIG. 3. Here, processing related to the localization of a sound image will be described by using, as an example, the arrangement and number of the speakers 33 to which a general virtual surround technology is applied.

<First Voice Path>

Figure 30:
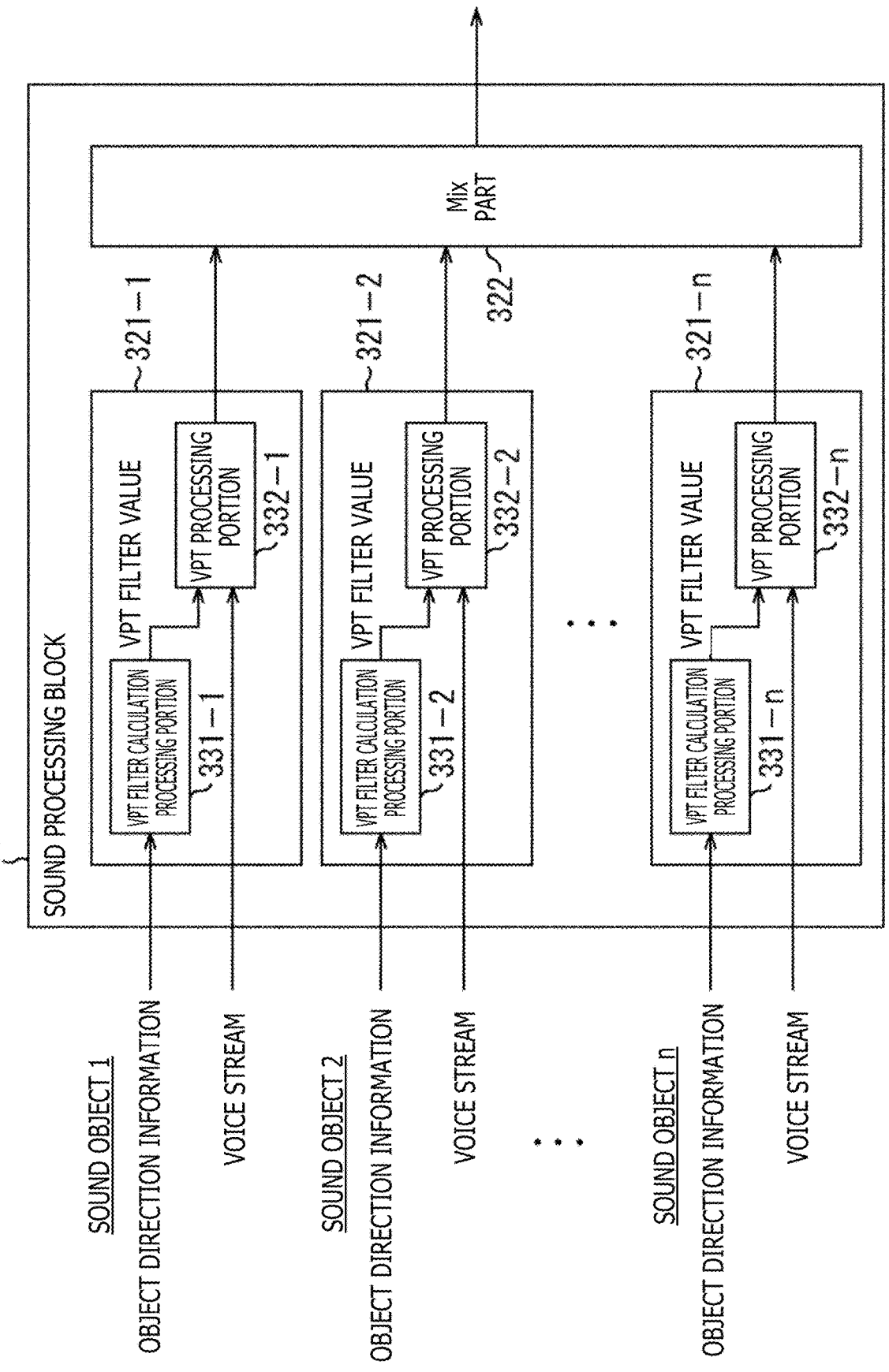
FIG. 30 is a diagram depicting a configuration example of a sound processing block.

FIG. 30 is a diagram depicting an internal configuration example of the sound processing block 303. As depicted in FIG. 30, the sound processing block 303 is provided with sound object processing parts 321-1 to 321-n (n is an integer of 1 or larger) to execute sound processing on a sound object included in one or more sound objects. Specifically, the sound object processing part 321-1 includes a VPT filter calculation processing portion 331-1 and a VPT processing portion 332-1.

The VPT filter calculation processing portion 331-1 receives, as input, object direction information regarding a sound object 1 among sound objects 1 to n. The object direction information indicates the direction of the sound object with reference to the occupant 32-1 in the subject vehicle 11-1.

On the basis of the object direction information regarding the sound object 1, the VPT filter calculation processing portion 331-1 calculates a VPT filter value and feeds the VPT filter value to the VPT processing portion 332-1. For example, in a case where seven-channel surround VPT is used, in order to arrange the channels closer to all of the positions of the sound objects, phantom processing or the like is executed to determine the VPT filter value that provides sound information to multiple channels of the seven channels. Note that the VPT filter value may reflect the coordinates of a display area A as necessary.

In a case where the VPT processing portion 332-1 is fed with a VPT filter value from the VPT filter calculation processing portion 331-1, the VPT processing portion 332-1 updates the VPT filter value. For example, the object direction information is calculated 30 times per second, and thus, the VPT filter value is calculated and updated according to the intervals of the calculation of the object direction information. Additionally, the VPT processing portion 332-1 is fed with a voice stream of the sound object from the sound object information acquisition block 301. According to the VPT filter value, the VPT processing portion 332-1 convolutes the HRTF into the voice stream as an input signal. The voice stream subjected to VPT processing is fed to a Mix part 322. For example, with the seven-channel surround VPT, an input signal is multiplied by seven-channel HRTF coefficients to convolute the HRTF coefficients into the input signal to obtain two-channel outputs.

The sound object processing parts 321-2 to 321-n are configured similarly to the sound object processing part 321-1. That is, in the sound object processing parts 321-2 to 321-n, the VPT processing is executed according to the VPT filter value for each voice stream of the sound object contained in the sound objects. Thus, the Mix part 322 is fed with the voice streams of the sound objects 2 to n subjected to the VPT processing. The Mix part 322 executes mix processing on the voice streams 1 to n and outputs the processed voice streams to the speakers 33. For example, the voice stream includes a waveform in a wav file format, and the speaker 33 reproduces the waveform of the voice signal subjected to the VPT processing.

<Sound Processing at Intermediate Position>

Figure 31:
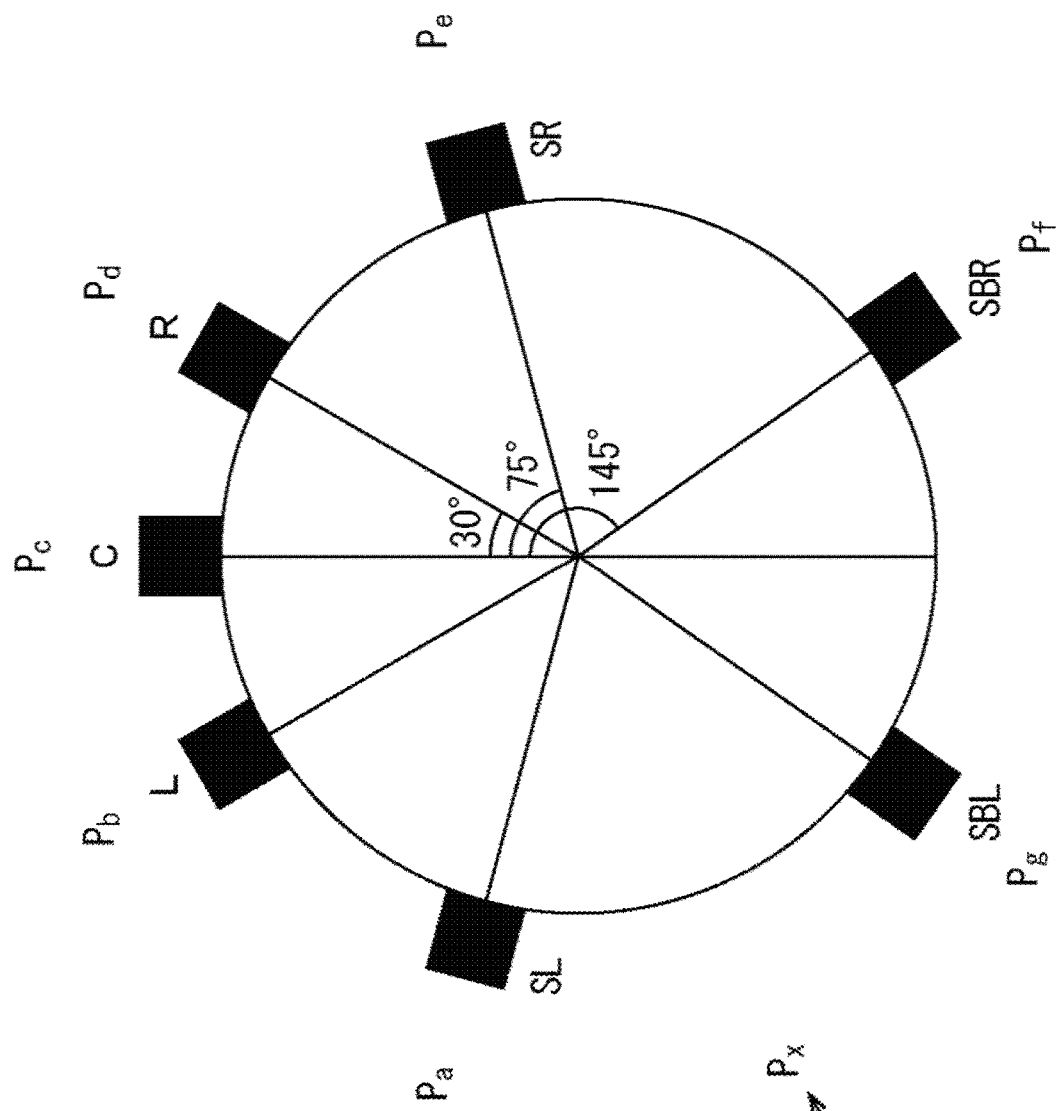
FIG. 31 is a diagram for describing processing related to sound image localization.

FIG. 31 is a diagram for describing sound processing at an intermediate position on a first voice path.

Specifically, in a case where the object direction information indicates a position Pa, the VPT filter calculation processing portion 331-1 decides the use of the HRTF for SL-ch(a) of the seven-channel surround and updates the VPT filter value. However, mute is assigned to channels corresponding to positions Pb to Pg. In the VPT processing portion 332-1, according to the VPT filter value, an HRTF for SL-ch(a) for the left ear is convoluted into the voice signal. Similarly, an HRTF for SL-ch(a) for the right ear is separately convoluted into the voice signal. In the example of sound processing at the intermediate position, the sound object has only one direction, and one voice path is present. Accordingly, the Mix part 322 outputs, to the speaker 33, the voice signal subjected to the VPT processing by the VPT processing portion 332-1. Thus, for example, the speakers 33 in the vehicles 11 reproduce the waveform of the voice signal subjected to the VPT processing.

Then, in a case where a position Px that is an intermediate position between a position Pa and a position Pg is indicated, the VPT filter calculation processing portion 331-1 decides the use of the HRTF for SL-ch(a) of the seven-channel surround and the HRTF for SL-ch(g) of the seven-channel surround, and updates the VPT filter values. However, mute is assigned to channels corresponding to the positions Pb to Pf. In the VPT processing portion 332-1, according to the VPT filter value, the HRTF for SL-ch(a) for the left ear is convoluted into the waveform in the wav file format received as the voice signal. Similarly, the HRTF for SL-ch(a) for the right ear is separately convoluted into the voice signal. Further, in the VPT processing portion 332-1, according to the VPT filter value, an HRTF for SL-ch(g) for the left ear is convoluted into the waveform in the wav file format received as the voice signal. Similarly, the HRTF for SL-ch(g) for the right ear is separately convoluted into the voice signal.

However, for the gains of SL-ch(a) and SL-ch(g), since the position Px is the intermediate position between the position Pa and the position Pg, the same gain is provided for SL-ch(a) and SL-ch(g). For example, by multiplying the value of SL-ch(a) by 0.7 and multiplying the value of SL-ch(g) by 0.7, an output obtained by combining the resultant values can be made equivalent to a single output from the position Pa. Thus, the speakers 33 in the vehicle 11 reproduce the waveform of the voice signal subjected to the VPT processing to which the HRTFs for SL-ch(a) and SL-ch(g) are applied, allowing the sound to be heard even at the position Px corresponding to the intermediate position between the position Pa and the position Pg.

In the above description, as an example, the speakers 33 are arranged as depicted in FIG. 31 to form the seven-channel surround. However, even in a case where the speakers 33 are arranged at the respective seats 31 as depicted in A of FIG. 3 and a case where the speakers 33 are arranged in doors of the vehicle 11 as depicted in B of FIG. 3, application of the method described above allows sound images of the occupants to be localized at any positions.

<Second Voice Path>

Figure 32:
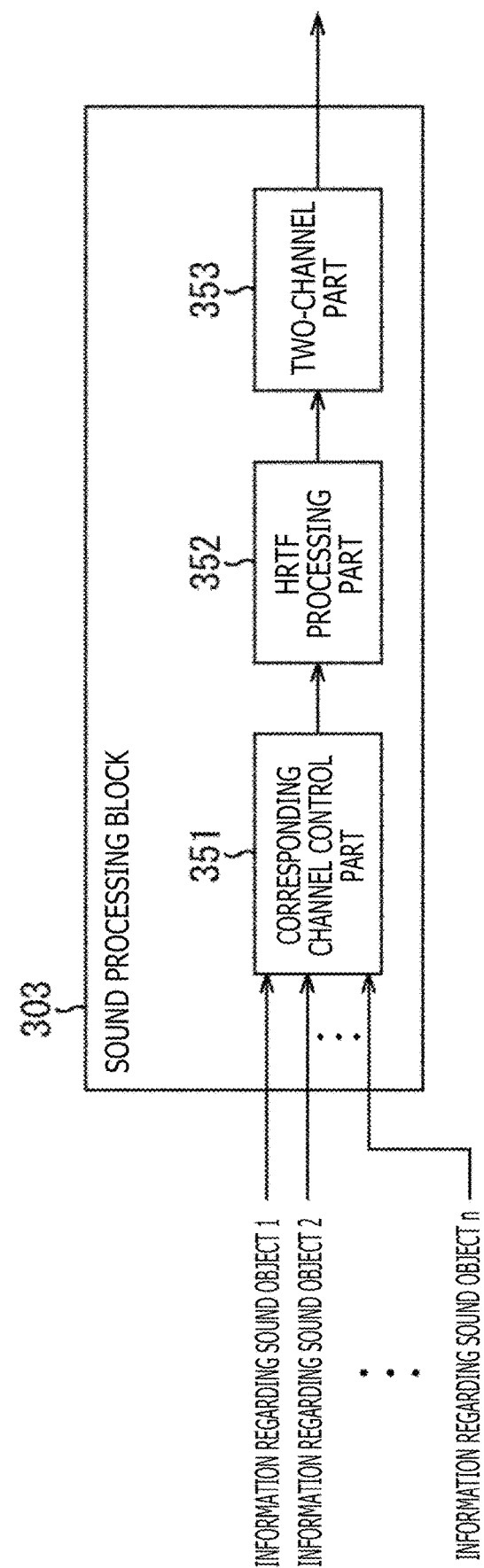
FIG. 32 is a diagram depicting a configuration example of the sound processing block.

FIG. 32 is a diagram for describing a second voice path of sound objects.

As depicted in FIG. 32, the sound processing block 303 includes a corresponding channel control part 351, an HRTF processing part 352, and a two-channel part 353.

The corresponding channel control part 351 receives, as input, information regarding sound objects 1 to n (n is an integer of 1 or larger). In a case where information regarding multiple sound objects is input to the corresponding channel control part 351, a mix sound is generated and allocated to a predetermined channel according to the information regarding each sound object. Additionally, the corresponding channel control part 351 decides an HRTF to be used and feeds the HRTF to the HRTF processing part 352.

According to the HRTF fed from the corresponding channel control part 351, the HRTF processing part 352 convolutes the HRTF into the waveform of the voice signal. The two-channel part 353 converts the voice signal from the HRTF processing part 352 into two-channel signal according to the number of final output channels, and outputs the resultant voice signal to the speakers 33 in the vehicle 11.

Figure 33:
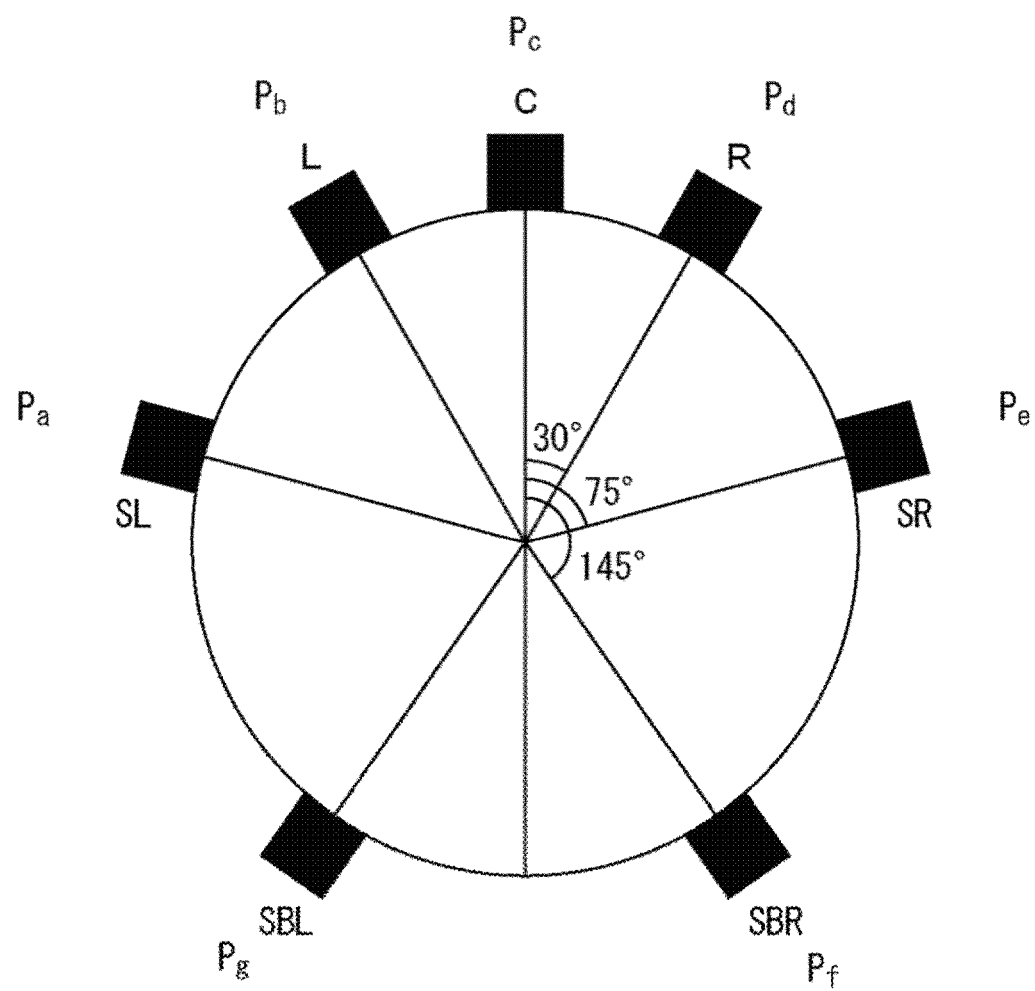
FIG. 33 is a diagram for describing processing related to sound image localization.

Specifically, description will be given with reference to FIG. 33. According to the object direction information, the corresponding channel control part 351 decides the use of the position Pa, that is, the HRTF for SL-ch(a) of the seven-channel surround, and assigns mute to the channels corresponding to the other positions Pb to Pg. However, in this example, one sound object is provided (only one direction), and thus, no additional position is to be used. Subsequently, the HRTF processing part 352 convolutes the HRTF for SL-ch(a) for the left ear into the waveform in the wave file format received as an input voice signal. Additionally, similarly, the HRTF for SL-ch(a) for the right ear is separately convoluted into the voice signal. Then, the two-channel part 353 converts the voice signal, including seven channels, into a two-channel signal according to the number of final output channels, and outputs the resultant voice signal to the speakers 33 in the vehicle 11. Thus, the speakers 33 in the vehicle 11 reproduce the waveform of the voice signal subjected to the VPT processing.

Then, in a case where the object direction information indicates the position Pg, the corresponding channel control part 351 decides the use of the HRTF for SBL-ch(g) of the seven-channel surround. Subsequently, the HRTF processing part 352 convolutes the HRTF for SBL-ch(g) for the left ear into the waveform in the wave file format received as an input voice signal. Additionally, similarly, the HRTF for SBL-ch(g) for the right ear is separately convoluted into the voice signal. Then, the two-channel part 353 converts the voice signal, including seven channels, into a two-channel signal, causing the speakers 33 in the vehicle 11 to reproduce the waveform of the voice signal subjected to the VPT processing.

By using such a method, a sound image corresponding to the occupant 32-2 in the other vehicle 11-2 can be localized at a predetermined position in the subject vehicle 11-1.

For example, in a case where the speakers 33 are arranged at each seat 31 as depicted in A of FIG. 3 and where a sound image of the virtually arranged occupant is localized in the seat 31e, the two channels to be processed by the two-channel part 353 are the speaker 33e-1 and the speaker 33e-2. Additionally, in a case where a sound image is localized between the seat 31b and the seat 31e, the two channels to be processed by the two-channel part 353 are also the speaker 33e-1 and the speaker 33e-2.

In a case where a sound image of the virtually arranged occupant is localized in the seat 31d, the two channels to be processed by the two-channel part 353 are the speaker 33c-2 and the speaker 33e-2. Additionally, in a case where a sound image is localized between the seat 31d and the seat 31e, the two channels to be processed by the two-channel part 353 are the speaker 33c-1 and the speaker 33e-2.

The speakers for outputting sounds are selected according to the position where a sound image is localized, such as the position in the seat, the position between the rows of seats, or the position between the seats, and a sound image is localized at the position set by the method as described above.

Note that, though the sound processing, the magnitude of a sound or the like can be changed according to the position. The magnitude of the sound is increased at the position of a close seat, whereas the magnitude of the sound is reduced at the position of a remote seat. This sound processing is an example, and other sound processing can be applied as long as the sound processing allows the occupant 32-1 to suitably listen to the sound from the sound image.

In the seven-channel surround of VPT described above, the sound object is localized in the horizontal direction. However, for example, by arranging front high speakers L (FH) and R (FH) at positions immediately above front speakers (L and R), that is, by taking a VPT configuration in the upward direction, it is possible to adopt such a configuration that sound objects are localized not only in the horizontal direction but also in the vertical direction. Further, by providing a multichannel structure including seven channels as described above or more, and taking a VPT configuration for the channels, sound objects can be more stereoscopically configured.

Here, the example in which the seat speakers 33 (two channels) provided at each seat 31 are used (A of FIG. 3) has been described above. However, in a case where no seat speakers 33 are provided, for example, as in B of FIG. 3, the speakers 33 in the vehicle 11 may be used to execute the above-described processing for a predetermined occupant according to the number or positions of the speakers. In this case, the predetermined occupant is normally a driver. However, the predetermined occupant may be other than the driver, that is, an occupant in another seat such as a passengers' seat. However, the seat for the target occupant/target occupant are preset.

OTHER EMBODIMENTS

Other embodiments to which the present technology is applied will be described.

Figure 34:
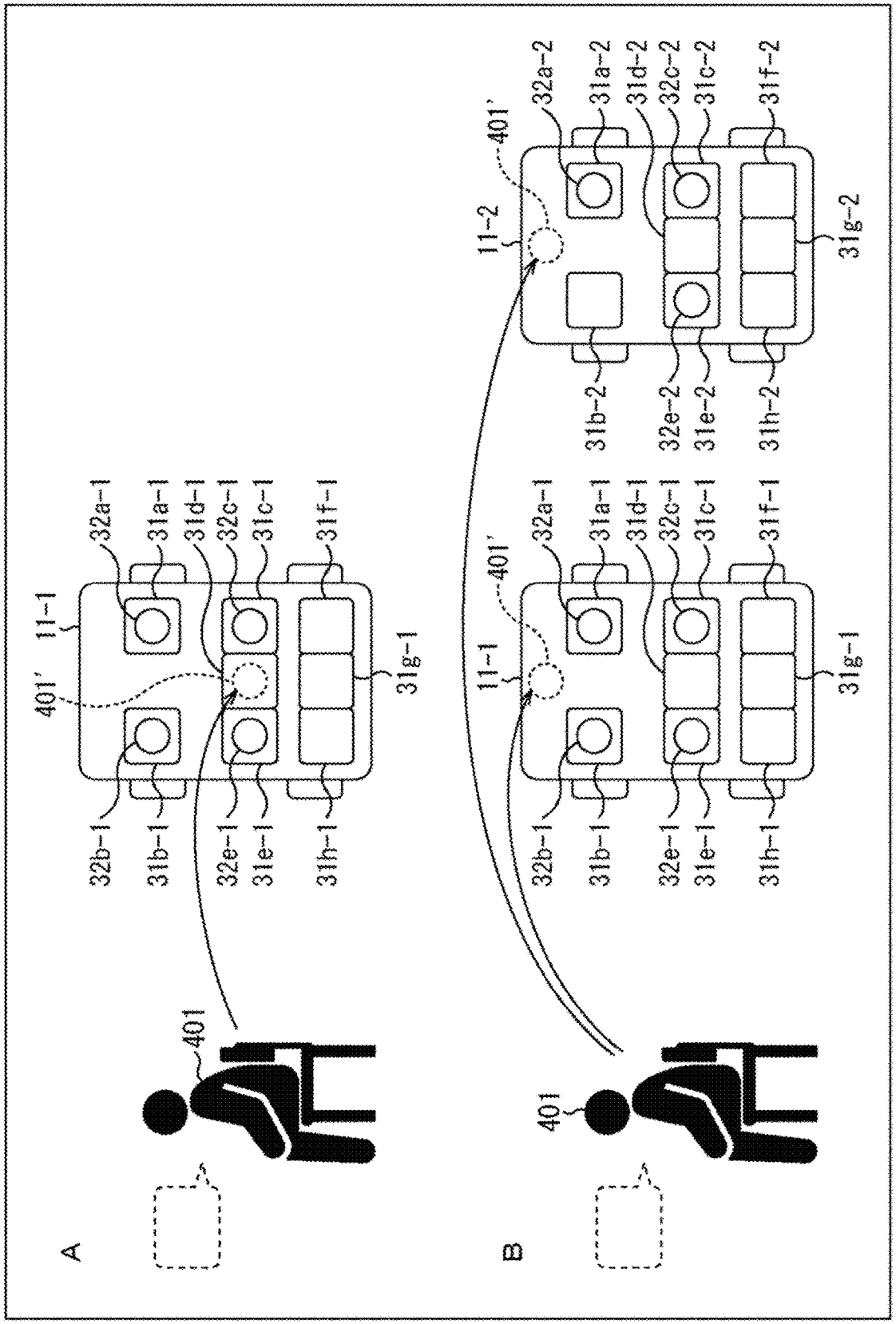
FIG. 34 depicts diagrams for describing a second embodiment.

FIG. 34 is a diagram for describing another embodiment (second embodiment) to which the present technology is applied. In the above-described embodiment (first embodiment), the example in which the occupant 32-2 in the other vehicle 11-2 is arranged in the subject vehicle 11-1 as the virtual occupant 32-2' has been described. A person other than the occupant 32-2 in the other vehicle 11-2 may be arranged in the subject vehicle 11-1 as the virtual occupant 32'.

For example, a person 401 who is in a remote location may be arranged in the subject vehicle 11-1 as a virtual occupant. In other words, a sound image of the person 401 in the remote location may be localized in a predetermined position in the subject vehicle 11-1. The remote location is, for example, a home, a hospital, an office, or the like.

The person 401 who is in, for example, a hospital is virtually placed in the subject vehicle 11-1 to allow the person 401 talk with the occupants 32 in the subject vehicle 11-1. Accordingly, it is possible to make the occupant 32 and the person 401 feel as if they were taking a drive together.

The person 401 may also be a tour conductor, and can provide sightseeing guidance.

As depicted in A of FIG. 34, in a case where the occupant 32*a*-1, the occupant 32*b*-1, the occupant 32*c*-1, and the occupant 32*e*-1 are respectively seated in the seat 31*a*-1, the seat 31*b*-1, the seat 31*c*-1, and the seat 31*e*-1 in the subject vehicle 11-1, for example, the person 401 who is in the remote location is virtually placed in the seat 31*d*-1, which is empty.

When a sound image of a virtual person 401' is localized in the seat 31*d*-1, the occupant 32*a*-1, the occupant 32*b*-1, the occupant 32*c*-1, and the occupant 32*e*-1 can have a feeling as if the person 401 were seated in the seat 31*d*-1 and were talking together. In a case where the occupant 32*a*-1, the occupant 32*b*-1, the occupant 32*c*-1, or the occupant 32*e*-1 says something, what the occupant says is also fed to the person 401, allowing the occupant 32*a*-1, the occupant 32*b*-1, the occupant 32*c*-1, the occupant 32*e*-1, and the person 401 to have a feeling as if they were taking a drive together.

As depicted in B of FIG. 34, the person 401 can be virtually placed in multiple vehicles 11. The occupant 32*a*-1, the occupant 32*b*-1, the occupant 32*c*-1, and the occupant 32*e*-1 are respectively seated in the seat 31*a*-1, the seat 31*b*-1, the seat 31*c*-1, and the seat 31*e*-1 in the subject vehicle 11-1. The occupant 32*a*-2, the occupant 32*c*-2, and the occupant 32*e*-2 are respectively seated in the seat 31*a*-2, the seat 31*c*-2, and the seat 31*e*-2 in the other vehicle 11-2.

In the example illustrated in B of FIG. 34, the virtual person 401' is arranged in the front of the interior of the subject vehicle 11-1 and the other vehicle 11-2. The virtual person 401' may be arranged in an empty seat in the vehicle or arranged at a position where no seat is present.

For example, as depicted in B of FIG. 34, when multiple vehicles 11 travel to the same destination, the person 401 who gives sightseeing guidance is virtually placed in the multiple vehicles 11. Additionally, the virtual person 401' is arranged in the front of the interior of the vehicle. This can make the occupants feel as if they were receiving sightseeing guidance from the person 401 as a tour conductor while traveling.

As described above, a person who is not in the vehicles 11 may be virtually placed in the vehicle 11, or the same person may be arranged in the multiple vehicles 11. The person can be arranged at any position in the interior of the vehicle.

Third Embodiment

Figure 35:
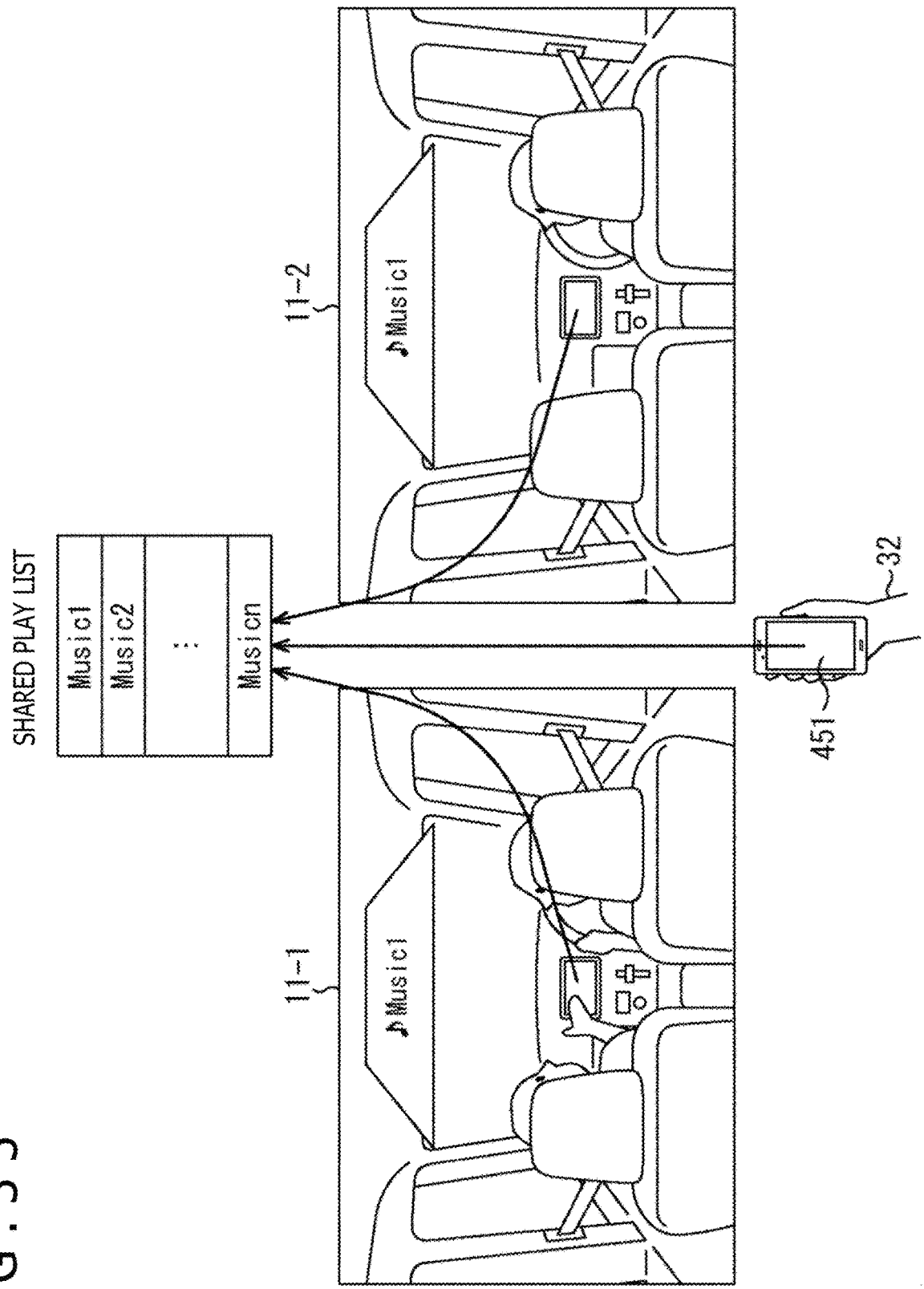
FIG. 35 is a diagram for describing a third embodiment.
Figure 36:
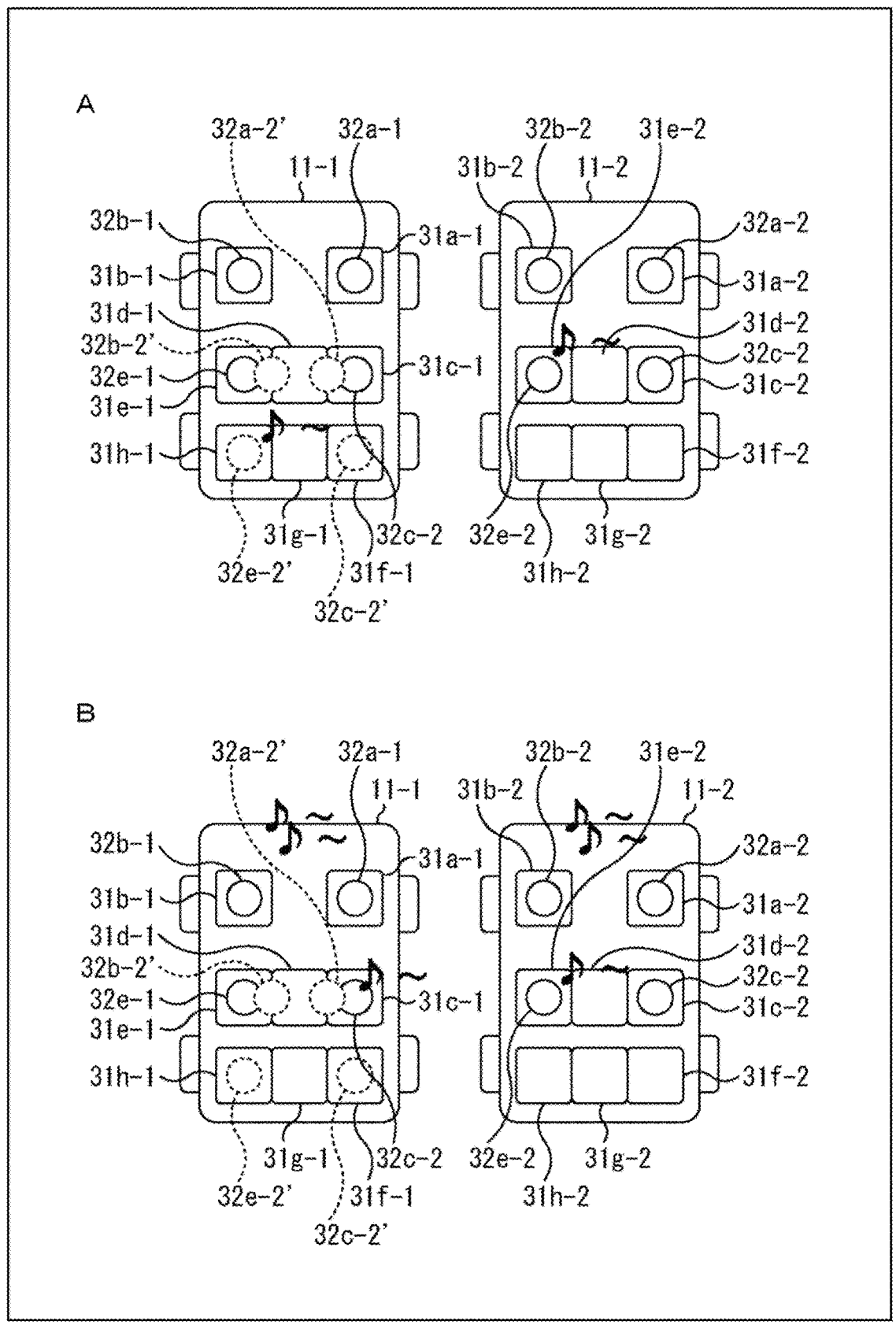
FIG. 36 depicts diagrams for describing the third embodiment.

With reference to FIGS. 35 and 36, a third embodiment will be described. In the third embodiment, an example in which the occupants in the matched vehicles 11 enjoy the same event will be described. In the following description, as an example, the same event is karaoke.

The subject vehicle 11-1 and the other vehicle 11-2 are matched with each other, and a common playlist is prepared for the subject vehicle 11-1 and the other vehicle 11-2. The common playlist is configured such that the occupants in the subject vehicle 11-1 and the occupants in the other vehicle 11-2 can add songs that they want to sing, to the playlist. A smartphone 451 of the occupant 32 or a car navigation system (not illustrated) may be used to add songs to the playlist.

In a case where the occupants enjoy karaoke together as described above, where to localize sound images in the interior of the vehicle will be described with reference to FIG. 36. In an example in FIG. 36, the occupants 32 and the virtual occupants 32' are arranged in each of the subject vehicle 11-1 and the other vehicle 11-2 as in the case of the pattern 3 in FIG. 15 described above.

In an example illustrated in A of FIG. 36, the occupants can hear a singing voice coming from the seat 31 corresponding to the occupant 32 who is singing. For example, in a case where the occupant 32e-1 in the other vehicle 11-2 is singing, control is performed in such a manner that the occupants can hear a singing voice coming from the virtual occupant 32e-1' arranged in the seat 31h-1 in the subject vehicle 11-1. In other words, control is performed in such a manner that the occupants can hear a singing voice coming from a set position where a sound image is to be localized.

In an example in B of FIG. 36, a sound image of the occupant 32 who is singing is localized in the front of the interior of the vehicle. For example, in a case where the occupant 32e-1 in the other vehicle 11-2 is singing, control is performed in such a manner that the virtual occupant 32e-1' is arranged in the front of the interior of the subject vehicle 11-1 and that the occupants can hear a singing voice coming from a sound image of the virtual occupant 32e-1'. The front of the interior of the vehicle may correspond to a position on the dashboard, and control may be performed in such a manner that a sound image is localized on the dashboard.

In the example illustrated in B of FIG. 36, the occupant 32c-1 in the subject vehicle 11-1 is also singing together. In such a case, a virtual occupant 32c-1' corresponding to the occupant 32c-1 may be arranged on the dashboard in the subject vehicle 11-1, and the occupants may hear a singing voice of the occupant 32c-1 which comes from the sound image arranged on the dashboard. In this case, the sound image localized on the dashboard corresponds to a sound image of the occupant 32c-1 and a sound image of the occupant 32e-2, and singing voices of the two occupants are output from the front of the interior of the vehicles. Accordingly, the occupants who are listening to the singing voices can be given a stronger feeling as if the two occupants were singing together.

As described above, the sound image of the occupant 32-1 in the subject vehicle 11-1 can also be generated in the subject vehicle 11-1.

As depicted in B of FIG. 36, by localizing the sound images of the singing occupants 32 in the front of the interior of the vehicle, the singing persons can be made to stand out, and the occupants can be given a stronger feeling as if the singing persons were singing together.

As described above, the subject vehicle 11-1 and the other vehicle 11-2 are matched with each other, and the occupants in the subject vehicle 11-1 and the occupants in the other vehicle 11-2 can enjoy the same event together.

Fourth Embodiment

Figure 37:
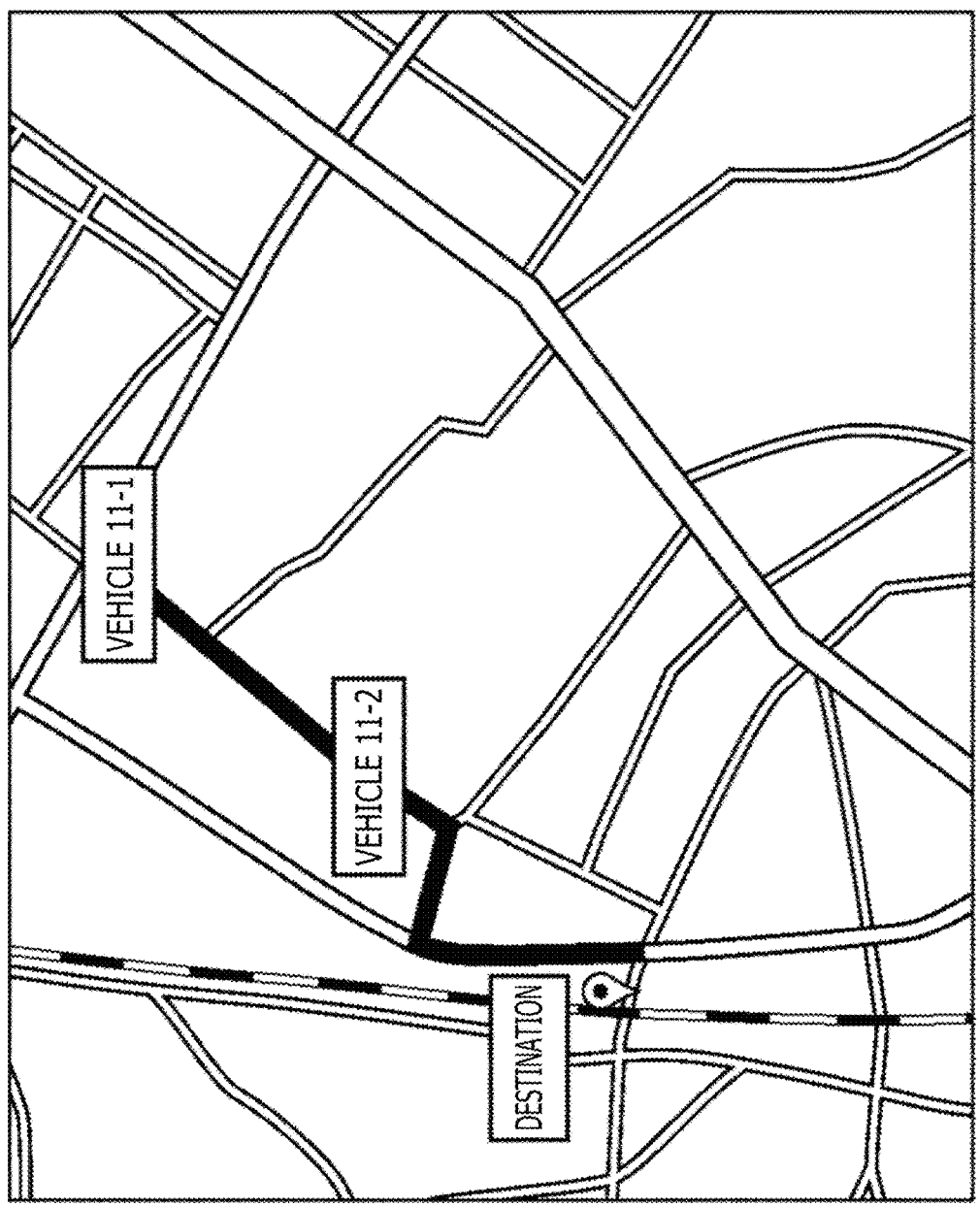
FIG. 37 is a diagram for describing a fourth embodiment.

With reference to FIGS. 37 and 38, a fourth embodiment will be described. In the fourth embodiment, share of traffic congestion information will be described as an example.

FIG. 37 depicts locations in which the vehicle 11-1 and the vehicle 11-2 are traveling, the location being represented on a map. On a route to the destination of the vehicle 11-1, the vehicle 11-2 is traveling.

When the vehicles 11 are matched with each other, the vehicles 11 caught in the same traffic congestion are matched with each other by using traffic congestion information, the speeds of the vehicles 11, information from GPS (Global Positioning System), and the like. The occupants 32 in the matched vehicles 11 can acquire information regarding the traffic congestion, by talking with one another.

For example, the occupants can have a conversation as illustrated in FIG. 38 to acquire information regarding the traffic congestion. Referring to FIG. 38, at a time t1, the occupant 32-1 in the subject vehicle 11-1 asks the occupant 32-2 in the other vehicle 11-2 the question "Do you know why the road is congested?" In response to the question, at a time t2, the occupant 32-2 in the other vehicle 11-2 says, "It seems that there has been an accident."

At a time t3, the occupant 32-1 in the subject vehicle 11-1 asks the occupant 32-2 in the other vehicle 11-2 the question "Have cars gotten stuck in traffic?" In response to this question, at a time t4, the occupant 32-2 in the other vehicle 11-2 says, "Yes, They have been stopped for a long time."

The subject vehicle 11-1 and the other vehicle 11-2 which get caught in the same traffic congestion are matched with each other to allow the occupants to talk with each other, enabling such a conversation as described above. Thus, the occupant 32-1 can obtain desired information in further detail.

Fifth Embodiment

Figure 39:
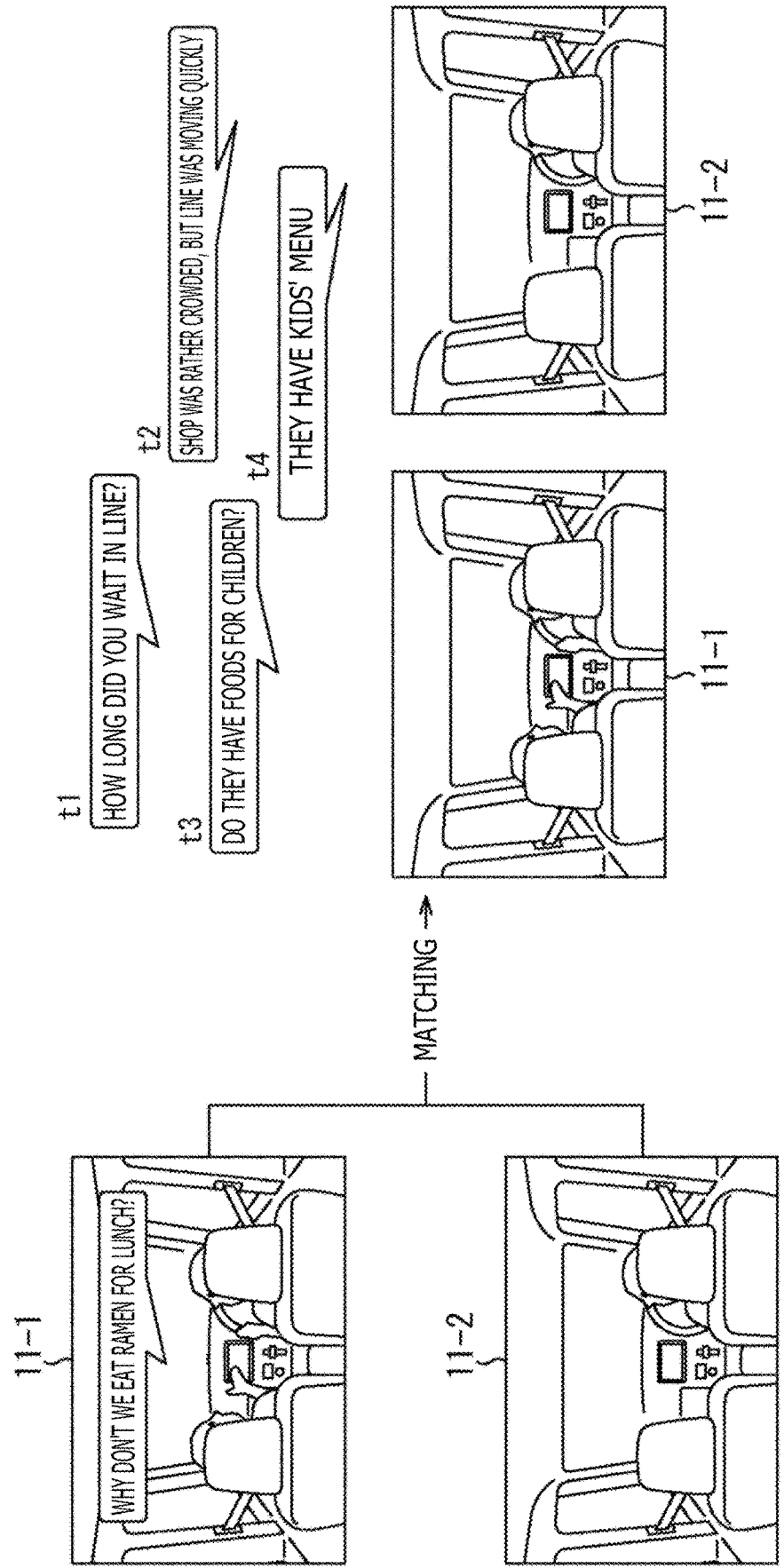
FIG. 39 is a diagram for describing a fifth embodiment.

With reference to FIG. 39, a fifth embodiment will be described. As the fifth embodiment, share of information regarding foods will be described.

When the vehicles 11 are matched with each other, on the basis of conversations in the vehicles, the vehicle 11 in which a person who intends to eat some food is riding is matched with the vehicle 11 in which an occupant who is actually eating the food or has just eaten the food is riding.

For example, it is assumed herein that, as depicted in the left figure of FIG. 39, the occupant 32-1 in the vehicle 11-1 says, "Why don't we eat ramen for lunch?" The keyword "ramen" is extracted from this conversation, and a search is made for the other vehicle 11-2 that is matched with the vehicle 11-1 in terms of this keyword. At this time, matching is also performed by using, as a keyword, the ramen shops nearest the location in which the vehicles 11-1 is traveling, allowing presentation of information regarding the shops where the vehicle 11-1 can easily visit.

As a result of the matching, a search is made for the vehicle 11-2 in which a person who has just eaten "ramen" or who is eating "ramen" in the vehicle is riding, for example, and the vehicle 11-2 is matched with the vehicle 11-1. Note that, instead of the vehicles, persons may be matched with each other as in the second embodiment. When the occupants 32 in the matched vehicles 11 talk with each other, they can acquire information regarding foods.

For example, the occupants can have such a conversation as depicted in FIG. 39 to acquire information regarding foods. Referring to FIG. 39, at a time t1, the occupant 32-1 in the subject vehicle 11-1 asks the occupant 32-2 in the other vehicle 11-2, the question "How long did you wait in line?" In response to this question, at a time t2, the occupant 32-2 in the other vehicle 11-2 says, "The shop were rather crowded, but the line were moving quickly."

At a time t3, the occupant 32-1 in the subject vehicle 11-1 asks the occupant 32-2 in the other vehicle 11-2, the question "Do they have foods for children?" In response to this question, at a time t4, the occupant 32-2 in the other vehicle 11-2 says, "They have a kids' menu."

The subject vehicle 11-1 is matched with the other vehicle 11-2 in which an occupant who can be estimated to have information desired by the occupant in the subject vehicle 11-1 is riding, to allow the occupants in the vehicles 11-1 and 11-2 to talk with each other, enabling such a conversation as described above. Thus, the occupant 32-1 in the subject vehicle 11-1 can obtain desired information in further detail.

Sixth Embodiment

Figure 40:
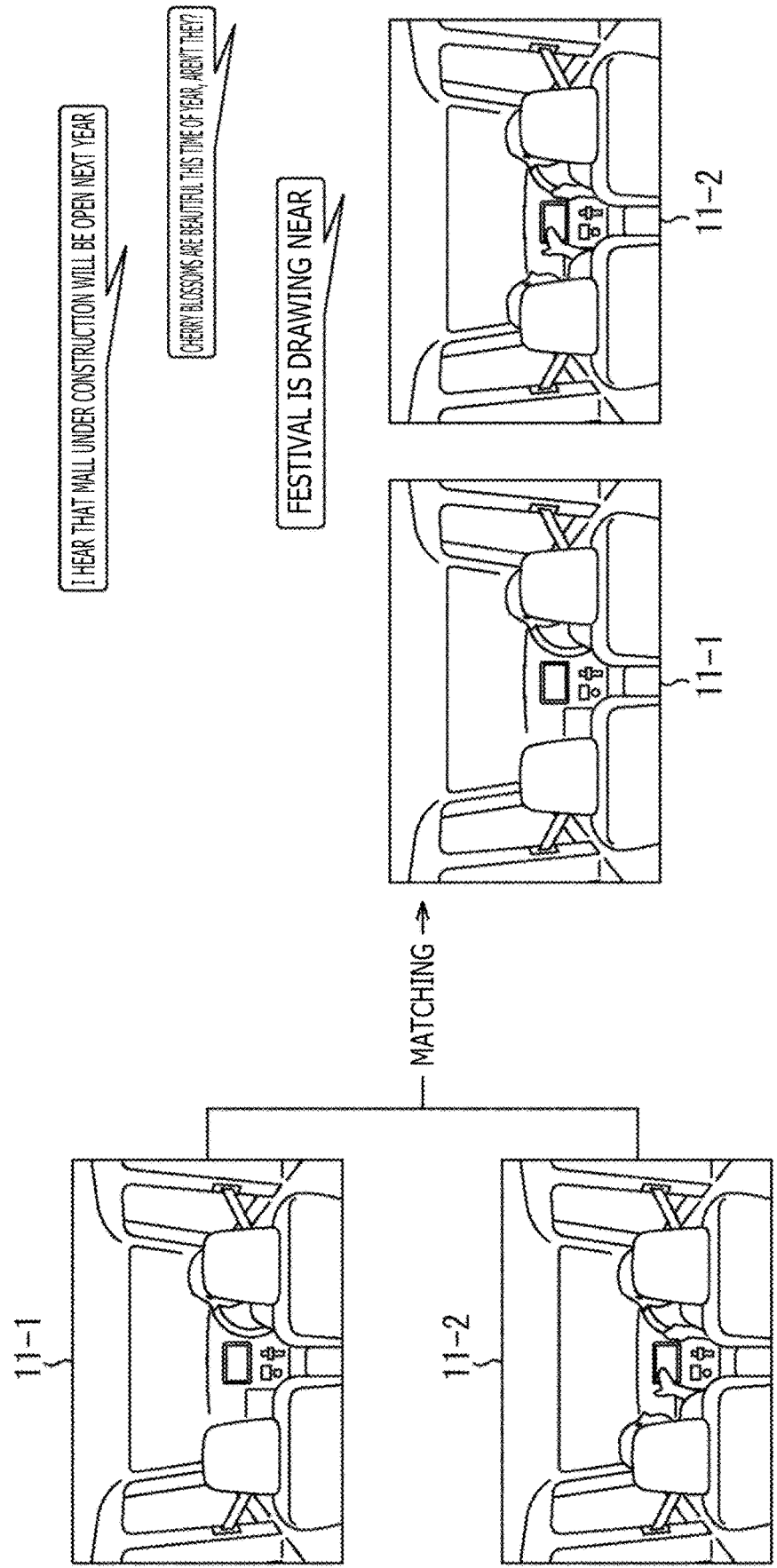
FIG. 40 is a diagram for describing a sixth embodiment.

With reference to FIG. 40, a sixth embodiment will be described. As the sixth embodiment, presentation of information acquired in the past will be described as an example.

When the vehicles 11 are matched with each other, for example, matching may be performed with the vehicle 11 which were traveling in the same location in the past, in place of the vehicle 11 which is traveling at the time of the matching. In a case where matching is performed with the vehicle 11 which were traveling in the same location in the past, the information processing system 10 including the server 13 is applied as depicted in B of FIG. 1, and past information regarding the vehicles 11 is accumulated in the server 13.

Referring to a left figure of FIG. 40, a log accumulated in the server 13 is referenced to search for the other vehicle 11-2 having traveled in the past in a location where the subject vehicle 11-1 is currently traveling. When the other vehicle 11-2 is found as a result of the searching, the vehicle 11-2 is matched with the subject vehicle 11-1. After the matching, the subject vehicle 11-1 is provided with the details of the conversation in the other vehicle 11-2.

For example, it is assumed herein that, as depicted in a right figure of FIG. 40, the occupants in the vehicle 11-2 had the following conversation: "I hear that mall under construction will be open next year," "The cherry blossoms are beautiful this time of the year, aren't they," and "The festival is drawing near." In such a case, what the occupant 32-2 in the other vehicle 11-2 said is uttered from a sound image of the occupant 32-2 which is generated in the subject vehicle 11-1. Voice data of such conversations is extracted from the log accumulated in the server 13.

The sound image may be localized in the subject vehicle 11-1 on the basis of the log in the server 13 in which the position where the occupant in the other vehicle 11-2 were seated is held, or may be localized in the front of the interior of the vehicle as in the second embodiment.

For example, after persons have moved out, when they are traveling by the subject vehicle 11-1 in a district to which they are moving, the subject vehicle 11-1 is matched with the past vehicle 11 and presented with information, allowing the subject vehicle 11-1 to acquire information regarding the district.

When the subject vehicle 11-1 is matched with the past vehicle 11, an allowable time difference between the current time and the time at which the past vehicle 11 were travelling may be set in advance. For example, the subject vehicle 11-1 can be matched with the vehicle 11 having traveled during the latest one week, or can also be matched with the vehicle 11 having traveled around the same time. With this, for example, in the case of lunchtime, the conversation about possible lunch places is more likely to be presented, so that the occupants can obtain the information regarding the possible lunch places.

As described above, matching with the past vehicle 11 may be performed to present information.

Seventh Embodiment

Figure 41:
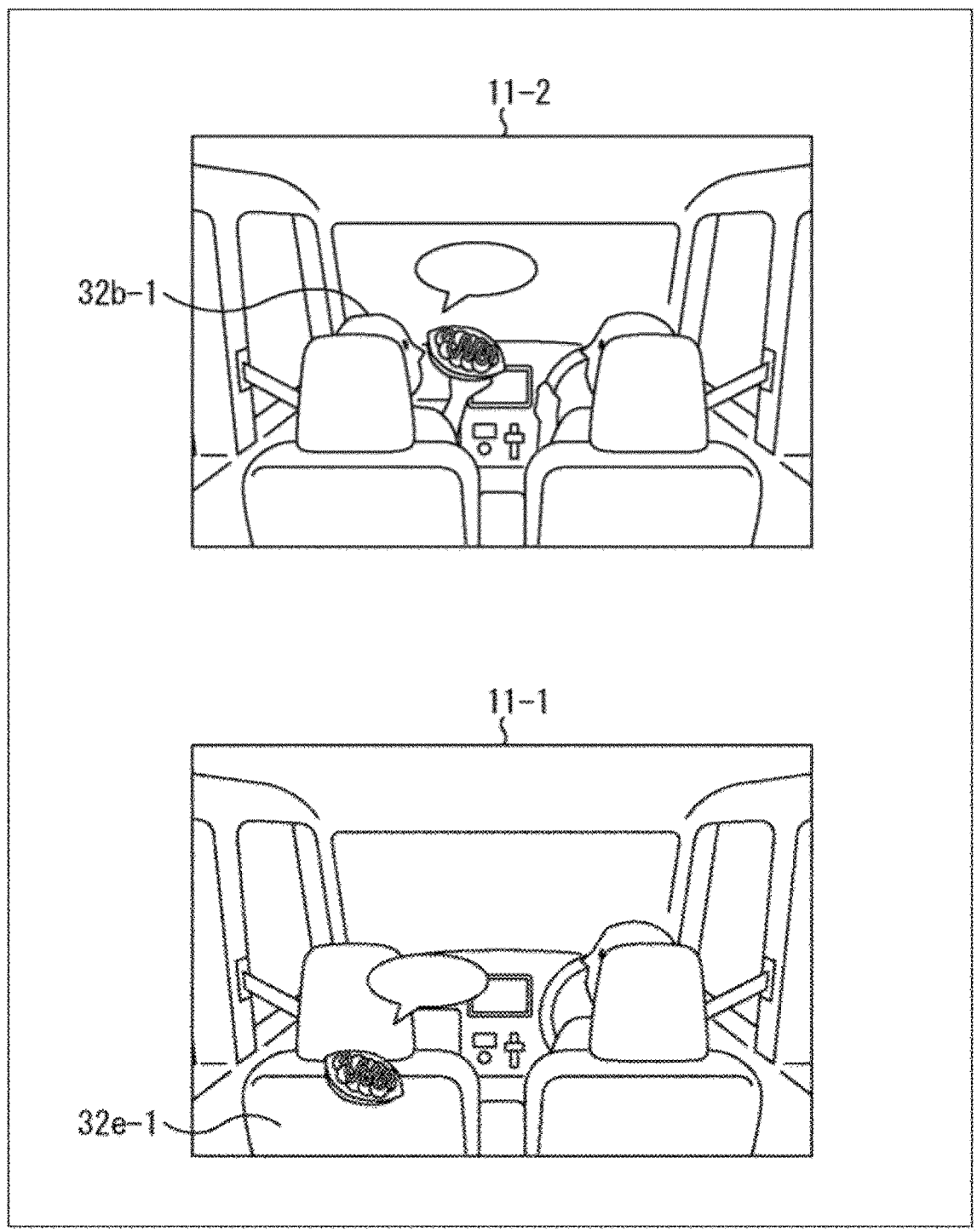
FIG. 41 is a diagram for describing a seventh embodiment.
Figure 42:
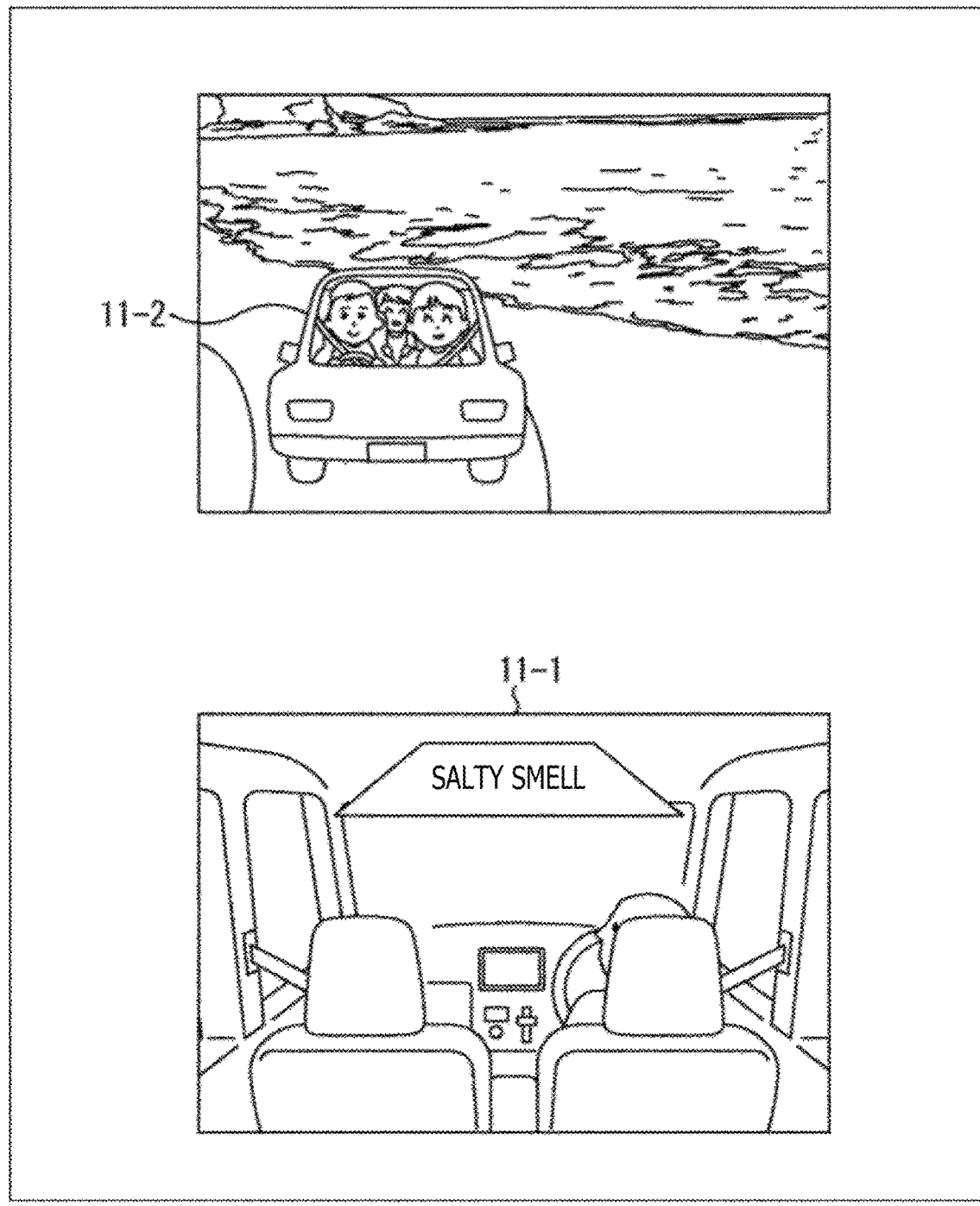
FIG. 42 is a diagram for describing the seventh embodiment.

With reference to FIGS. 41 and 42, a seventh embodiment will be described. In the examples of the first to sixth embodiments described above, a sound image is localized, and voice information is presented from the sound image. However, a smell can further be presented. As the seventh embodiment, additional presentation of a smell will be described as an example.

An example of a presented smell will be described. In the other vehicle 11-2, the occupant 32b-2 is eating something. The smell of the food that the occupant 32b-2 is eating is presented in the vicinity of the seat 31e-1 in the subject vehicle 11-1 which is assigned to the occupant 32b-2. This can enhance the sense of presence of the virtually arranged occupant 32b-2.

In a case where a smell is also presented as described above, an apparatus for presenting the smell is also provided in the vehicle. The presented smell need not be the same as the smell of the food that the occupant 32b-2 is eating. In a case where the smell of the food that the occupant 32b-2 is eating is accurately detected and where it is found that reproducing the detected small in the subject vehicle 11-1 is difficult, a similar smell may be presented.

An example of a presented smell depicted in FIG. 42 will be described. When the other vehicle 11-2 approaches the seaside, the subject vehicle 11-1 is presented with the smell of the sea (salty smell). Olfactory information allows the occupants in the subject vehicle 11-1 to have a feeling as if they were traveling along the sea together with the occupants in the other vehicle 11-2. This can enhance the sense of share of the whole space.

Eighth Embodiment

Figure 43:
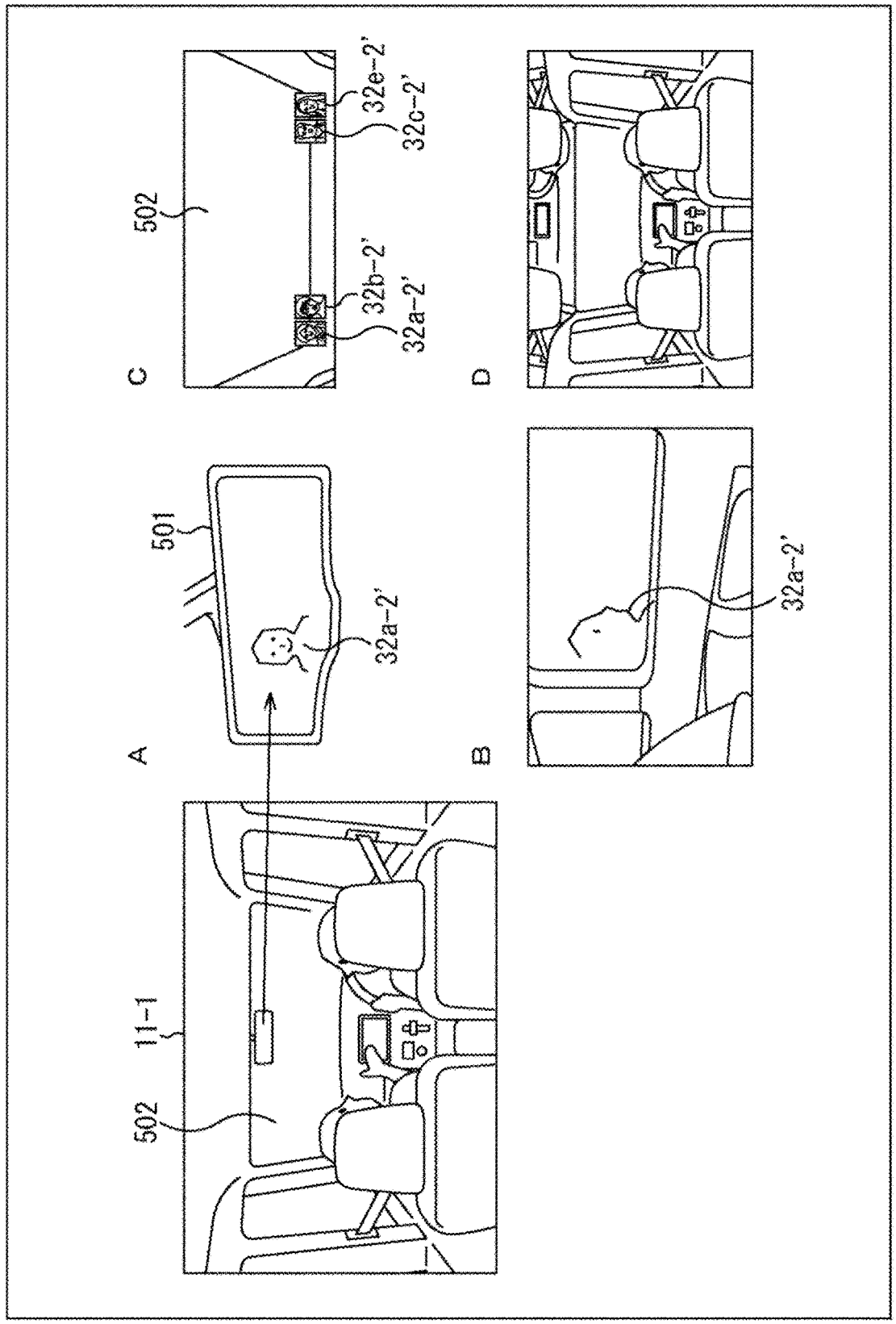
FIG. 43 depicts diagrams for describing an eighth embodiment.

With reference to FIG. 43, an eighth embodiment will be described. In the examples of the first to sixth embodiments, a sound image is localized, and voice information is presented from the sound image. However, a video (image) can further be presented. As the eighth embodiment, additional presentation of a video will be described as an example.

When a voice is presented from the arranged seat, a video of the occupants 32 in the other vehicle 11-2 is presented as a video projected on a window or a rearview mirror in the vehicle 11. In an example illustrated in A of FIG. 43, a video of the occupant 32-2' in the other vehicle 11-2 who is arranged in the rear seat in the subject vehicle 11-1 is presented on a rearview mirror 501 in the subject vehicle 11-1.

The projected video may be obtained by actually capturing an image of the occupant 32-2' in the other vehicle 11-2 and presenting the captured video in the subject vehicle 11-1, or may be a default video representing the occupant 32-2'.

As depicted in B of FIG. 43, a video of the occupant 32-2' in the other vehicle 11-2 who is arranged in the rear seat may be presented on the window for the rear seat in the subject vehicle 11-1.

As depicted in C of FIG. 43, a face image representing the occupant 32-2 in the other vehicle 11-2 who is arranged in the subject vehicle 11-1 may be displayed at the bottom of a windshield 502 of the subject vehicle 11-1. In the example illustrated in C of FIG. 43, faces of the occupant 32a-2', the occupant 32b-2', the occupant 32c-2', and the occupant 32e-2' who are arranged in the subject vehicle 11-1 as virtual occupants are projected.

As depicted in D of FIG. 43, a video captured from the ceiling of the other vehicle 11-2 may be presented on the ceiling of the subject vehicle 11-1.

In a case of the configuration in which a video is presented, an apparatus for projecting the video is provided at an appropriate position inside the vehicle. For example, in a case where a video is projected on the ceiling, a display is provided all over the ceiling, or a projector is provided at a position where the projector can project a video on the ceiling.

As described above, by presenting not only a sound from a localized sound image but also a video, visual information can be presented as well as audio information, enabling the sense of presence of the occupant 32-2 in the other vehicle 11-2 to be enhanced.

Ninth Embodiment

Figure 45:
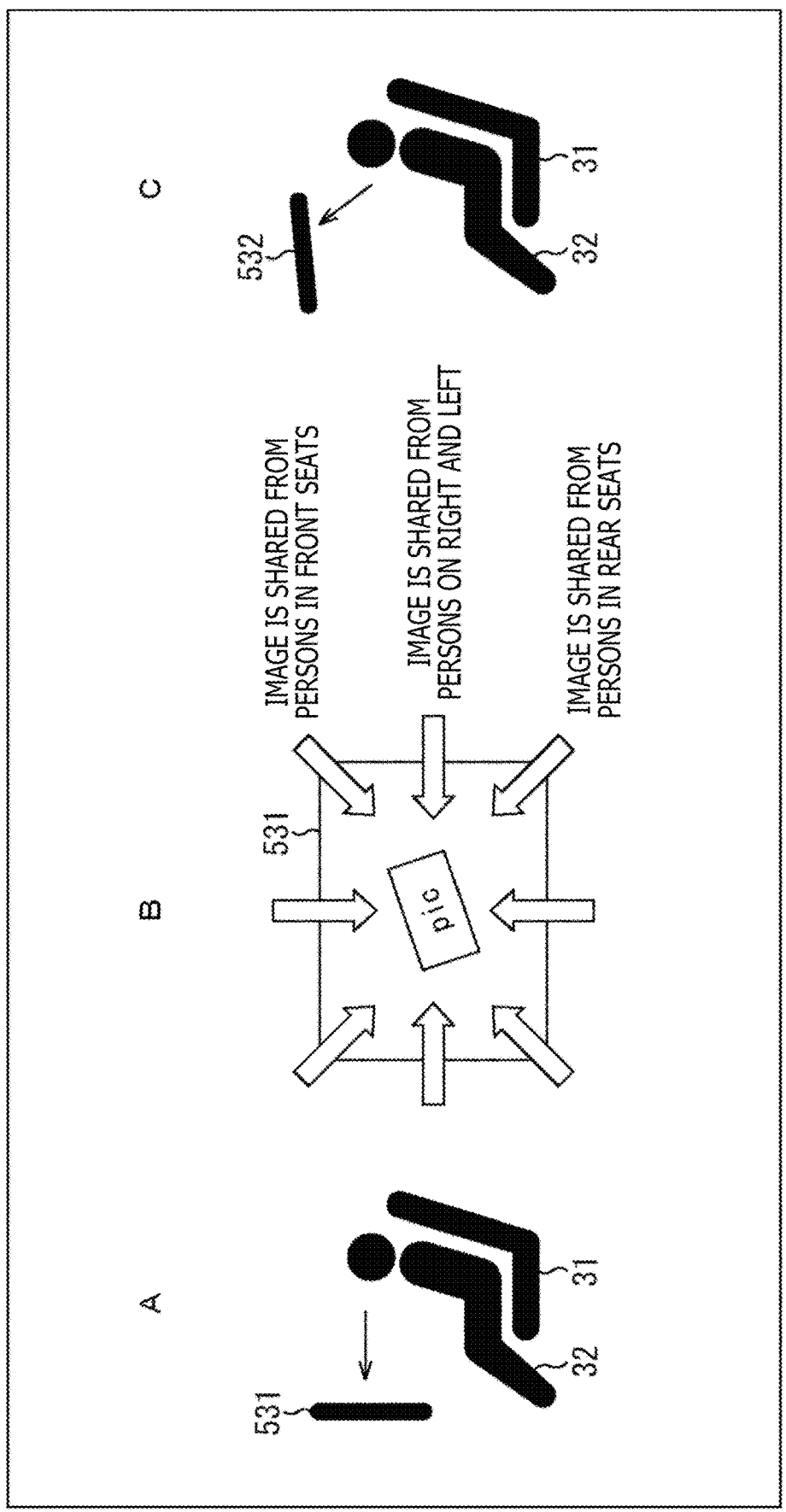
FIG. 45 depicts diagrams for describing the ninth embodiment.

With reference to FIGS. 44 and 45, a ninth embodiment will be described. As in the eighth embodiment, a ninth embodiment presents visual information such as videos or images, allowing the visual information to be shared.

In the example of the seventh embodiment, a video of the virtually arranged occupant 32 is presented as a video. The presented image may also be other than the video of the virtually arranged occupant 32.

For example, scenery as viewed from one of the vehicles 11 may be presented to the other vehicle 11 as a video. For example, a video of the scenery as viewed through the windshield of the other vehicle 11-2 is projected on the ceiling of the subject vehicle 11-1. In a case where the subject vehicle 11-1 is matched with multiple vehicles 11, the traveling scenery as viewed from one of the multiple vehicles 11 is displayed in the other vehicles 11.

The traveling scenery of a virtual location may be displayed in all the vehicles 11. In an example illustrated in FIG. 44, the traveling scenery of the same virtual location is displayed on each of the ceilings of the subject vehicle 11-1 and the other vehicle 11-2.

As described above, with common scenery provided, the occupants can feel as if their vehicles were traveling in the same location, uplifting them. Additionally, by viewing the same video, the occupants can talk about a common topic, accelerating communication between them.

In a case where scenery as viewed from one of the vehicles 11 is presented as a video to the other vehicle 11, the scenery to be presented is selectively obtained from among the vehicles 11. For example, the vehicle 11 traveling along an uncongested route or the vehicle 11 traveling along a route with many tourist attractions can be preferentially selected.

In a case where all the matched vehicles are caught in traffic congestion and where the entire route includes no tourist attraction, the traveling scenery of a virtual location may be selected.

Instead of the above-described scenery, an image provided by the occupant 32 in the vehicle 11 may be shared. In a case where an image is shared, the image may be displayed to indicate the direction in which the image has been inserted from the seat position where the occupant 32 having inserted the image is seated.

In a case where an image is inserted by the occupant 32 seated diagonally to the left of the occupant 32 viewing a video on a display 531 mounted in front of the seat 31, as depicted in A of FIG. 45, the image is displayed (with visual effects) such that the occupant 32 viewing the image can feel as if the image were inserted from the diagonally upper left of the display 531, as depicted in B of FIG. 45.

Note that the occupant 32 seated in the front seat may be the occupant 32 actually seated in the vehicle 11 or the virtual occupant 32' as a localized sound image. This also applies to the following description.

In a case where an image is inserted by the occupant 32 seated in front of the seat 31, the image is displayed to make it appear as if the image were inserted from above the display 531. In a case where an image is inserted by the occupant 32 seated diagonally to the right of the seat 31, the image is displayed to make it appear as if the image were inserted from the diagonally upper right of the display 531.

In a case where an image is inserted by the occupant 32 seated to the left of the seat 31, the image is displayed to make it appear as if the image were inserted from the left of the display 531. In a case where an image is inserted by the occupant 32 seated to the right of the seat 31, the image is displayed to make it appear as if the image were inserted from the right of the display 531.

In a case where an image is inserted by the occupant 32 seated diagonally behind and to the left of the seat 31, the image is displayed to make it appear as if the image were inserted from the diagonally lower left of the display 531. In a case where an image is inserted by the occupant 32 seated diagonally behind and to the right of the seat 31, the image is displayed to make it appear as if the image were inserted from the diagonally lower right of the display 531. In a case where an image is inserted by the occupant 32 seated behind the seat 31, the image is displayed to make it appear as if the image were inserted from below the display 531.

As depicted in C of FIG. 45, also in a case where the occupant 32 is viewing a display 532 (image projected from the projector) provided on the ceiling, when an image is inserted, the image is similarly displayed with visual effects to indicate the direction in which the image has been inserted from the position of the occupant 32 having inserted the image.

In a case where the display 532 is mounted on the ceiling, the image is turned upside down. For example, in a case where an image is inserted by the occupant 32 seated in front of the seat 31, the image is displayed to make it appear as if the image were inserted from below the display 531. For example, in a case where an image is inserted by the occupant 32 seated behind the seat 31, the image is displayed to make it appear as if the image were inserted from above the display 531.

As described above, the image is display in consideration of the relative positional relation between the occupant 32 having inserted the image and the occupant 32 viewing the inserted image.

With the imaged displayed in such a manner, the direction in which the voice comes from the occupant having inserted the image is matched with the direction in which data appears, enabling the data to be shared with less feelings of strangeness.

Tenth Embodiment

Figure 46:
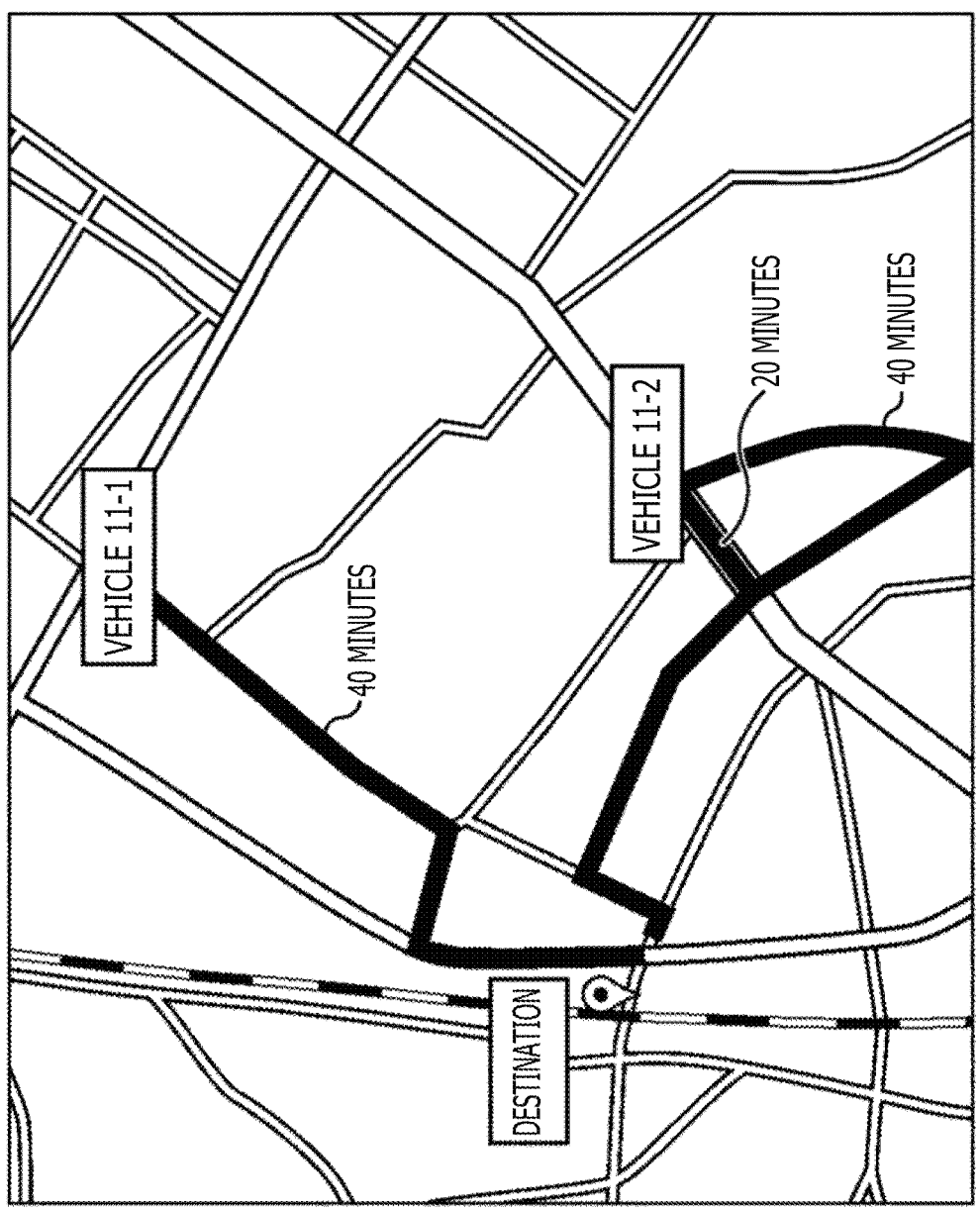
FIG. 46 is a diagram for describing a tenth embodiment.

With reference to FIG. 46, a tenth embodiment will be described. In the tenth embodiment, when the vehicles travel to the same destination through different routes, the traveling routes are adjusted in such a manner that the arrivals coincidence in time with each other.

For example, in a case where the subject vehicle 11-1 and the other vehicle 11-2 depart from different locations for the same destination and join together at the destination, one of the subject vehicle 11-1 and the other vehicle 11-2 may arrive earlier. Even in a case where the vehicles 11 are matched with each other and where the occupants in the different vehicles 11 are made to feel as if they were taking a drive together in the same vehicle 11 as described above, such driving is interrupted if one of the vehicles 11 arrives at the destination earlier.

Accordingly, in order to make the vehicles 11 arrive at the destination as nearly at the same time as possible, a drive scheduled route is changed for the vehicle 11 that is likely to arrive early at the destination, to guide the vehicle 11 along an indirect route and to cause the vehicle 11 to require a longer time to arrive at the destination. This will be described with reference to FIG. 46.

In a case where the subject vehicle 11-1 is estimated to require 40 minutes to arrive at the destination and where the other vehicle 11-2 is estimated to require 20 minutes to arrive at the destination, the other vehicle 11-2 is to arrive at the destination approximately 20 minutes earlier than the subject vehicle 11-1 unless the routes are changed. In such a situation, the drive scheduled route for the other vehicle 11-2 is changed, and a search is made for an indirect route requiring approximately 40 minutes to reach the destination. The result of the search is presented to the driver of the other vehicle 11-2 via the car navigation system of the other vehicle 11-2 or the like.

As the routes are adjusted as described above, the vehicle 11 can be prevented from having a shorter driving time than the matched other vehicle 11, allowing the occupants to enjoy the drive.

The first to tenth embodiments can be combined together for implementation.

According to the present technology, the occupants in the respective remote vehicles 11 can communicate with each other smoothly.

When the occupants in the vehicles 11 are divided into groups according to the age, sex, and the like, they can easily find common topics, enabling conversations to start smoothly.

The groups can be changed according to the conditions or interests of the occupants, and changing the groups also enables the conversation to be accelerated.

When the vehicles 11 are matched with each other in such a manner that the occupants who are likely to have common topics are matched with one another, the occupants can enjoy the conversation even in a case where they meet for the first time.

When the vehicles 11 are matched with each other according to the speed of the vehicle 11, objects grasped by the occupants, objects in the interior of the vehicle, and the like, the occupants can exchange desired information such as traffic congestion information and reviews between them.

Videos, smells, and the like can also be shared between the vehicles 11, enhancing the presence of the occupants in the vehicles 11.

<Recording Media>

The series of processing operations described above can be executed by hardware or by software. In a case where the series of processing operations is executed by hardware, the programs constituting the software are installed in a computer. Here, the computer includes a computer incorporated into dedicated hardware, a general-purpose personal computer that can execute various functions when various programs are installed in the computer, and the like.

Figure 47:
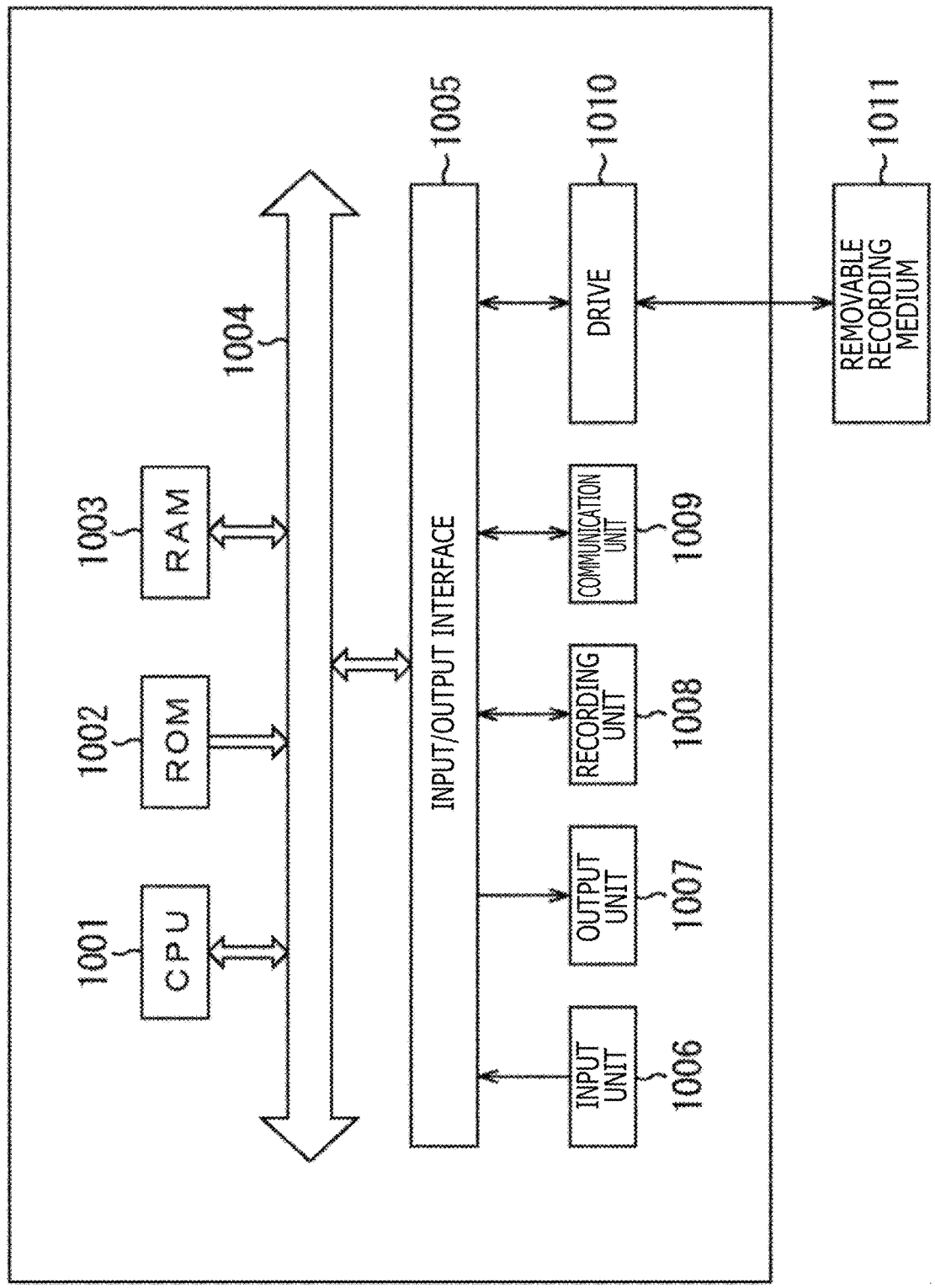
FIG. 47 is a diagram depicting a configuration example of a personal computer.

FIG. 47 is a block diagram depicting a configuration example of hardware of a computer executing the above-described series of processing operations by programs. In the computer, a CPU (Central Processing Unit) 1001, a ROM (Read Only Memory) 1002, a RAM (Random Access Memory) 1003 are connected together by a bus 1004. The bus 1004 is further connected to an input/output interface 1005. The input/output interface 1005 is connected to an input unit 1006, an output unit 1007, a storage unit 1008, a communication unit 1009, and a drive 1010.

The input unit 1006 includes a keyboard, a mouse, a microphone, and the like. The output unit 1007 includes a display, a speaker, and the like. The storage unit 1008 includes a hard disk, a nonvolatile memory, and the like. The communication unit 1009 includes a network interface and the like. The drive 1010 drives a removable medium 1011 such as a magnetic disk, an optical disc, a magneto-optical disc, or a semiconductor memory.

In the computer configured as described above, the above-described series of processing operations is executed by the CPU 1001 loading programs stored in the storage unit 1008, into the RAM 1003 via the input/output interface 1005 and the bus 1004 and executing the programs.

The programs executed by the computer (CPU 100) can be provided, for example, by being recorded in the removable medium 1011 as a package medium or the like. Additionally, the programs can be provided via a wired or wireless transmission medium such as a local area network, the Internet, or a digital satellite network.

In the computer, the programs can be installed in the storage unit 1008 via the input/output interface 1005 by mounting the removable medium 1011 into the drive 1010. Additionally, the programs can be installed in the storage unit 1008 by being received by the communication unit 1009 via the wired or wireless transmission medium. Otherwise, the programs can be pre-installed in the ROM 1002 or the storage unit 1008.

Note that the programs executed by the computer may chronologically execute processing according to the order described herein or execute processing in parallel or at a required timing such as a timing when the program is invoked.

The system as used herein represents the entire apparatus including multiple apparatuses.

Note that the effects described herein are merely illustrative and not restrictive and that other effects may be produced.

Note that the embodiments of the present technology are not limited to the above-described embodiments, and various changes can be made on the embodiments without departing from the spirits of the present technology.

Note that the present technology can also take the following configurations.

(1)

An information processing apparatus including:
an acquisition section configured to acquire a situation of a subject vehicle and a situation of another vehicle;
a setting section configured to set, on the basis of the situation of the subject vehicle and the situation of the other vehicle, a position in the subject vehicle at which a sound image of an occupant riding in the other vehicle is localized; and
a sound image localization processing section configured to localize the sound image of the occupant at the position set by the setting section.

(2)

The information processing apparatus according to (1) above, in which
the acquisition section acquires at least a position of a seat in which the occupant is seated, and
the setting section sets an empty seat in the subject vehicle as the position where the sound image of the occupant in the other vehicle is localized.

(3)

The information processing apparatus according to (1) or (2) above, in which
the setting section divides occupants riding in the subject vehicle and occupants riding in the other vehicle into groups on the basis of any of an age, a role, and sex, and the position is set such that the occupants included in the same group are arranged closer to each other.

(4)
The information processing apparatus according to any one of (1) to (3) above, in which
the setting section sets the position of the sound image to a position where a relative positional relation between occupants in the other vehicle is reproduced in the subject vehicle.

(5)
The information processing apparatus according to any one of (1) to (4) above, in which
the setting section determines whether or not to set again the position that has been set, and
executes the determination by using a situation of an occupant in the subject vehicle.

(6)
The information processing apparatus according to any one of (1) to (5) above, in which
the setting section measures a degree of liveliness of a conversation between occupants in the subject vehicle, and sets the position again in a case where the degree of liveliness decreases.

(7)
The information processing apparatus according to (3) above, in which
the setting section sets the position again in a case where an occupant included in a predetermined one of the groups responds to a conversation between occupants included in another group.

(8)
The information processing apparatus according to any one of (1) to (7) above, further including:
a matching section configured to match the subject vehicle with the other vehicle, in which
the matching section matches the vehicles satisfying a predetermined condition with each other.

(9)
The information processing apparatus according to (8) above, in which,
in a case where there is a vehicle registered as a vehicle to be matched, the matching section matches the subject vehicle with the registered vehicle, and in a case where no vehicle is registered as a vehicle to be matched, the matching section matches the subject vehicle with a vehicle traveling near the subject vehicle.

(10)
The information processing apparatus according to (8) or (9) above, in which
the matching section matches the subject vehicle with a vehicle satisfying any of conditions including a condition that the vehicle having a similar itinerary, a condition that the vehicle has a similar group composition of occupants, a condition that the vehicle has a similar vehicle situation, a condition that occupants in the vehicle talk about a similar subject, and a condition that a situation inside the vehicle is similar.

(11)
The information processing apparatus according to any one of (8) to (10) above, in which
the matching section matches the subject vehicle with a vehicle in which a degree to which an object grasped by an occupant matches is high.

(12)
The information processing apparatus according to any one of (8) to (11) above, in which
the matching section matches the subject vehicle with a vehicle traveling on a route on which the subject vehicle is scheduled to travel.

(13)
The information processing apparatus according to any one of (8) to (12) above, in which
the matching section detects a keyword included in a conversation between occupants in the subject vehicle and matches the subject vehicle with a vehicle in which an occupant who is estimated to have a topic corresponding to the keyword is riding.

(14)
The information processing apparatus according to any one of (1) to (13) above, in which
the setting section sets a position where a sound image of a person in a remote location is localized.

(15)
The information processing apparatus according to any one of (1) to (14) above, in which
the setting section sets a sound image of an occupant who is singing, at a front position in the subject vehicle.

(16)
The information processing apparatus according to any one of (1) to (15) above, in which
a video of the occupant in the other vehicle who is presented as the sound image to the occupant in the subject vehicle is displayed at a predetermined position in the subject vehicle.

(17)
The information processing apparatus according to any one of (1) to (16) above, in which
scenery of a location in which the other vehicle is traveling is displayed at a predetermined position in the subject vehicle.

(18)
The information processing apparatus according to any one of (1) to (17) above, in which
a conversation spoken from the sound image of the occupant is extracted from a log accumulated in a server.

(19)
An information processing method including:
by an information processing apparatus,
acquiring a situation of a subject vehicle and a situation of another vehicle;
setting, on the basis of the situation of the subject vehicle and the situation of the other vehicle, a position in the subject vehicle at which a sound image of an occupant riding in the other vehicle is localized; and
localizing the sound image of the occupant at the set position.

(20)
A program causing a computer to:
acquire a situation of a subject vehicle and a situation of another vehicle;
set, on the basis of the situation of the subject vehicle and the situation of the other vehicle, a position in the subject vehicle at which a sound image of an occupant riding in the other vehicle is localized; and
localize the sound image of the occupant at the set position.

REFERENCE SIGNS LIST

10: Information processing system
11: Vehicle
12: Network

13: Server
31: Seat
32: Occupant
33: Speaker
36: Output unit
51: Information processing apparatus
54: Step
55: Step
61: Input unit
62: Input/output processing unit
63: Output unit
64: Information processor
71: Seating arrangement processing unit
72: Vehicle matching processing unit
73: Seating arrangement information accumulation unit
74: Vehicle matching information accumulation unit
75: Vehicle information accumulation unit
76: Occupant information accumulation unit
77: Sensor information processing unit
78: Communication unit
79: Output information creation unit
81: Sound image localization processing section
91: Preregistration parameter
92: Departure registration parameter
101: Area
102: Area
201: Camera
202: Microphone
211: Liveliness detection unit
221: Face detection dictionary accumulation section
222: Facial expression dictionary accumulation section
223: Face detection section
224: Facial expression quantification section
225: Voice recognition dictionary accumulation section
226: Volume detection section
227: Speech-to-text section
228: Detected information accumulation section
301: Sound object information acquisition block
302: Sound control block
303: Sound processing block
321: Sound object processing part
322: Mix part
331: VPT filter calculation processing portion
332: VPT processing portion
351: Corresponding channel control part
352: HRTF processing part
353: two-channel part
401: Person
451: Smartphone
501: Rearview mirror
502: Windshield
531, 532: Display

The invention claimed is:

1. An information processing apparatus comprising:
circuitry configured to
acquire a situation of a subject vehicle and a situation of another vehicle;
set, on a basis of the situation of the subject vehicle and the situation of the other vehicle, a position in the subject vehicle at which a sound image of an occupant riding in the other vehicle is localized; and
localize the sound image of the occupant at the position,
wherein the circuitry is configured to acquire at least a position of a seat in which the occupant is seated, and
wherein the circuitry is configured to set an empty seat in the subject vehicle as the position where the sound image of the occupant in the other vehicle is localized.

2. The information processing apparatus according to claim 1, wherein
the circuitry is configured to divide occupants riding in the subject vehicle and occupants riding in the other vehicle into groups on a basis of any of an age, a role, and sex, and
the position is set such that the occupants included in a same group are arranged closer to each other.

3. The information processing apparatus according to claim 2, wherein
the circuitry is configured to set the position again in a case where an occupant included in a predetermined one of the groups responds to a conversation between occupants included in another group.

4. The information processing apparatus according to claim 1, wherein
the circuitry is configured to set the position of the sound image to a position where a relative positional relation between occupants in the other vehicle is reproduced in the subject vehicle.

5. The information processing apparatus according to claim 1, wherein
the circuitry is configured to determine whether or not to set again the position that has been set, and
the circuitry is configured to execute the determination by using a situation of the occupant in the subject vehicle.

6. The information processing apparatus according to claim 1, wherein
the circuitry is configured to measure a degree of liveliness of a conversation between occupants in the subject vehicle, and set the position again in a case where the degree of liveliness decreases.

7. The information processing apparatus according to claim 1, wherein:
the circuitry is configured to match the subject vehicle with the other vehicle, in a case where
the vehicles satisfying a predetermined condition with each other.

8. The information processing apparatus according to claim 7, wherein,
in a case where there is a vehicle registered as a vehicle to be matched, the circuitry is configured to match the subject vehicle with the registered vehicle, and in a case where no vehicle is registered as a vehicle to be matched, the circuitry is configured to match the subject vehicle with a vehicle traveling near the subject vehicle.

9. The information processing apparatus according to claim 7, wherein
the circuitry is configured to match the subject vehicle with a vehicle satisfying any of conditions including a condition that the vehicle having a similar itinerary, a condition that the vehicle has a similar group composition of occupants, a condition that the vehicle has a similar vehicle situation, a condition that occupants in the vehicle talk about a similar subject, and a condition that a situation inside the vehicle is similar.

10. The information processing apparatus according to claim 7, wherein
the circuitry is configured to match the subject vehicle with a vehicle in which a degree to which an object grasped by an occupant matches is high.

11. The information processing apparatus according to claim 7, wherein
the circuitry is configured to match the subject vehicle with a vehicle traveling on a route on which the subject vehicle is scheduled to travel.

12. The information processing apparatus according to claim 7, wherein
the circuitry is configured to detect a keyword included in a conversation between occupants in the subject vehicle and match the subject vehicle with a vehicle in which an occupant who is estimated to have a topic corresponding to the keyword is riding.

13. The information processing apparatus according to claim 1, wherein
the circuitry is configured to set a position where a sound image of a person in a remote location is localized.

14. The information processing apparatus according to claim 1, wherein
the circuitry is configured to set a sound image of an occupant who is singing, at a front position in the subject vehicle.

15. The information processing apparatus according to claim 1, wherein
a video of the occupant in the other vehicle who is presented as the sound image to the occupant in the subject vehicle is displayed at a predetermined position in the subject vehicle.

16. The information processing apparatus according to claim 1, wherein
scenery of a location in which the other vehicle is traveling is displayed at a predetermined position in the subject vehicle.

17. The information processing apparatus according to claim 1, wherein
a conversation spoken from the sound image of the occupant is extracted from a log accumulated in a server.

18. An information processing method comprising:
by an information processing apparatus,
acquiring a situation of a subject vehicle and a situation of another vehicle;
setting, on a basis of the situation of the subject vehicle and the situation of the other vehicle, a position in the subject vehicle at which a sound image of an occupant riding in the other vehicle is localized; and
localizing the sound image of the occupant at the set position,
wherein the method further comprises, acquiring at least a position of a seat in which the occupant is seated, and setting an empty seat in the subject vehicle as the position where the sound image of the occupant in the other vehicle is localized.

19. A non-transitory computer-readable storage medium including computer executable instructions, wherein the instructions, when executed by an information processing apparatus, cause the information processing apparatus to perform a method, the method comprising:
acquiring a situation of a subject vehicle and a situation of another vehicle;
setting, on a basis of the situation of the subject vehicle and the situation of the other vehicle, a position in the subject vehicle at which a sound image of an occupant riding in the other vehicle is localized; and
localizing the sound image of the occupant at the set position,
wherein the method further comprises, acquiring at least a position of a seat in which the occupant is seated, and setting an empty seat in the subject vehicle as the position where the sound image of the occupant in the other vehicle is localized.

* * * * *